US010458801B2

(12) United States Patent
Lord et al.

(10) Patent No.: US 10,458,801 B2
(45) Date of Patent: Oct. 29, 2019

(54) SYSTEMS AND METHODS FOR TRAVEL PLANNING THAT CALLS FOR AT LEAST ONE TRANSPORTATION VEHICLE UNIT

(71) Applicant: MODERN GEOGRAPHIA, LLC, Wilmington, DE (US)

(72) Inventors: Richard T. Lord, Gig Harbor, WA (US); Robert W. Lord, Seattle, WA (US); Nathan P. Myhrvold, Medina, WA (US); Clarence T. Tegreene, Mercer Island, WA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 14/328,002

(22) Filed: Jul. 10, 2014

(65) Prior Publication Data

US 2015/0323329 A1     Nov. 12, 2015

Related U.S. Application Data

(63) Continuation-in-part of application No. 14/318,182, filed on Jun. 27, 2014.
(Continued)

(51) Int. Cl.
*G01C 21/34* (2006.01)
*G06Q 10/02* (2012.01)

(52) U.S. Cl.
CPC ......... *G01C 21/34* (2013.01); *G01C 21/3423* (2013.01); *G01C 21/3438* (2013.01); *G06Q 10/025* (2013.01)

(58) Field of Classification Search
CPC . G01C 21/3438; G01C 21/34; G01C 21/3423
(Continued)

(56) References Cited

U.S. PATENT DOCUMENTS 4,007,469 A    2/1977  Land et al.
4,922,443 A    5/1990  Coetsier et al.
(Continued)

FOREIGN PATENT DOCUMENTS

EP    2 708 850 A1    3/2014
GB    2501075 A      10/2013
(Continued)

OTHER PUBLICATIONS

Boufraied, Amine; "A Diagnostic Approach for Advanced Tracking of Commercial Vehcles With Time Window Constraints"; IEEE Transaction on Intelligent Transportation Systems; bearing a date of Sep. 2013; pp. 1470-1479; vol. 14, No. 3; IEEE.
(Continued)

*Primary Examiner* — Aaron L Troost
(74) *Attorney, Agent, or Firm* — Winston & Strawn LLP

(57) ABSTRACT

Computationally implemented methods and systems that are designed for receiving a request for transporting one or more end users towards a destination location; providing a travel plan for facilitating the one or more end users to travel to the destination location from a starting location, the travel plan identifying at least two route legs including at least one transport route leg that calls for at least one transportation vehicle unit to transport the one or more end users over the transport route leg; and directing the at least one transportation vehicle unit to rendezvous with the one or more end users at a rendezvous location in order to transport the one or more end users over the transport route leg. In addition to the foregoing, other aspects are described in the claims, drawings, and text.

38 Claims, 27 Drawing Sheets

Related U.S. Application Data

(60) Provisional application No. 61/989,394, filed on May 6, 2014.

(58) Field of Classification Search
USPC .......................................................... 701/408
See application file for complete search history.

(56) References Cited

U.S. PATENT DOCUMENTS

| | | |
|---|---|---|
| 5,023,934 A | 6/1991 | Wheeless |
| 5,146,557 A | 9/1992 | Yamrom et al. |
| 5,222,127 A | 6/1993 | Fukui |
| 5,247,575 A | 9/1993 | Sprague et al. |
| 5,282,061 A | 1/1994 | Farrell |
| 5,287,102 A | 2/1994 | McKiel, Jr. |
| 5,287,448 A | 2/1994 | Nicol et al. |
| 5,303,393 A | 4/1994 | Noreen et al. |
| 5,311,434 A | 5/1994 | Tamai |
| 5,388,251 A | 2/1995 | Makino et al. |
| 5,404,295 A | 4/1995 | Katz et al. |
| 5,410,326 A | 4/1995 | Goldstein |
| 5,442,759 A | 8/1995 | Chiang et al. |
| 5,452,222 A | 9/1995 | Gray et al. |
| 5,475,835 A | 12/1995 | Hickey |
| 5,524,140 A | 6/1996 | Klausner et al. |
| 5,561,705 A | 10/1996 | Allard et al. |
| 5,568,536 A | 10/1996 | Tiller et al. |
| 5,572,576 A | 11/1996 | Klausner et al. |
| 5,612,669 A | 3/1997 | Allen et al. |
| 5,648,897 A | 7/1997 | Johnson et al. |
| 5,654,688 A | 8/1997 | Allen et al. |
| 5,663,704 A | 9/1997 | Allen et al. |
| 5,729,191 A | 3/1998 | Allen et al. |
| 5,802,467 A | 9/1998 | Salazar et al. |
| 5,802,492 A | 9/1998 | DeLorme et al. |
| 5,805,672 A | 9/1998 | Barkat et al. |
| 5,812,977 A | 9/1998 | Douglas |
| 5,818,329 A | 10/1998 | Allen |
| 5,825,355 A | 10/1998 | Palmer et al. |
| 5,877,757 A | 3/1999 | Baldwin et al. |
| 5,887,171 A | 3/1999 | Tada et al. |
| 5,890,905 A | 4/1999 | Bergman |
| 5,898,400 A | 4/1999 | Jones et al. |
| 5,910,800 A | 6/1999 | Shields et al. |
| 5,920,697 A | 7/1999 | Masters et al. |
| 5,923,325 A | 7/1999 | Barber et al. |
| 5,933,139 A | 8/1999 | Feigner et al. |
| 5,936,611 A | 8/1999 | Yoshida |
| 5,938,721 A | 8/1999 | Dussell et al. |
| 5,940,007 A | 8/1999 | Brinkmeyer et al. |
| 5,965,858 A | 10/1999 | Suzuki et al. |
| 5,982,277 A | 11/1999 | Flick |
| 5,985,858 A | 11/1999 | Miyata et al. |
| 5,991,739 A | 11/1999 | Cupps et al. |
| 6,005,299 A | 12/1999 | Hengst |
| 6,005,613 A | 12/1999 | Endsley et al. |
| 6,021,403 A | 2/2000 | Horvitz et al. |
| 6,068,485 A | 5/2000 | Linebarger et al. |
| 6,083,104 A | 7/2000 | Choi |
| 6,107,938 A | 8/2000 | Du et al. |
| 6,112,181 A | 8/2000 | Shear et al. |
| 6,130,606 A | 10/2000 | Flick |
| 6,160,926 A | 12/2000 | Dow et al. |
| 6,167,255 A | 12/2000 | Kennedy, III et al. |
| 6,169,902 B1 | 1/2001 | Kawamoto |
| 6,182,006 B1 | 1/2001 | Meek |
| 6,184,780 B1 | 2/2001 | Allen et al. |
| 6,230,170 B1 | 5/2001 | Zellweger et al. |
| 6,253,058 B1 | 6/2001 | Murasaki et al. |
| 6,256,378 B1 | 7/2001 | Iggulden et al. |
| 6,259,362 B1 | 7/2001 | Lin |
| 6,259,409 B1 | 7/2001 | Fulton et al. |
| 6,271,835 B1 | 8/2001 | Hoeksma |
| 6,308,120 B1 | 10/2001 | Good |
| 6,321,158 B1 | 11/2001 | DeLorme et al. |
| 6,344,793 B1 | 2/2002 | Geck et al. |
| 6,366,198 B1 | 4/2002 | Allen et al. |
| 6,377,825 B1 | 4/2002 | Kennedy et al. |
| 6,385,541 B1 | 5/2002 | Blumberg et al. |
| 6,462,660 B1 | 10/2002 | Cannon et al. |
| 6,463,343 B1 | 10/2002 | Emens et al. |
| 6,466,899 B1 | 10/2002 | Yano et al. |
| 6,480,098 B2 | 11/2002 | Flick |
| 6,490,493 B1 | 12/2002 | Dharnipragada |
| 6,526,335 B1 | 2/2003 | Treyz et al. |
| 6,542,163 B2 | 4/2003 | Gorbet et al. |
| 6,542,814 B2 | 4/2003 | Polidi et al. |
| 6,556,899 B1 | 4/2003 | Harvey et al. |
| 6,584,496 B1 | 6/2003 | Ludtke |
| 6,608,650 B1 | 8/2003 | Torres et al. |
| 6,611,739 B1 | 8/2003 | Harvey et al. |
| 6,628,233 B2 | 9/2003 | Knockeart et al. |
| 6,639,550 B2 | 10/2003 | Knockeart et al. |
| 6,647,328 B2 | 11/2003 | Walker |
| 6,650,902 B1 | 11/2003 | Richton |
| 6,651,053 B1 | 11/2003 | Rothschild |
| 6,664,924 B2 | 12/2003 | Knockheart et al. |
| 6,680,694 B1 | 1/2004 | Knockeart et al. |
| 6,681,174 B1 | 1/2004 | Harvey et al. |
| 6,707,421 B1 | 3/2004 | Drury et al. |
| 6,711,474 B1 | 3/2004 | Treyz et al. |
| 6,727,830 B2 | 4/2004 | Lui et al. |
| 6,784,832 B2 | 8/2004 | Knockeart et al. |
| 6,788,313 B1 | 9/2004 | Heil |
| 6,795,011 B1 | 9/2004 | Berthoud et al. |
| 6,799,205 B2 | 9/2004 | Ludtke |
| 6,812,888 B2 | 11/2004 | Drury et al. |
| 6,816,881 B1 | 11/2004 | Mohindra et al. |
| 6,819,986 B2 | 11/2004 | Hong et al. |
| 6,823,188 B1 | 11/2004 | Stern |
| 6,829,668 B2 | 12/2004 | Keskar et al. |
| 6,832,092 B1 * | 12/2004 | Suarez ................ H04W 84/08 455/456.1 |
| 6,845,486 B2 | 1/2005 | Yamada et al. |
| 6,873,840 B1 | 3/2005 | Von Alten |
| 6,874,037 B1 | 3/2005 | Abram et al. |
| 6,879,828 B2 | 4/2005 | Virtanen et al. |
| 6,882,712 B1 | 4/2005 | Iggulden et al. |
| 6,892,936 B2 | 5/2005 | Riggert et al. |
| 6,904,565 B1 | 6/2005 | Lentz |
| 6,909,398 B2 | 6/2005 | Knockeart et al. |
| 6,919,792 B1 | 7/2005 | Battini et al. |
| 6,920,612 B2 | 7/2005 | Makinen |
| 6,967,576 B2 | 11/2005 | Hayes et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,043,691 B1 | 5/2006 | Kwon et al. |
| 7,055,737 B1 | 6/2006 | Tobin et al. |
| 7,065,348 B1 | 6/2006 | Aoki |
| 7,068,163 B2 | 6/2006 | Sari et al. |
| 7,082,365 B2 | 7/2006 | Sheha et al. |
| 7,103,556 B2 | 9/2006 | Del Rey et al. |
| 7,107,081 B1 | 9/2006 | Fujisaki |
| 7,129,927 B2 | 10/2006 | Mattsson |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,202,783 B2 | 4/2007 | Want et al. |
| 7,212,827 B1 | 5/2007 | Veschl |
| 7,224,262 B2 | 5/2007 | Simon et al. |
| 7,231,496 B2 | 6/2007 | Curtis |
| 7,240,067 B2 | 7/2007 | Timmons |
| 7,245,258 B2 | 7/2007 | Velhal et al. |
| 7,254,779 B1 | 8/2007 | Rezvani et al. |
| 7,259,357 B2 | 8/2007 | Walker |
| 7,277,884 B2 | 10/2007 | Vadai et al. |
| 7,286,857 B1 | 10/2007 | Walker et al. |
| 7,293,034 B2 | 11/2007 | Paya et al. |
| 7,312,712 B1 | 12/2007 | Worrall |

(56) References Cited

U.S. PATENT DOCUMENTS

| | | |
|---|---|---|
| 7,327,226 B2 | 2/2008 | Turnbull et al. |
| 7,332,998 B2 | 2/2008 | Beehler et al. |
| 7,346,015 B2 | 3/2008 | Shipman |
| 7,446,655 B2 | 11/2008 | Jha et al. |
| 7,457,628 B2 | 11/2008 | Blumberg et al. |
| 7,490,763 B2 | 2/2009 | Keohane et al. |
| 7,548,697 B2 | 6/2009 | Hudson et al. |
| 7,643,913 B2 | 1/2010 | Taki et al. |
| 7,664,736 B2 | 2/2010 | Jung et al. |
| 7,684,321 B2 | 3/2010 | Muirhead et al. |
| 7,694,881 B2 | 4/2010 | Jung et al. |
| 7,725,077 B2 | 5/2010 | Jung et al. |
| 7,798,401 B2 | 9/2010 | Jung et al. |
| 7,840,427 B2 | 11/2010 | O'Sullivan |
| 7,876,706 B2 | 1/2011 | Ekl et al. |
| 7,899,468 B2 | 3/2011 | Lohtia et al. |
| 7,922,086 B2 | 4/2011 | Jung et al. |
| 7,957,871 B1 * | 6/2011 | Echeruo ............. G01C 21/3423 104/27 |
| 8,009,121 B1 | 8/2011 | Stuart et al. |
| 8,046,004 B2 | 10/2011 | Tsuchiya |
| 8,126,400 B2 | 2/2012 | Jung et al. |
| 8,180,293 B2 | 5/2012 | Jung et al. |
| 8,271,876 B2 | 9/2012 | Brugler et al. |
| 8,282,003 B2 | 10/2012 | Jung et al. |
| 8,284,034 B2 | 10/2012 | Stewart et al. |
| 8,358,976 B2 | 1/2013 | Jung et al. |
| 8,406,791 B1 | 3/2013 | Daily et al. |
| 8,504,090 B2 | 8/2013 | Klein et al. |
| 8,538,331 B2 | 9/2013 | Jung et al. |
| 8,626,366 B2 | 1/2014 | Noffsinger et al. |
| 8,660,498 B2 | 2/2014 | Gurney et al. |
| 8,688,532 B2 | 4/2014 | Khunger et al. |
| 8,712,857 B1 | 4/2014 | Adornato et al. |
| 8,762,839 B2 | 6/2014 | Jung et al. |
| 8,775,070 B1 * | 7/2014 | Bhatia ................ G01C 21/3461 701/425 |
| 8,831,677 B2 | 9/2014 | Villa-Real |
| 9,038,899 B2 | 5/2015 | Jung et al. |
| 9,307,577 B2 | 4/2016 | Jung et al. |
| 9,483,744 B2 | 11/2016 | Lord et al. |
| 9,488,484 B2 | 11/2016 | Lord et al. |
| 9,552,559 B2 | 1/2017 | Lord et al. |
| 9,569,740 B2 | 2/2017 | Lord et al. |
| 9,599,481 B2 | 3/2017 | Lord et al. |
| 9,621,701 B2 | 4/2017 | Jung et al. |
| 9,671,239 B2 | 6/2017 | Lord et al. |
| 9,689,694 B2 | 6/2017 | Lord et al. |
| 9,715,667 B2 | 7/2017 | Lord et al. |
| 9,767,423 B2 | 9/2017 | Lord et al. |
| 9,886,671 B2 | 2/2018 | Lord et al. |
| 9,939,279 B2 | 4/2018 | Pan et al. |
| 9,946,978 B2 * | 4/2018 | Francis ................ G06Q 10/025 |
| 9,959,512 B2 | 5/2018 | Camp et al. |
| 2001/0025558 A1 | 10/2001 | Ishida |
| 2001/0049277 A1 | 12/2001 | Meyer et al. |
| 2001/0050611 A1 | 12/2001 | Achterholt |
| 2001/0052858 A1 | 12/2001 | Vincent et al. |
| 2001/0055976 A1 | 12/2001 | Crouch et al. |
| 2002/0002552 A1 | 1/2002 | Schultz et al. |
| 2002/0004703 A1 | 1/2002 | Gaspard, II |
| 2002/0007225 A1 | 1/2002 | Costello et al. |
| 2002/0019881 A1 | 2/2002 | Bokhari et al. |
| 2002/0021288 A1 | 2/2002 | Schug |
| 2002/0022961 A1 | 2/2002 | Sepanaho |
| 2002/0023144 A1 | 2/2002 | Linyard et al. |
| 2002/0032497 A1 | 3/2002 | Jorgenson et al. |
| 2002/0032510 A1 | 3/2002 | Turnbull et al. |
| 2002/0038384 A1 | 3/2002 | Kahn et al. |
| 2002/0062280 A1 | 5/2002 | Zachariassen et al. |
| 2002/0069030 A1 | 6/2002 | Xydis |
| 2002/0072347 A1 | 6/2002 | Dunko et al. |
| 2002/0075243 A1 | 6/2002 | Newton |
| 2002/0083025 A1 | 6/2002 | Robarts et al. |
| 2002/0084893 A1 | 7/2002 | Eisenman |
| 2002/0087279 A1 | 7/2002 | Hall |
| 2002/0105550 A1 | 8/2002 | Biebesheimer et al. |
| 2002/0105582 A1 | 8/2002 | Ikeda |
| 2002/0107610 A1 | 8/2002 | Kaehler et al. |
| 2002/0120459 A1 | 8/2002 | Dick et al. |
| 2002/0123880 A1 | 9/2002 | Brown |
| 2002/0130765 A1 | 9/2002 | Flick |
| 2002/0133545 A1 | 9/2002 | Fano et al. |
| 2002/0137505 A1 | 9/2002 | Eiche et al. |
| 2002/0152173 A1 | 10/2002 | Rudd |
| 2002/0164997 A1 | 11/2002 | Parry et al. |
| 2002/0186144 A1 | 12/2002 | Meunier |
| 2003/0016238 A1 | 1/2003 | Sullivan et al. |
| 2003/0018428 A1 | 1/2003 | Knockeart et al. |
| 2003/0018742 A1 | 1/2003 | Imago |
| 2003/0020759 A1 | 1/2003 | Cancilla et al. |
| 2003/0022701 A1 | 1/2003 | Gupta |
| 2003/0032426 A1 | 2/2003 | Gilbert et al. |
| 2003/0034998 A1 | 2/2003 | Kodosky et al. |
| 2003/0035075 A1 | 2/2003 | Butler et al. |
| 2003/0040944 A1 | 2/2003 | Hileman |
| 2003/0043178 A1 | 3/2003 | Gusler et al. |
| 2003/0048288 A1 | 3/2003 | Drif et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0058266 A1 | 3/2003 | Dunlap et al. |
| 2003/0058267 A1 | 3/2003 | Warren |
| 2003/0064805 A1 | 4/2003 | Wells |
| 2003/0067541 A1 | 4/2003 | Joao |
| 2003/0069673 A1 | 4/2003 | Hong et al. |
| 2003/0098876 A1 | 5/2003 | Makinen |
| 2003/0100964 A1 | 5/2003 | Kluge et al. |
| 2003/0101178 A1 | 5/2003 | Miyata et al. |
| 2003/0110035 A1 | 6/2003 | Thong et al. |
| 2003/0123446 A1 | 7/2003 | Murihead et al. |
| 2003/0125057 A1 | 7/2003 | Pesola |
| 2003/0125963 A1 | 7/2003 | Haken |
| 2003/0132854 A1 | 7/2003 | Swan et al. |
| 2003/0160824 A1 | 8/2003 | Szumla |
| 2003/0186734 A1 | 10/2003 | LeMay et al. |
| 2003/0191820 A1 | 10/2003 | Ludtke |
| 2003/0192947 A1 | 10/2003 | Toedtli |
| 2003/0193404 A1 | 10/2003 | Joao |
| 2003/0206102 A1 | 11/2003 | Joao |
| 2003/0218629 A1 | 11/2003 | Terashima et al. |
| 2003/0222897 A1 | 12/2003 | Moore et al. |
| 2003/0227392 A1 | 12/2003 | Ebert et al. |
| 2004/0034651 A1 | 2/2004 | Gupta et al. |
| 2004/0049324 A1 | 3/2004 | Walker |
| 2004/0049336 A1 | 3/2004 | Knockeart et al. |
| 2004/0049337 A1 | 3/2004 | Knockeart et al. |
| 2004/0056797 A1 | 3/2004 | Knockeart et al. |
| 2004/0064245 A1 | 4/2004 | Knockeart et al. |
| 2004/0064248 A1 | 4/2004 | Holze et al. |
| 2004/0066330 A1 | 4/2004 | Knockeart et al. |
| 2004/0067773 A1 | 4/2004 | Rachabathuni et al. |
| 2004/0076444 A1 | 4/2004 | Badovinac et al. |
| 2004/0078721 A1 | 4/2004 | Williams |
| 2004/0088228 A1 | 5/2004 | Mercer et al. |
| 2004/0088696 A1 | 5/2004 | Kawano et al. |
| 2004/0090451 A1 | 5/2004 | Lay et al. |
| 2004/0093102 A1 | 5/2004 | Liiri et al. |
| 2004/0095480 A1 | 5/2004 | Battles et al. |
| 2004/0103153 A1 | 5/2004 | Chang et al. |
| 2004/0104842 A1 | 6/2004 | Drury et al. |
| 2004/0107043 A1 | 6/2004 | de Silva |
| 2004/0107144 A1 | 6/2004 | Short |
| 2004/0111273 A1 | 6/2004 | Sakagami et al. |
| 2004/0117131 A1 | 6/2004 | Peters et al. |
| 2004/0117634 A1 | 6/2004 | Letterer et al. |
| 2004/0121764 A1 | 6/2004 | Rivero |
| 2004/0128613 A1 | 7/2004 | Sinisi |
| 2004/0136574 A1 | 7/2004 | Kozakaya et al. |
| 2004/0139180 A1 | 7/2004 | White et al. |
| 2004/0162896 A1 | 8/2004 | Cen et al. |
| 2004/0174434 A1 | 9/2004 | Walker et al. |
| 2004/0179545 A1 | 9/2004 | Erola et al. |
| 2004/0183676 A1 | 9/2004 | Eisenman |

(56) References Cited

U.S. PATENT DOCUMENTS

| | | |
|---|---|---|
| 2004/0196179 A1 | 10/2004 | Turnbull |
| 2004/0201633 A1 | 10/2004 | Barsness et al. |
| 2004/0201867 A1 | 10/2004 | Katano |
| 2004/0203381 A1 | 10/2004 | Cahn et al. |
| 2004/0204129 A1 | 10/2004 | Payne et al. |
| 2004/0205191 A1 | 10/2004 | Smith et al. |
| 2004/0242224 A1 | 12/2004 | Janik et al. |
| 2004/0260407 A1 | 12/2004 | Wimsatt |
| 2004/0260470 A1 | 12/2004 | Rast |
| 2005/0006478 A1 | 1/2005 | Patel |
| 2005/0021225 A1* | 1/2005 | Kantarjiev ........... G08G 1/0112 701/527 |
| 2005/0055287 A1 | 3/2005 | Schmidtberg et al. |
| 2005/0060436 A1 | 3/2005 | Kienhoefer |
| 2005/0064814 A1 | 3/2005 | Matsuo et al. |
| 2005/0073388 A1 | 4/2005 | Lee et al. |
| 2005/0076302 A1 | 4/2005 | Okamoto |
| 2005/0080879 A1 | 4/2005 | Kim et al. |
| 2005/0080902 A1 | 4/2005 | Parupudi et al. |
| 2005/0081152 A1 | 4/2005 | Commarford et al. |
| 2005/0088280 A1 | 4/2005 | Beehler et al. |
| 2005/0108044 A1 | 5/2005 | Koster |
| 2005/0136903 A1 | 6/2005 | Kashima et al. |
| 2005/0154985 A1 | 7/2005 | Burkhart et al. |
| 2005/0160270 A1 | 7/2005 | Goldberg et al. |
| 2005/0168071 A1 | 8/2005 | Durbin et al. |
| 2005/0203752 A1 | 9/2005 | Shinada |
| 2005/0219223 A1 | 10/2005 | Kotzin et al. |
| 2005/0228869 A1 | 10/2005 | Imago |
| 2005/0262062 A1 | 11/2005 | Xia |
| 2005/0268234 A1 | 12/2005 | Rossi, Jr. et al. |
| 2006/0026304 A1 | 2/2006 | Price |
| 2006/0028428 A1 | 2/2006 | Dai et al. |
| 2006/0031517 A1 | 2/2006 | Gossweiler et al. |
| 2006/0055805 A1 | 3/2006 | Stockton et al. |
| 2006/0061458 A1 | 3/2006 | Simon et al. |
| 2006/0073815 A1 | 4/2006 | Pines et al. |
| 2006/0076398 A1 | 4/2006 | Jung et al. |
| 2006/0080188 A1 | 4/2006 | Jung et al. |
| 2006/0081695 A1 | 4/2006 | Jung et al. |
| 2006/0086781 A1 | 4/2006 | Jung et al. |
| 2006/0090132 A1 | 4/2006 | Jung et al. |
| 2006/0092033 A1 | 5/2006 | Hoff et al. |
| 2006/0097855 A1 | 5/2006 | Turnbull et al. |
| 2006/0100912 A1 | 5/2006 | Kumar et al. |
| 2006/0115802 A1 | 6/2006 | Reynolds |
| 2006/0116979 A1 | 6/2006 | Jung et al. |
| 2006/0117001 A1 | 6/2006 | Jung et al. |
| 2006/0157550 A1 | 7/2006 | Jung et al. |
| 2006/0164239 A1 | 7/2006 | Loda |
| 2006/0170687 A1 | 8/2006 | Nakamura et al. |
| 2006/0173816 A1 | 8/2006 | Jung et al. |
| 2006/0190428 A1 | 8/2006 | Jung et al. |
| 2006/0206817 A1 | 9/2006 | Jung et al. |
| 2006/0214813 A1 | 9/2006 | Witkowski et al. |
| 2006/0226949 A1 | 10/2006 | Reene |
| 2006/0232377 A1 | 10/2006 | Witkowski |
| 2006/0261931 A1 | 11/2006 | Cheng |
| 2007/0005233 A1 | 1/2007 | Pinkus et al. |
| 2007/0008189 A1 | 1/2007 | Amari et al. |
| 2007/0027595 A1 | 2/2007 | Nou |
| 2007/0027903 A1 | 2/2007 | Evans et al. |
| 2007/0032225 A1 | 2/2007 | Konicek et al. |
| 2007/0033414 A1 | 2/2007 | Dunko |
| 2007/0038529 A1 | 2/2007 | Jung et al. |
| 2007/0040013 A1 | 2/2007 | Jung et al. |
| 2007/0064644 A1 | 3/2007 | Dowling et al. |
| 2007/0152798 A1 | 7/2007 | Witkowski |
| 2007/0176736 A1 | 8/2007 | Chuey et al. |
| 2007/0197172 A1 | 8/2007 | Witkowski et al. |
| 2007/0201381 A1 | 8/2007 | Ekl et al. |
| 2007/0201382 A1 | 8/2007 | Ekl et al. |
| 2007/0204021 A1 | 8/2007 | Ekl et al. |
| 2007/0224937 A1 | 9/2007 | Jung et al. |
| 2007/0224938 A1 | 9/2007 | Jung et al. |
| 2007/0270159 A1 | 11/2007 | Lohtia et al. |
| 2008/0027590 A1 | 1/2008 | Phillips et al. |
| 2008/0061967 A1 | 3/2008 | Corrado |
| 2008/0063400 A1 | 3/2008 | Hudson et al. |
| 2008/0065274 A1 | 3/2008 | Taki et al. |
| 2008/0068205 A1 | 3/2008 | Witkowski |
| 2008/0086241 A1 | 4/2008 | Phillips et al. |
| 2008/0091309 A1 | 4/2008 | Walker |
| 2008/0103640 A1 | 5/2008 | Watanabe et al. |
| 2008/0103655 A1 | 5/2008 | Turnbull et al. |
| 2008/0129449 A1 | 6/2008 | Beehler et al. |
| 2008/0143686 A1 | 6/2008 | Yeh et al. |
| 2008/0164972 A1 | 7/2008 | Taki et al. |
| 2008/0183376 A1 | 7/2008 | Knockeart et al. |
| 2008/0195428 A1 | 8/2008 | O'Sullivan |
| 2008/0229198 A1 | 9/2008 | Jung et al. |
| 2008/0266254 A1 | 10/2008 | Robbins et al. |
| 2008/0309451 A1 | 12/2008 | Zellweger et al. |
| 2009/0005963 A1 | 1/2009 | Jarvinen |
| 2009/0037033 A1 | 2/2009 | Phillips et al. |
| 2009/0216600 A1 | 8/2009 | Hill |
| 2009/0248587 A1 | 10/2009 | Van Buskirk |
| 2010/0005153 A1 | 1/2010 | Tsao |
| 2010/0146390 A1 | 6/2010 | Jung et al. |
| 2010/0207812 A1 | 8/2010 | Demirdjian et al. |
| 2010/0218095 A1 | 8/2010 | Jung et al. |
| 2010/0223162 A1 | 9/2010 | Jung et al. |
| 2010/0253507 A1 | 10/2010 | Jung et al. |
| 2010/0255785 A1 | 10/2010 | Jung et al. |
| 2010/0280748 A1 | 11/2010 | Mundinger et al. |
| 2010/0280853 A1* | 11/2010 | Petralia ................. G06Q 10/02 705/5 |
| 2010/0280884 A1* | 11/2010 | Levine ............... G01C 21/3438 705/13 |
| 2010/0309011 A1 | 12/2010 | Jung et al. |
| 2010/0332131 A1 | 12/2010 | Horvitz et al. |
| 2011/0059693 A1 | 3/2011 | O'Sullivan |
| 2011/0145089 A1 | 6/2011 | Khunger et al. |
| 2011/0224893 A1* | 9/2011 | Scofield ............. G01C 21/3492 701/119 |
| 2011/0237287 A1 | 9/2011 | Klein et al. |
| 2011/0257883 A1 | 10/2011 | Kuznetsov |
| 2011/0288762 A1 | 11/2011 | Kuznetsov |
| 2012/0041675 A1 | 2/2012 | Juliver et al. |
| 2012/0109721 A1 | 5/2012 | Cebon et al. |
| 2012/0112696 A1 | 5/2012 | Ikeda et al. |
| 2012/0253654 A1 | 10/2012 | Sun et al. |
| 2013/0054139 A1 | 2/2013 | Bodin et al. |
| 2013/0095757 A1 | 4/2013 | Abdelsamie et al. |
| 2013/0131909 A1 | 5/2013 | Cooper et al. |
| 2013/0158861 A1 | 6/2013 | Lerenc |
| 2013/0158869 A1 | 6/2013 | Lerenc |
| 2013/0226365 A1 | 8/2013 | Brozovich |
| 2013/0237156 A1 | 9/2013 | Jung et al. |
| 2013/0237273 A1 | 9/2013 | Klein et al. |
| 2013/0244713 A1 | 9/2013 | Klein et al. |
| 2013/0244714 A1 | 9/2013 | Klein et al. |
| 2013/0310101 A1 | 11/2013 | Klein et al. |
| 2013/0344859 A1 | 12/2013 | Abramson et al. |
| 2014/0012498 A1 | 1/2014 | Gustafson et al. |
| 2014/0094998 A1 | 4/2014 | Cooper et al. |
| 2014/0171013 A1* | 6/2014 | Varoglu ................. H04W 4/90 455/404.2 |
| 2014/0173511 A1 | 6/2014 | Lehmann et al. |
| 2014/0342670 A1 | 11/2014 | Kang et al. |
| 2015/0006005 A1 | 1/2015 | Yu et al. |
| 2015/0006072 A1* | 1/2015 | Goldberg ............... G06Q 50/30 701/408 |
| 2015/0019132 A1 | 1/2015 | Gusikhin et al. |
| 2015/0025932 A1 | 1/2015 | Ross et al. |
| 2015/0081362 A1* | 3/2015 | Chadwick ........ G06Q 10/06311 705/7.14 |
| 2015/0094093 A1 | 4/2015 | Pierce et al. |
| 2015/0141043 A1 | 5/2015 | Abramson et al. |
| 2015/0161564 A1* | 6/2015 | Sweeney ........ G06Q 10/063114 705/338 |
| 2015/0278759 A1 | 10/2015 | Harris et al. |
| 2015/0294431 A1 | 10/2015 | Fiorucci |
| 2015/0312404 A1 | 10/2015 | Abramson et al. |

(56) References Cited

U.S. PATENT DOCUMENTS

| | | |
|---|---|---|
| 2015/0317100 A1 | 11/2015 | Shimohata et al. |
| 2015/0323333 A1 | 11/2015 | Lord et al. |
| 2015/0323336 A1 | 11/2015 | Lord et al. |
| 2015/0324717 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |
| 2016/0034845 A1 | 2/2016 | Hiyama et al. |
| 2016/0202079 A1* | 7/2016 | Konig ............... G01C 21/3423 701/533 |
| 2017/0223164 A1 | 8/2017 | Jung et al. |

FOREIGN PATENT DOCUMENTS

| | | | |
|---|---|---|---|
| JP | 6-224832 | A | 8/1994 |
| JP | 2002-123349 | A | 4/2002 |
| JP | 2003-030207 | A | 1/2003 |
| JP | 2003-084954 | A | 3/2003 |
| JP | 2003-114897 | A | 4/2003 |
| JP | 2003-128253 | A | 5/2003 |
| JP | 2003-228451 | A | 8/2003 |
| JP | 2010-048824 | A | 3/2010 |
| JP | 2012-215921 | A | 11/2012 |
| KR | 10-2007-0049336 | A | 5/2007 |
| KR | 10-2010-0053717 | A | 5/2010 |
| KR | 10-2103-0040430 | A | 4/2013 |
| KR | 10-2013-0051265 | A | 5/2013 |
| KR | 10-2014-0041665 | A | 4/2014 |

OTHER PUBLICATIONS

Fougeres et al; "A Push Service for Carpooling"; bearing a date of 2012 (created on Dec. 8, 2015); IEEE; 2012 IEEE International Conference on Green Computing and Communications, Conference on Internet of Things, and Conference on Cyber, Physical and Social Computing; pp. 685-691; IEEE Computer Society.

Megalingam et al; "Automated Wireless Carpooling System for an Eco-Friendly Travel"; bearing a date of 2011 (created on Dec. 8, 2015); IEEE; pp. 325-329.

Vaughn-Nichols, Steven J.; "Will Mobile Computing's Future be Location, Location, Location?"; IEEE; bearing a date of Feb. 2009; pp. 14-17; IEEE Computer Society.

Dillenburg et al.; "The Intelligent Travel Assistant"; The IEEE 5th International conference on Intelligent Transportation Systems; Sep. 3-6, 2002; pp. 691-696; IEEE.

Guc et al.; "Real-time, Scalable Route Planning using a Stream-Processing Infrastructure"; 2010 13th International IEEE Annual Conference on Intelligent Transportation Systems; Sep. 19-22, 2010; pp. 986-991; IEEE.

Lalos et al.; "A Framework for dynamic car and taxi pools with the use of Positioning Systems"; 2009 Computation World: Future Computing, Service Computation, Cognitive, Adaptive, Content, Patterns; bearing a date of 2009; pp. 385-391; IEEE Computer Society.

Shahzada et al.; "Dynamic Vehicle Navigation: An A* Algorithm Based Approach Using Traffic and Road Information"; 2011 International Conference on Computer Applications and Industrial Electronics; bearing a date of 2011; pp. 514-518; IEEE.

Amey et al.; "'Real-Time' Ridesharing—The Opportunities and Challenges of Utilizing Mobile Phone Technology to Improve Rideshare Services"; Paper submitted to the 2011 Transportation Research Board Annual Meeting; bearing a date of Aug. 1, 2010; pp. 1-17.

Lalos et al.; "A Framework for dynamic car and taxi pools with the use of Positioning System"; IEEE Computer Society; 2009 Computational World: Future Computing, Service Computation, Cognitive, Adaptive, Content, Patterns; pp. 385-391; IEEE 2009.

European Patent Office, Partial Supplementary European Search Report, Pursuant to Rule 164(1) EPC; App. No. EP 15 78 8789; dated Dec. 19, 2017; pp. 1-19.

Duchon et aL, "Distributed Cooperative On-Demand Transportation," IEEE, pg. 1-5 (2011).

Garofalaki et al., "Transport Services within the loT Ecosystem using Localisation Parameters," IEEE, pg. 1-6 (2016).

Morenz et al., "An Estimation-based Automatic Vehicle Location System for Public Transport Vehicles," IEEE, pg. 350-856 (2008).

Shengguang et aL, "Internet of Things for Special Materials Transportation Vehicles," IEEE, pg. 1891-1894 (2013).

Excerpt from The Cambridge Dictionary Online; dated 2009; printed on Oct. 23, 2009; pp. 1-2; Cambridge University Press; locatedd at: http://dictionary.cambridge.org/define.asp?key=%206453&dict=CALD (as provided by examiner).

Heywood, "Drew Heywood's Windows 2000 Network Services"; dated Feb. 28, 2001; printed on Mar. 13, 2008; pp. 1-17; Publisher: Sams; located at: http//proquest.safaribooksonline.com/print?xmlid=0672317419/ch0 1 levlsec4.

Alexander et al., "IBM Business Consulting Services — Applying Auto-ID to Reduce Losses Associated with Shrink"; Auto-ID Center Massachusetts Institute of Technology; dated Nov. 1, 2002, Feb. 1, 2003, Jun. 2002 and Nov. 2002; pp. 1-56; printed on Feb. 3, 2005; Auto-ID Center, IBM-AUTOID-BC-003; located at: http://quintessenz.org/rfid.docs/www.autoidcenter.org/publishedresearch/ibm-autoid-bc-003.pdf.

ProfitLogic, "Capabilities"; pp. 1-2; printed on Feb. 3, 2005; located at: http://www.profitlogic.com/capabilities.htm.

Emigh, "IBM Unleashes New Rfid Middlewear"; eWeek Enterprise News & Reviews, Health Care Technology Experts; dated Dec. 16, 2004 and 2005; pp. 1-2; located at: http://www.eweek.com/printarticle2/0,2533,a=141068,00.asp.

"EPC RFID-based Inventory Management Solution Delivers Faster, Better Goods Logistics"; solution Architects; dated 2003; pp. 1-15; printed on Jan. 10, 2005; located at: www.intel.com/business/bss/solutions/blueprints/pdf/30034101.pdf.

"Get real time warehouse management with Cadence WMS"; Cadre Cadence Warehouse Management System Software; p. 1; printed on Jan. 10, 2005; located at: http://www.cadretech.com/warehouse_mgmt.html.

"IBM RFID solution for asset tracking and inventory management"; pp. 1-3; printed on Feb. 3, 2005; located at: http://www-1.ibm.com/industries/wireless/doc/content/solution/1025230104.html.

"IBM RFID solution for asset tracking and inventory management"; pp. 1-3; printed on Feb. 3, 2005; located at: http://www-1.ibm.com/industries/wireless/doc/content/solution/1025230204.html.

Kuchinskas, "IBM in Major RFID Expansion"; Jupiterimages; dated Sep. 27, 2004; pp. 1-2; printed on Feb. 3, 2005; located at: http://www.internetnews.com/wireless/print.php/3412991.

Kuchinskas, "IBM Takes on Flood of RFID Data"; Jupiterimages; dated Jul. 19, 2004; pp. 1-3; printed on Feb. 3, 2005; located at: http://www.internetnews.com/ent-news/print.php/3382621.

"Nordstrom: Inventory Management Transformation"; Accenture.com; dated 1995-2005; pp. 1-2; printed on Feb. 3, 2005; located at: http://www.accenture.com/xd/xd.asp?it=enweb&xd=industries%5Cproducts%5Cretail%5Ccase%5Cr eta_Nordstrom.xml.

ProfitLogic, "Solutions"; pp. 1-2; printed on Feb. 3, 2005; located at: http://www.profitlogic.com/solutions.htm.

"The EPCglobal Network™: Overview of Design, Benefits, & Security"; EPCglobal Inc.; dated Sep. 24, 2004; pp. 1-11; printed on Feb. 3, 2005; located at: http://www.epcglobalinc.org/news/position_papers.html.

photo.net, "How to prevent condensation in camera/lens? What cause it?", https://www.photo.net/discuss/threads/how-to-prevent-condensation-in-camera-lens-what-cause-it.77624/; dated Nov. 2, 2003, printout pp. 1-2.

"Electronic Device", Wikipedia; dated 2003-2015; printed on Jun. 8, 2015; pp. 1-2; located at: http://www.thefreedictionary.com/electronic+device.

"Input Device", Wikipedia; dated Jun. 6, 2015; printed on Jun. 8, 2015; pp. 1-4; located at: http://en.wikipedia.org/wiki/Inputdevice.

"Applications: eCash on the Move at Volkswagen," iButton Applications, Dallas Semiconductor Maxim, dated 2006; pp. 1-2; printed on Feb. 27, 2006; located at http://www.maxim-ic.com/products/ibutton/applications/index.cfm?Action=Dd&id=21; Maxim Integrated Products.

(56) References Cited

OTHER PUBLICATIONS

"Applications: Mass Transit in Istanbul, Turkey," and "Parking in Argentina," iButton Applications, Dallas Semiconductor Maxim; dated 2006, pp. 1-3, printed on Feb. 27, 2006; located at: http://www.maxim-ic.com/products/ibutton/applications/index.cfm?Action=Dd&id=8; Maxim Integrated Products.

Cameron et al., "Knuckletop Computing: The Java Ring," pp. 1-4; located at: http://java.sun.com/features/1998/03/rings.html.

"Cellport Announces First Universal, Hands-Free Cell Phone System for Cars," Intelligent Transportation Society of America; dated Jul. 16, 2001, pp. 1-2, printed on Feb. 24, 2006; located at: http://www.itsa.org/itsnews.nsf/key/5FAA?OpenDocument.

"City of Caen, France, to demonstrate simplicity of Near Field Communication (NFC) technology," dated Oct. 18, 2005; pp. 1-3, printed on Mar. 20, 2006; located at: http://www.semiconductors.philips.com/news/content/file_1193.html; Koninklijke Philips Electronics N.V.

"Ecma welcomes ISO/IEC adoption of NFC Standard for short range wireless communication," ECMA International; dated Dec. 8, 2003; pp. 1-3, printed on Feb. 24, 2006; located at: http://www.ecma-international.org/news/Ecma-340-NFCIP-1.htm.

Kiser, "Newall Electronics Introduces Wearable DRO Technology," Industrial Product News Online; pp. 1-2; printed on Feb. 24, 2006; located at: http://www.ipnews.com/archives/dro/jan02/newall%5Felect.htm.

Lewis, "Put on your human-machine interface," Design News; dated Aug. 20, 2001 and 1997-2006; pp. 1-4; printed on Feb. 24, 2006; located at: http//designnews.com/article/CA150040.html; Reed Business Information.

"Near Field Communication: Encyclopedia," What You Need to Know About; dated 2006; pp. 1-3; printed on Mar. 3, 2006; located at: http://experts.about.com/e/n/ne/Near_Field_Communication.htm; About, Inc.

"Near Field Communication," Wikipedia; dated Feb. 17, 2006; pp. 1-2; printed on Feb. 24, 2006; located at: http://en.wikipedia.org/wiki/Near_Field_Communication.

"Near Field Communication, White Paper," dated 2005; pgs. 1-9; located at: http://www.ecma-international.org/activities/Communications/tc32-tg19-2005-012.pdf; ECMA International.

"Near field communication set for full-scale trial," dated Oct. 20, 2005, pp. 1-3; printed on Mar. 20, 2006; located at: http://www.electronicstalk.com/news/phi/phi328.html; Pro-Talk Ltd, UK.

"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center," dated Feb. 7, 2006, pp. 1-4; printed on Mar. 20, 2006; located at: http://home.Businesswire.com/portal/site/google/indexj sp?ndmView=news_view&newsId=2006020 7005492&newsLang=en; Business Wire.

"Secure Website Logon and Transactions," iButton Applications; dated 2004; pp. 1-2; printed on Mar. 3, 2006; located at: http://72.14.207.104/search?q=cache:4JM396tN_ToJ:db.maxim-ic.com/ibutton/applications/index.cfm; Maxim/Dallas Semiconductor Corp.

Swedberg, "Developing RFID-Enabled Phones," RFID Journal; dated Jul. 9, 2004 and 2002-2006; pp. 1-3; printed on Mar. 20, 2006; located at: http://www.rfidjournal.com/article/articleview/2020/1/1/; RFID Journal, LLC.

Thomson, "Industry giants tout touch computing," Computing, dated Mar. 19, 2004 and 1995-2006; pp. 1-2; printed on Feb. 24, 2006; located at: http://www.computing.co.uk/vnunet/news/2124597/industry-giants-tout-touch-computing; vnu business publications.

"About Near Field Communication," undated; pp. 1-2; NFC-Forum; located at: http://www.nfc-forum.org/aboutnfc/.

Oswald, "blinkx Looks to Make Search Automatic," BetaNews; dated Mar. 7, 2006 and 1998-2006, pp. 1-6; printed on Mar. 22, 2006; BetaNews, Inc.; located at: http://www.betanews.com/article/blinkx_Looks_to_Make_Search_Automatic/1141754474.

"Welcome," NFC-Forum; dated 2005; pp. 1-2; printed on May 31, 2006; located at: http://www.nfc-forum.org/home; NFC Forum.

\* cited by examiner

**202\* Request Receiving Module**

302 End User Preference Data Receiving Module

FIG. 3A

**206\* Transportation Vehicle Unit Guiding Module**

340 Instruction Transmitting Module

342 Transportation Information Transmitting Module

344 Request Transmitting Module

346 Confirmation Receiving Module

348 End User Detecting Module

350 Transportation Vehicle Unit Detecting Module

FIG. 3C

Starting Location: 213 Elm St. Bainbridge Island, WA
Destination Location: 1425 Bellevue Way, Bellevue, WA
Preferred Arrival Time: 10:30 AM Travel Plan Starting Time: 8:05 AM

Route Leg 1      Mode: Walking

Route Leg Starting point: 213 Elm St. – Depart at 8:05

Route Leg End point: Pier 4
Travel Time: 18 minutes
Expected Arrival Time: 8:23 AM

Route Leg 2      Mode: Ferry

Route Leg Starting Point: 8:40 Ferry from Pier 4

Route Leg End point: Ferry Terminal Exit at 1233 Alaskan Way
Travel Time: 1 hour 10 minutes
Expected Arrival Time: 9:50 AM

Route Leg 3            Mode: Transportation Vehicle Unit

Route Leg Pickup Point: Ferry Terminal Exit at 1233 Alaskan Way
Pickup time: 9:55 AM Transportation Vehicle Unit:
Vehicle: 2016 Toyota Highlander – Green
Driver: Jake White  Rating: 5
Lic. Plate: GHX 2133

Route Leg End point: 1425 Bellevue Way, Bellevue, WA
Travel Time: 30 minutes

Estimated Arrival Time at Destination Location: 10:25 AM

400a Travel Plan

FIG. 4A

Starting Location:   213 Elm St.  Bainbridge Island, WA
Destination Location: 1425 Bellevue Way, Bellevue, WA
Preferred Arrival Time: 10:30 AM Travel Plan Starting Time: 8:05 AM 420b

Route Leg 1          Mode: Walking

Route Leg Starting point: 213 Elm St. – Depart at 8:05

Planned Travel Route:
1. Go 500 yards east on Elm St., turn right onto 1$^{st}$ Street.
2. Go 425 yards south on 1$^{st}$ St. and then turn right onto Oak St.
3. Go 465 yards west on Oak St. – Arrive at Pier 4

Route Leg End point: Pier 4
Travel time: 18 minutes
Expected Arrival Time: 8:23 AM

Route Leg 2          Mode: Ferry/walking

Route Leg Starting point: pier 4.

Planned Travel Route:
1. Get on 8:40 ferry to Seattle
2. Disembark at pier 65 in Seattle
3. Walk to Ferry terminal exit at 1233 Alaskan Way.

Route Leg End point: Ferry terminal exit at 1233 Alaskan Way
Travel Time: 1 hour 10 minutes
Expected Arrival Time: 9:50 AM

Route Leg 3     Mode: Transportation Vehicle Unit

Route Leg Pickup Point: Ferry terminal exit at 1233 Alaskan Way
Pickup Time: 9:55 AM Transportation Vehicle Unit:
Vehicle: 2016 Toyota Highlander – Green
Driver: Jake White
Lic. Plate: GHX 2133
Route Leg End point: 11425 Bellevue Way, Bellevue, WA
Travel Time: 30 minutes

Estimated Arrival Time at Destination Location: 10:25 AM

400b Travel Plan

FIG. 4B

Starting Location: 1425 Bellevue Way, Bellevue, WA
Destination Location: 213 Elm St. Bainbridge Island, WA
Preferred Arrival Time: 16:30 PM Travel Plan Starting Time: 3:30 AM

Route Leg 1          Mode: Transportation Vehicle Unit

Route Leg Pickup Point: 1425 Bellevue Way, Bellevue, WA
Pickup time: 3:30 PM

Transportation Vehicle Unit:
Vehicle: 2016 Taurus
Driver: Donald Black  Rating: 5
Lic. Plate: VHS 2211

Route Leg End point: Ferry Terminal Entrance at 1233 Alaskan Way
Travel Time: 45 minutes
Expected Arrival Time: 4:15 PM

Route Leg 2     Mode: Ferry

Route Leg Starting Point: Pier 56 Seattle Port 5:00 PM Ferry to Bainbridge Island, WA Route Leg End point: Pier 4 Bainbridge Island
Travel Time: 1 hour 10 minutes
Expected Arrival Time: 6:10 PM

Route Leg 3     Mode: Walking

Route Leg Starting point: Pier 4 Bainbridge Island
Route Leg End point: 213 Elm St
Travel time: 18 minutes

Estimated Arrival Time at Destination Location: 6:28 PM

400f Travel Plan

FIG. 4F

Starting Location: 213 Main St., Portland, OR
Destination Location: 1425 Bellevue Way, Bellevue, WA
Preferred Arrival Time: 11:00 AM Travel Plan Starting Time: 7:15 AM

---

Route Leg 1                 Mode: Transportation Vehicle Unit

Route Leg Pickup Point: 213 Main St., Portland, OR
Pickup time: 8:15 AM

Transportation Vehicle Unit:
Vehicle: 2012 Chrysler Impala -- Red with White Stripe
Driver: David Green  Rating: 5
Lic. Plate: CAN 221

Route Leg End point: 2456 Ash Drive, Tacoma, WA
Travel Time: 1:30 minutes
Expected Arrival Time: 9:45 AM

---

Route Leg 2                 Mode: Transportation Vehicle Unit

Route Leg Pickup Point: 2456 Ash Drive, Tacoma, WA
Pickup time: 9:50 AM

Transportation Vehicle Unit:
Vehicle: 2016 Toyota Highlander -- Green
Driver: Jake White  Rating: 5
Lic. Plate: GHX 2133

Route Leg End point: 1425 Bellevue Way, Bellevue, WA
Travel Time: 60 minutes

---

Estimated Arrival Time at Destination Location: 10:50 AM

400g Travel Plan

FIG. 4G

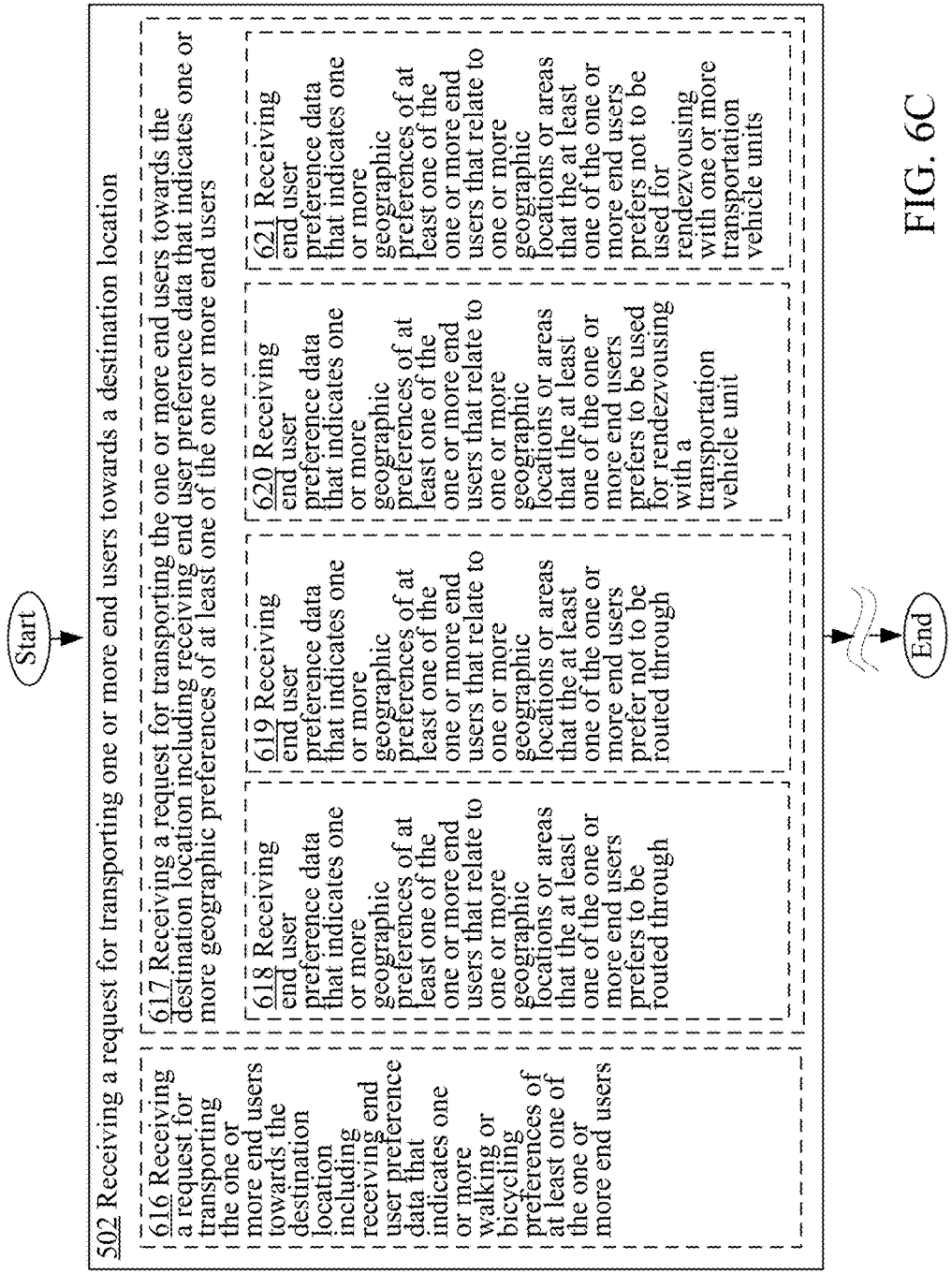

504 Providing a travel plan for facilitating the one or more end users to travel to the destination location from a starting location, the travel plan identifying at least two route legs including at least one transport route leg that calls for at least one transportation vehicle unit to transport the one or more end users over the transport route leg 742 Providing the travel plan by developing the travel plan for facilitating the one or more end users to travel to the destination location from a starting location, the developed travel plan identifying the at least two route legs including the at least one transport route leg that calls for at least one transportation vehicle unit to transport the one or more end users over the transport route leg 754 Developing a travel plan for facilitating the one or more end users to travel to the destination location from a starting location, the travel plan identifying at least two route legs including at least a first route leg that immediately precedes a second route leg for traveling at least partway between the starting location and the destination location, the second route leg being the at least one transport route leg that calls for at least one transportation vehicle unit to transport the one or more end users over the second route leg 755 Developing a travel plan identifying the at least two route legs including at least the first route leg that immediately precedes the second route leg for traveling at least partway between the starting location and the destination location, the second route leg being the at least one transport route leg that calls for at least one transportation vehicle unit to transport the one or more end users over the second route leg, and the first route leg does not call for any transportation vehicle unit to transport the one or more end users over any portion of the first route leg 756 Developing a travel plan identifying the at least two route legs including at least the first route leg that immediately precedes the second route leg for traveling at least partway between the starting location and the destination location, the second route leg being the at least one transport route leg that calls for at least one transportation vehicle unit to transport the one or more end users over the second route leg, and the first route leg that calls for another transportation vehicle unit to transport the one or more end users over the first route leg 757 Developing the travel plan including determining a rendezvous location for the one or more end users to rendezvous with the transportation vehicle unit in order to be transported over the second route leg 758 Developing the rendezvous location for the one or more end users to rendezvous with the transportation vehicle unit including estimating a rendezvous time for the one or more end users to rendezvous with the transportation vehicle unit at the rendezvous location, the estimating as a result of estimating the amount of time it will take for the one or more end users to travel over the first route leg

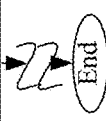

FIG. 7G

SYSTEMS AND METHODS FOR TRAVEL PLANNING THAT CALLS FOR AT LEAST ONE TRANSPORTATION VEHICLE UNIT

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

Priority Applications

For purposes of the USPTO extra-statutory requirements, the present application claims benefit of priority of U.S. Provisional Patent Application No. 61/989,394 titled RIDE-SHARING SCENARIOS, naming Richard T. Lord and Robert W. Lord as inventors, filed May 6, 2014, which was filed within the twelve months preceding the filing date of the present application or is an application of which a currently co-pending application is entitled to the benefit of the filing date.

The present application constitutes a continuation-in-part of U.S. patent application Ser. No. 14/318,182, entitled METHODS, SYSTEMS, AND DEVICES FOR PROVIDING TRANSPORTATION SERVICES, naming Richard T. Lord, Robert W. Lord, Nathan P. Myhrvold, and Clarence T. Tegreene, as inventors, filed 27 Jun. 2014.

Related Applications

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

In one or more various aspects, a method includes, but is not limited to, receiving a request for transporting one or more end users towards a destination location, providing a travel plan for facilitating the one or more end users to travel to the destination location from a starting location, the travel plan identifying at least two route legs including at least one transport route leg that calls for at least one transportation vehicle unit to transport the one or more end users over the transport route leg; and directing the at least one transportation vehicle unit to rendezvous with the one or more end users at a rendezvous location in order to transport the one or more end users over the transport route leg. In various implementations, at least one of the facilitating or directing is performed by a machine or article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving a request for transporting one or more end users towards a destination location, means for providing a travel plan for facilitating the one or more end users to travel to the destination location from a starting location, the travel plan identifying at least two route legs including at least one transport route leg that calls for at least one transportation vehicle unit to transport the one or more end users over the transport route leg; and means for directing the at least one transportation vehicle unit to rendezvous with the one or more end users at a rendezvous location in order to transport the one or more end users over the transport route leg. In addition to the foregoing, other system aspects are described in the claims, drawings, and text forming a part of the disclosure set forth herein.

In one or more various aspects, a system includes, but is not limited to, circuitry for receiving a request for transporting one or more end users towards a destination location, circuitry for providing a travel plan for facilitating the one or more end users to travel to the destination location from a starting location, the travel plan identifying at least two route legs including at least one transport route leg that calls for at least one transportation vehicle unit to transport the one or more end users over the transport route leg; and circuitry for directing the at least one transportation vehicle unit to rendezvous with the one or more end users at a rendezvous location in order to transport the one or more end users over the transport route leg. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving a request for transporting one or more end users towards a destination location, providing a travel plan for facilitating the one or more end users to travel to the destination location from a starting location, the travel plan identifying at least two route legs including at least one transport route leg that calls for at least one transportation vehicle unit to transport the one or more end users over the transport route leg, and directing the at least one transportation vehicle unit to rendezvous with the one or more end users at a rendezvous location in order to transport the one or more end users over the transport route leg. In addition to the foregoing, other computer program product aspects are described in the claims, drawings, and text forming a part of the disclosure set forth herein.

In one or more various aspects, a system includes, but is not limited to, a travel plan producing module configured to produce a travel plan for facilitating one or more end users to travel to a destination location from a starting location, the travel plan to be produced identifying at least two route legs including at least one transport route leg that calls for at least one transportation vehicle unit to transport the one or more end users over the transport route leg; and a transportation vehicle unit guiding module configured to guide the at least one transportation vehicle unit to a rendezvous location to rendezvous with the one or more end users in order to transport the one or more end users over the transport route leg In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 3A shows another perspective of the request receiving module 202* of FIGS. 2A and 2B (e.g., the request receiving module 202' of FIG. 2A or the request receiving module 202" of FIG. 2B) in accordance with various embodiments.

FIG. 3C shows another perspective of the transportation vehicle unit guiding module 206* of FIGS. 2A and 2B (e.g., the transportation vehicle unit guiding module 206' of FIG. 2A or the transportation vehicle unit guiding module 206" of FIG. 2B) in accordance with various embodiments.

FIG. 4A illustrates content of an exemplary travel plan in accordance with some embodiments.

FIG. 4B illustrates content of another exemplary travel plan in accordance with some embodiments.

FIG. 4F illustrates content of still another exemplary travel plan in accordance with some embodiments.

FIG. 4G illustrates content of still another exemplary travel plan in accordance with some embodiments.

FIG. 6C is a high-level logic flowchart of a process depicting alternate implementations of the request receiving operation 502 of FIG. 5.

FIG. 7G is a high-level logic flowchart of a process depicting alternate implementations of the travel plan providing operation 504 of FIG. 5.

DETAILED DESCRIPTION

Figure 1:
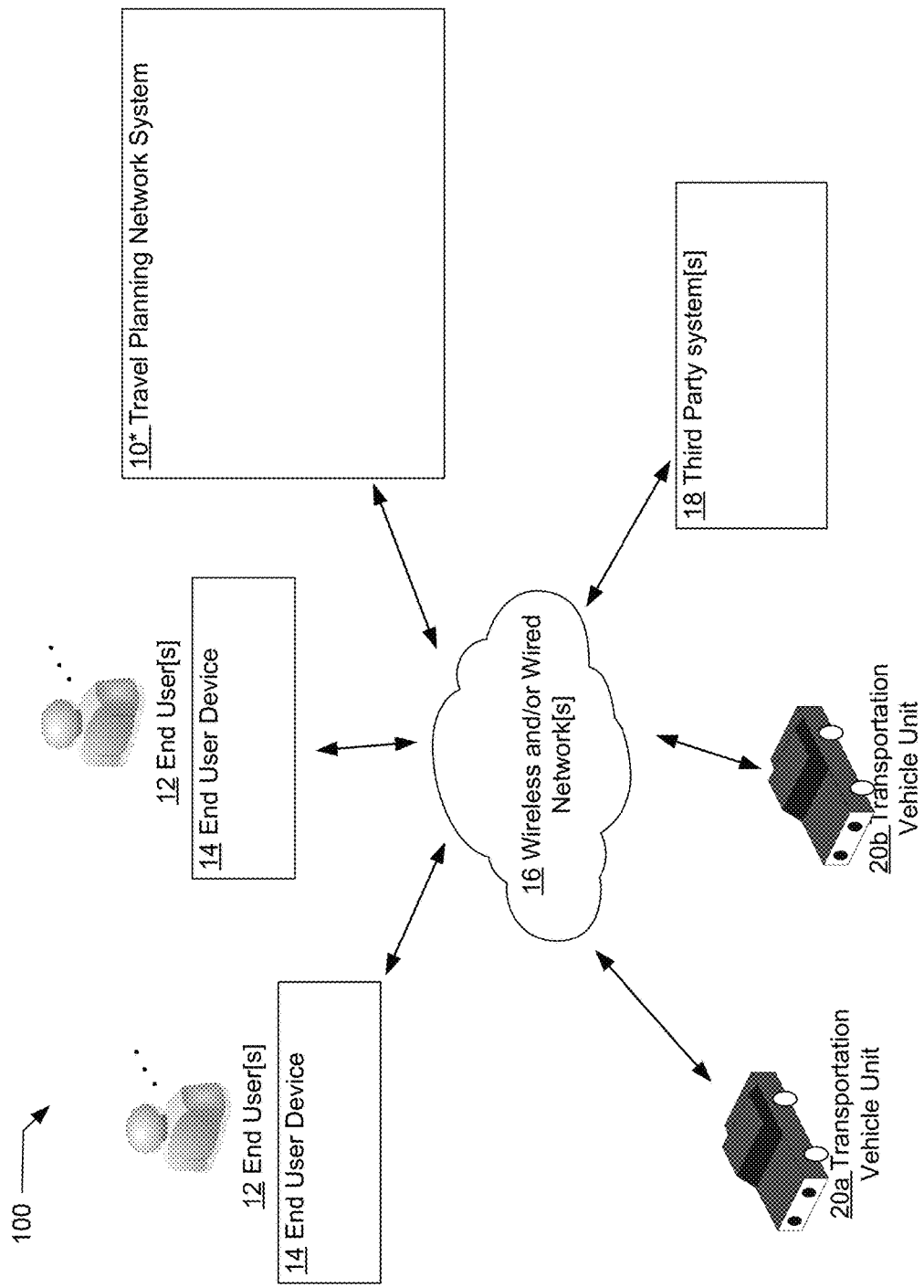
FIG. 1 illustrates a travel planning network system 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/ operational technical descriptions are seen as specifying hardware configurations of almost unimaginable complexity.

As outlined above, the reason for the use of functional/ operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various orderedmatter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation/commuting particularly in urban settings is the development of transportation networking services provided by web-based companies such as Uber and Lyft that allow users to retain drivers/vehicles for transportation serves through, for example, mobile applications. The increasingly popularity of such ridesharing services have already made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

In accordance with various embodiments, systems and methods are provided that are designed to, among other things, receive a request for transporting one or more end users towards a destination location; provide a travel plan for facilitating the one or more end users to travel to the destination location from a starting location, the travel plan identifying at least two route legs including at least one transport route leg that calls for at least one transportation vehicle unit to transport the one or more end users over the transport route leg; and direct the at least one transportation vehicle unit to rendezvous with the one or more end users at a rendezvous location in order to transport the one or more end users over the transport route leg. In some embodiments, the request that may be received may be a request that specifically requests for the travel plan for traveling to the destination location. In some other embodiments, however, the request that may be received may be a request that specifically requests for transportation for at least a portion of the overall trip to the destination location.

In various embodiments, the systems and methods, in addition to being designed to provide or generate a travel plan for one or more end users to reach a destination location from a starting location, may be designed to determine when and where will at least one transportation vehicle unit be rendezvousing with the one or more end users in order to transport the one or more end users over at least one leg (herein "route leg") of the travel plan, and to accordingly direct the at least one transportation vehicle unit (e.g., a passenger vehicle with a robotic or human driver) to rendezvous with the one or more end users in order to transport the one or more end users over the at least one route leg of the travel plan. For purposes of the following description, a "travel plan" may be in reference to a scheme or a blueprint for one or more end users to reach a destination location from a starting location (which, in some cases, may be the current location of the one or more end users).

In various embodiments, a travel plan may identify two or more route legs including the mode or modes of transportation (e.g., transportation vehicle unit, walking, bicycling, ferry, mass transit, and so forth) used for traveling over the two or more different route legs. In some cases, a travel plan may identify a rendezvous location and/or rendezvous time for one or more end users to rendezvous with at least one transportation vehicle unit for transport over at least a portion of at least one route leg of the travel plan. In some cases, a travel plan may provide a planned travel route (e.g., a detailed traveling plan that identifies specific streets, roads, shipping lanes, turns, travel distances, and so forth) for traveling at least a portion (e.g., a route leg) of the overall travel route between the starting location and the destination location. Note that in various embodiments, a planned travel route is not limited to planned routes through city streets/highways but instead may also be related to planned routes over shipping lanes, walking/bicycle trails, and so forth.

As briefly described above, in some embodiments, a travel plan may identify at least a rendezvous location and/or rendezvous time for one or more end users to rendezvous with at least one transportation vehicle unit in order to be transported over at least a portion of at least one route leg of the travel plan. In some cases, the location[s] of the one or more end users relative to the rendezvous location, as well as the location of the at least one transportation vehicle unit, may be monitored prior to the at least one transportation vehicle unit and the one or more end users reaching the rendezvous location. Such monitoring may be done in order to, for example, direct the "best" transportation vehicle unit to the rendezvous location (e.g., in some cases, may want to send to the rendezvous location the transportation vehicle unit that is nearest to the rendezvous location just before the rendezvous time) or to determine whether the original travel plan should be modified (e.g., when the one or more end users or the at least one transportation vehicle unit appears not to be able to be at the rendezvous location at the rendezvous time in accordance with the travel plan). That is, in some cases, it may be preferable not to select/direct a transportation vehicle unit to a rendezvous location to rendezvous with one or more end users until the one or more end users are detected as being relatively near the rendezvous location. In other cases, however, a transportation vehicle unit may have been pre-assigned or directed to rendezvous with the one or more end users well before the one or more end users are near the rendezvous location.

In some embodiments, a travel plan may call for (e.g., plan or schedule for) multiple transportation vehicle units to transport the one or more end users over different route legs of a travel plan. Note that for purposes of this description, a route leg of a travel plan that calls for a transportation vehicle unit to transport one or more end users over at least a portion of the route leg may be referred to herein as a "transport route leg." Also for purposes of the following description, a "transportation vehicle unit" may include at least a transportation vehicle and a human or robotic driver. A transportation vehicle, for purposes of this description, may be in reference to a passenger automobile (e.g., gas or electrical vehicle) that is not assigned to do a set route[s] like metro buses or commuter trains. In some cases, a transportation vehicle unit may further include a transport computing device (a dedicated computing device or a general purpose mobile device such as a Smartphone or a tablet computer running one or more specialized applications) for, among other things, receiving directives/instructions for rendezvousing with and transporting one or more end users in accordance with a travel plan.

Turning now to FIG. 1, which illustrates a travel planning network system 10* operating in an exemplary environment 100. In various embodiments, the various operations and functionalities to be described herein may be implemented by the travel planning network system 10*. The travel planning network system 10* may be a network system such as server or workstation, or a plurality of network devices such as servers, workstations, storage, and so forth (e.g., "the cloud"). Note that for purposes of the following description "*" represents a wildcard. Thus, references in the following description to, for example, "travel planning network system 10*" may be in reference to the travel planning network system 10' of FIG. 2A, as well as to the travel planning network system 10" of FIG. 2B, which are two different implementations of the travel planning network system 10* of FIG. 1.

As further illustrated in FIG. 1, the travel planning network system 10* may communicate with one or more end user devices 14, one or more transportation vehicle units 20* (e.g., transportation vehicle unit 20a and transportation vehicle unit 20b), and/or one or more third party systems 18 via one or more wireless and/or wired networks 16. The one or more wireless and/or wired networks 16 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth.

In various embodiments, an end user device 14 may be associated with one or more end users 12. An end user device 14 may be a mobile device (e.g., a Smartphone or tablet computer) or a personal computer (e.g., a laptop computer, a desktop computer, a workstation, and so forth). Although not depicted in FIG. 1, in various embodiments, the travel planning network system 10* may communicate with a transportation vehicle unit 20* (which may comprise of a transportation vehicle and a robotic or human driver) via a transport computing device (e.g., a dedicated computing device or a general purpose mobile device such as a Smartphone or tablet computer) associated with the transportation vehicle unit 20* (or associated with a driver of the transportation vehicle unit 20*).

In various embodiments, the travel planning network system 10* may communicate with one or more third party systems 18 in order to obtain certain information (e.g., weather, traffic conditions, ferry or metro schedules, train schedules) and/or for making certain reservations (e.g., ferry or train reservations) from one or more third parties. Such information may be useful for facilitating the travel planning network system 10* for providing or generating travel plans for reaching destination locations. That is, in various embodiments, the travel planning network system 10* may be designed to provide (or produce) a travel plan for facilitating one or more end users 12 to travel to a destination location from a starting location, the travel plan to be provided or produced identifying at least two route legs including at least one transport route leg that calls for (e.g., plans for) at least one transportation vehicle unit 20* to transport the one or more end users 12 over the transport route leg.

In some cases, the providing or producing of the travel plan may be in response to the travel planning network system 10* receiving from an end user device 14 a request for transporting the one or more end users 12 towards a destination location. In some cases, such a received request may be a request that specifically requests for a travel plan for traveling to the destination location, while in other cases, such a request may specifically request for transportation for at least a portion of the overall trip to the destination location. In some embodiments, at least a portion or portions of the provided travel plan may be transmitted to an end user device 14 and/or to a transportation vehicle unit 20* (e.g., to a transport computing device) in order to at least notify the one or more end users 12 and the transportation vehicle unit 20* as to the rendezvous location and/or rendezvous time for the one or more end users 12 to rendezvous with the transportation vehicle unit 20* in order to be transported over at least a portion of a transport route leg of the provided travel plan.

Based, at least in part, on the provided travel plan, the travel planning network system 10* may direct or guide a transportation vehicle unit 20* to a rendezvous location to rendezvous with the one or more end users 12 in order to transport the one or more end users 12 over at least a portion of a transport route leg of the provided travel plan. In some cases, the travel planning network system 10* may direct or guide a transportation vehicle unit 20* to a rendezvous location by transmitting to the transportation vehicle unit 20* (via transport computing device such as a Smartphone or a dedicated computing device) directives or instructions that instructs the transportation vehicle unit 20* to go to the rendezvous location immediately, at a designated time, or by a specified deadline.

In some embodiments, the directives or instructions that may be transmitted may simply indicate the address of the rendezvous location and/or the rendezvous time (e.g., the planned passenger pickup time). In some embodiments, the directives or instructions that may be transmitted to the transportation vehicle unit 20* may be in the form of a request that requests the transportation vehicle unit 20* to rendezvous with the one or more end users 12. Such a request may provide certain information related to the one or more end users 12 including identification information of at least one of the one or more end users 12 and/or ratings of the at least one of the one or more end users 12 provided by drivers who have previously transported the at least one of the one or more end users 12.

Figure 2A:
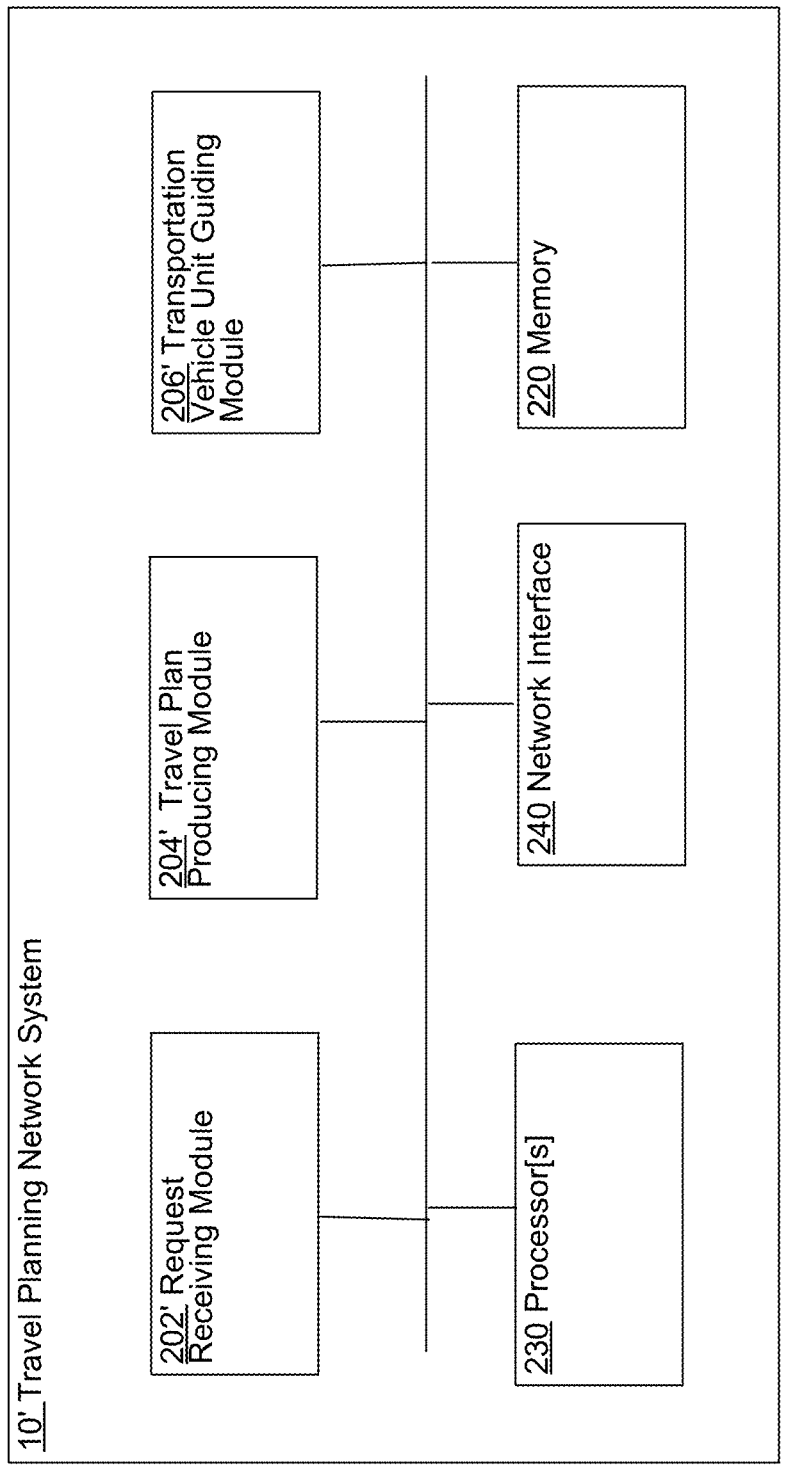
FIG. 2A shows a high-level block diagram of a particular implementation of the travel planning network system 10* of FIG. 1.
Figure 2B:
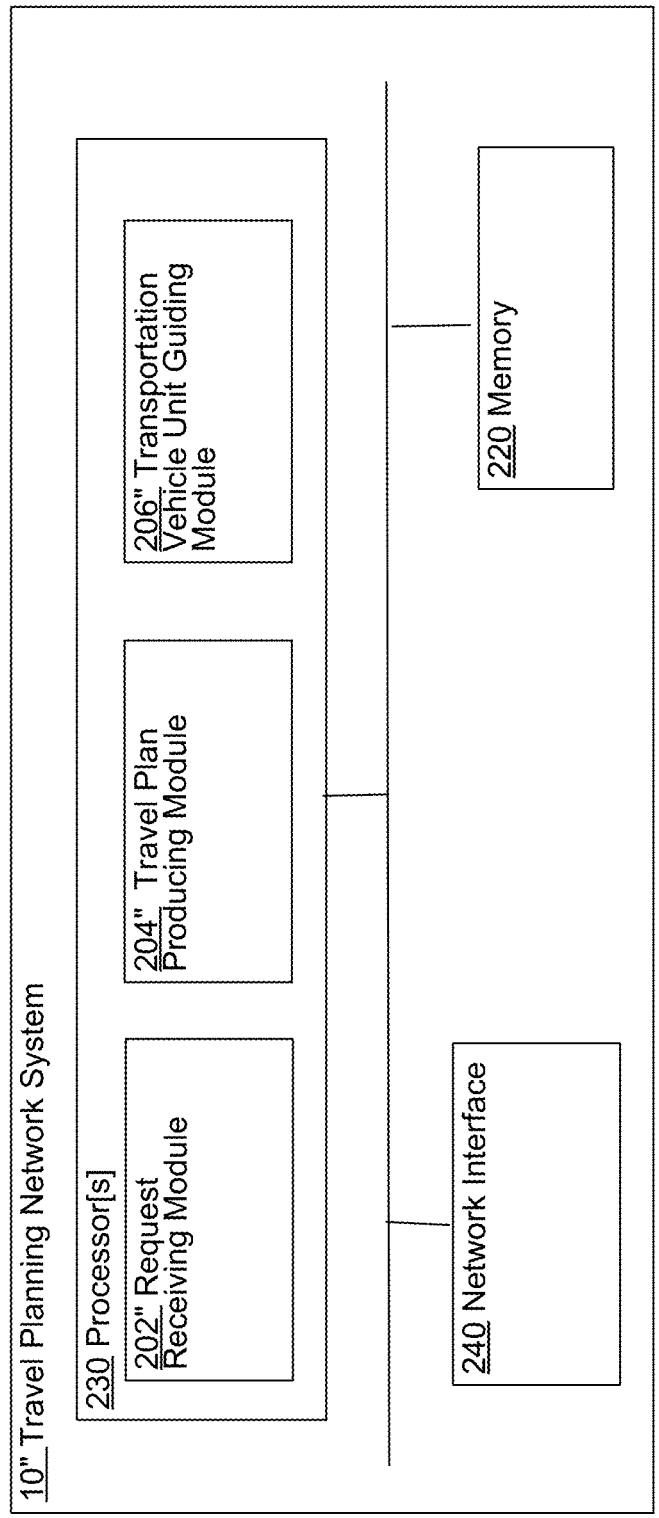
FIG. 2B shows another high-level block diagram of another implementation of the travel planning network system 10* of FIG. 1.

Referring now to FIGS. 2A and 2B, which illustrate two block diagrams representing two different implementations of the travel planning network system 10* of FIG. 1. In particular, and as will be further described herein, FIG. 2A illustrates a travel planning network system 10' that is the "hardwired" or "hard" implementation of the travel planning network system 10* that can implement the operations and processes to be described herein. The travel planning network system 10' includes certain logic modules including a request receiving module 202', a travel plan producing module 204' and a transportation vehicle unit guiding module 206' that are implemented using purely hardware or circuitry components (e.g., application specific integrated circuit (or ASIC). In contrast, FIG. 2B illustrates a travel planning network system 10" that is the "soft" implementation of the travel planning network system 10' of FIG. 2A in which certain logic modules including a request receiving module 202", a travel plan producing module 204" and a transportation vehicle unit guiding module 206" are implemented using programmable electronic circuitry (e.g., one or more processors 230 including one or more microprocessors, controllers, etc.) executing one or more programming instructions (e.g., software).

The embodiments of the travel planning network system 10* illustrated in FIGS. 2A and 2B (e.g., the travel planning network system 10' of FIG. 2A and the travel planning network system 10" of FIG. 2B) are two extreme implementations of the travel planning network system 10* in which all of the logic modules (e.g., the request receiving module 202', the travel plan producing module 204' and the transportation vehicle unit guiding module 206') are implemented using purely hardware solutions (e.g., circuitry such as ASIC) as illustrated in FIG. 2A or in which all of the logic modules (e.g., the request receiving module 202", the travel plan producing module 204" and the transportation vehicle unit guiding module 206") are implemented using software solutions (e.g., programmable instructions being executed by programmable circuitry such as field programmable gate array (FPGA) or one or more processors) as illustrated in FIG. 2B. Since there are many ways of combining hardware, software, and/or firmware in order to implement the various logic modules (e.g., the request receiving module 202*, the travel plan producing module 204* and the transportation vehicle unit guiding module 206*), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (or FPGA) are still needed in order to execute the software. Further details related to the two implementations of travel planning network system 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the travel planning network system 10' in addition to the request receiving module 202', the travel plan producing module 204' and the transportation vehicle unit guiding module 206' may further include one or more processors 230 (e.g., microprocessors, controllers, and so forth), a network interface 240 (network interface card or NIC), and/or memory 220. In various embodiments, memory 220 may comprise of volatile and/or non-volatile memory. In some embodiments, memory 220 may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including previously provided travel plans, ferry and/or mass transit schedules, end user preferences including vehicle and/or driver preferences, driver preferences including geographic preferences, and so forth.

Turning now to FIG. 2B, which illustrates a travel planning network system 10" in which certain logic modules (the request receiving module 202", the travel plan producing module 204" and the transportation vehicle unit guiding module 206") are implemented using one or more processors 230. In addition, the travel planning network system 10" may further include a memory 220 and a network interface 240 similar to the travel planning network system 10' of FIG. 2A.

In various embodiments the request receiving module 202* of FIG. 2A or 2B (e.g., the request receiving module 202' of FIG. 2A or the request receiving module 202" of FIG. 2B) may be configured to, among other things, receive a request for transporting one or more end users 12 towards a destination location. In contrast, the travel plan producing module 204* of FIG. 2A or 2B (e.g., the travel plan producing module 204' of FIG. 2A or the travel plan producing module 204" of FIG. 2B) may be configured to, among other things, produce or provide a travel plan for facilitating one or more end users 12 to travel to a destination location from a starting location, the travel plan to be produced or provided identifying at least two route legs including at least one transport route leg that calls for at least one transportation vehicle unit 20* to transport the one or more end users 12 over the transport route leg. Meanwhile, the transportation vehicle unit guiding module 206* of FIG.

2A or 2B (e.g., the transportation vehicle unit guiding module 206' of FIG. 2A or the transportation vehicle unit guiding module 206" of FIG. 2B) may be configured to, among other things, guide or direct the at least one transportation vehicle unit 20* to a rendezvous location to rendezvous with the one or more end users 12 in order to transport the one or more end users 12 over the transport route leg.

Referring now to FIG. 3A illustrating a particular implementation of the request receiving module 202* (e.g., the request receiving module 202' or the request receiving module 202") of FIG. 2A or 2B. As illustrated, the request receiving module 202* may include one or more sub-logic modules in various alternative implementations. For example, in various embodiments, the request receiving module 202* may further include an end user preference data receiving module 302. Specific details related to the request receiving module 202* as well as the above-described sub-module of the request receiving module 202* will be provided below with respect to the operations and processes to be described herein.

Figure 3B:
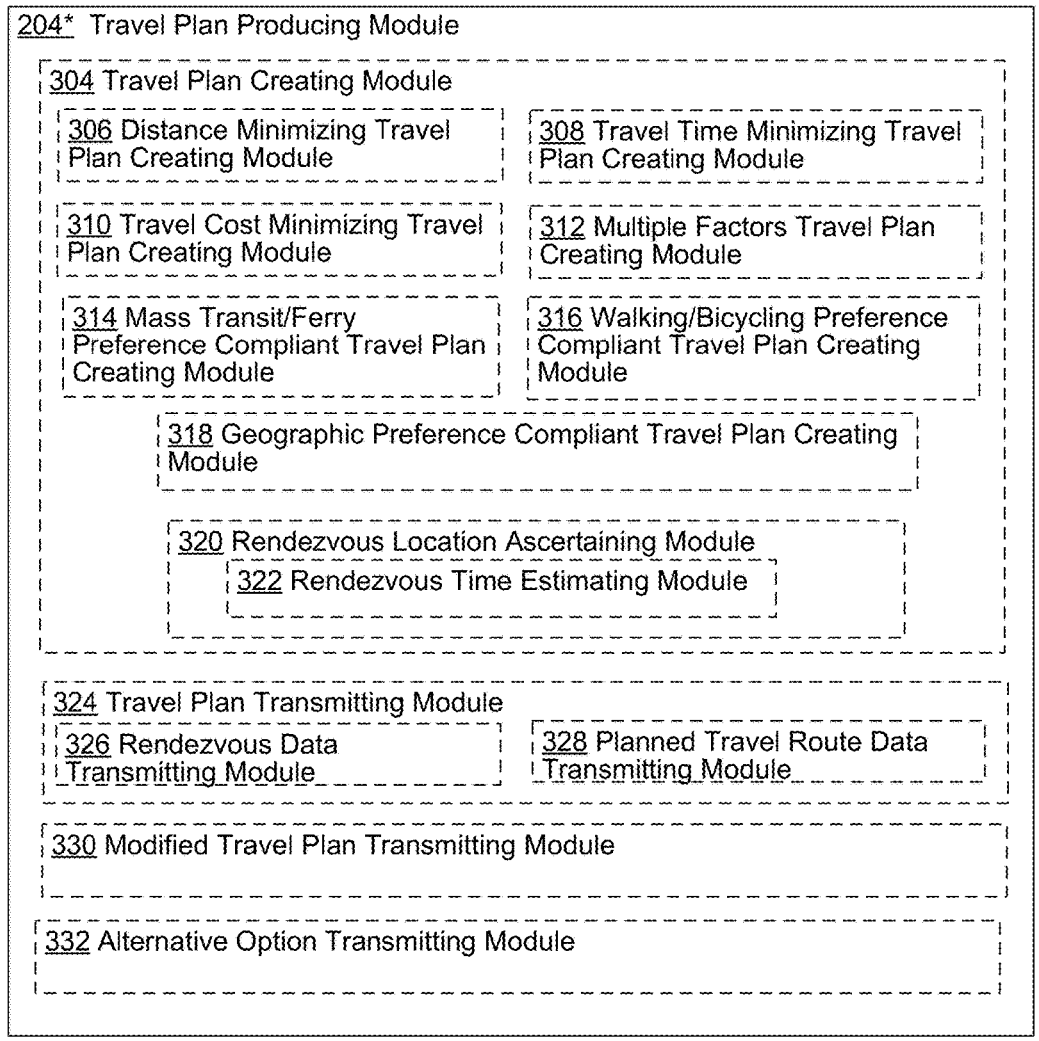
FIG. 3B shows another perspective of the travel plan producing module 204* of FIGS. 2A and 2B (e.g., the travel plan producing module 204' of FIG. 2A or the travel plan producing module 204" of FIG. 2B) in accordance with various embodiments.

FIG. 3B illustrates a particular implementation of the travel plan producing module 204* (e.g., the travel plan producing module 204' or the travel plan producing module 204") of FIG. 2A or 2B. As illustrated, the travel plan producing module 204* may include one or more sub-logic modules in various alternative implementations. For example, in various embodiments, the travel plan producing module 204* may further include a travel plan creating module 304, which may further include a distance minimizing travel plan creating module 306, a travel time minimizing travel plan creating module 308, a travel cost minimizing travel plan creating module 310, a multiple factors travel plan creating module 312, a mass transit/ferry preference compliant travel plan creating module 314, a walking/bicycling preference compliant travel plan creating module 316, a geographic preference compliant travel plan creating module 318, and/or a rendezvous location ascertaining module 318 (which may further include a rendezvous time estimating module 322), a travel plan transmitting module 324 (which may further include a rendezvous data transmitting module 326 and/or a planned travel route data transmitting module 328), a modified travel plan transmitting module 330, and/or an alternative option transmitting module 332. Specific details related to the travel plan producing module 204" as well as the above-described sub-modules of the travel plan producing module 204* will be provided below with respect to the operations and processes to be described herein.

Turning now to FIG. 3C illustrating a particular implementation of the transportation vehicle unit guiding module 206* (e.g., the transportation vehicle unit guiding module 206' or the transportation vehicle unit guiding module 206") of FIG. 2A or 2B. As illustrated, the transportation vehicle unit guiding module 206* may include one or more sub-logic modules in various alternative implementations. For example, in various embodiments, the transportation vehicle unit guiding module 206* may further include an instruction transmitting module 340 (which may further include a transportation information transmitting module 342), a request transmitting module 344, a confirmation receiving module 346, an end user detecting module 348, and/or a transportation vehicle unit detecting module 350. Specific details related to the transportation vehicle unit guiding module 206" as well as the above-described sub-modules of the transportation vehicle unit guiding module 206* will be provided below with respect to the operations and processes to be described herein.

Referring now to FIG. 4A, which illustrates the type of data that may be included in an exemplary travel plan 400a that may be provided/produced by the travel planning network system 10* of FIG. 2A or 2B. The example travel plan 400a may be a plan to facilitate one or more end users 12 to travel from a starting location (e.g., "213 Elm St., Bainbridge Island, Wash.") to a destination location (e.g., "1425 Bellevue Way, Bellevue, Wash."), the travel plan 400a having multiple route legs including at least one route leg ("transport route leg")—route leg 3 in FIG. 4A—that calls for a transportation vehicle unit 20* to transport the one or more end users 12 over at least a portion of the transport route leg (e.g., "route leg 3" of FIG. 4A). As illustrated, the example travel plan 400a may identify the starting location (which may or may not be the current location of one of the one or more end users 12 as provided, for example, by a GPS of an end user device 14), a destination location, and in some cases a preferred arrival time (e.g., the latest time that the one or more end users 12 may wish to arrive at the destination location—generally most people prefer to arrive early rather than late).

The travel plan 400a may further indicate a planned starting time (e.g., "8:05 AM" in FIG. 4A) for starting the planned trip from the starting location in order to reach the destination location by the preferred arrival time. Note that included at the bottom of the travel plan 400a of FIG. 4A is the estimated arrival time (e.g., "10:25 AM") at the destination location if the travel plan 400a is followed by the one or more end users 12. The travel plan 400a, as further illustrated, may identify the different route legs (e.g., route leg 1, route leg 2, and route leg 3) that the travel plan 400a may include. The mode of transportation (e.g., walking, ferry, and transportation vehicle unit) for each of the identified route legs may also be identified by the travel plan 400a. Note that route leg 3 in FIG. 4A is a "transport route leg" because it calls for transportation vehicle unit 20* for transporting the one or more end users 12 over at least a portion of the route leg (e.g., route leg 3).

As illustrated in FIG. 4A, the example travel plan 400a further identifies for each route leg, a route leg starting point (or "route leg pickup point" for route leg 3), a route leg end point, travel time for the corresponding leg, and the expected arrival time at the route leg end point. Note that the example travel plan 400a includes other information related to the various route legs. For example, identifying the ferry (e.g., "8:40 Ferry"), and vehicle and driver information related to the transportation vehicle unit 20* called for by route leg 3. Note that the various headings (e.g., "Route Leg 1," "Mode:", and so forth) and subheading (e.g., "Route Leg Starting Point," "Route Leg End Point," and so forth) illustrated in FIG. 4A are not necessarily in an actual travel plan. That is, these headings and subheadings are provided in the travel plan 400a of FIG. 4A (as well as in the travel plans 400b, 400f, and 400g of FIGS. 4B, 4F and 4G) merely to facilitate the reader in understanding the type of information that may be included in a travel plan 400* (e.g., travel plan 400a, 400b, 400f and 400g of FIG. 4A, 4B, 4F, or 4G). Thus, an actual plan to travel to a destination location may not look anything like the example travel plan 400a of FIG. 4A (or like the travel plans 400b, 400f and 400g of FIGS. 4B, 4F, and 4G). Instead, the exemplary travel plan 400a of FIG. 4A (as well as the travel plans 400b, 400f and 400g of FIGS. 4B, 4F, and 4G) are merely presented herein in order to show the type of information that may be included in a travel plan 400\*.

Figure 4C:
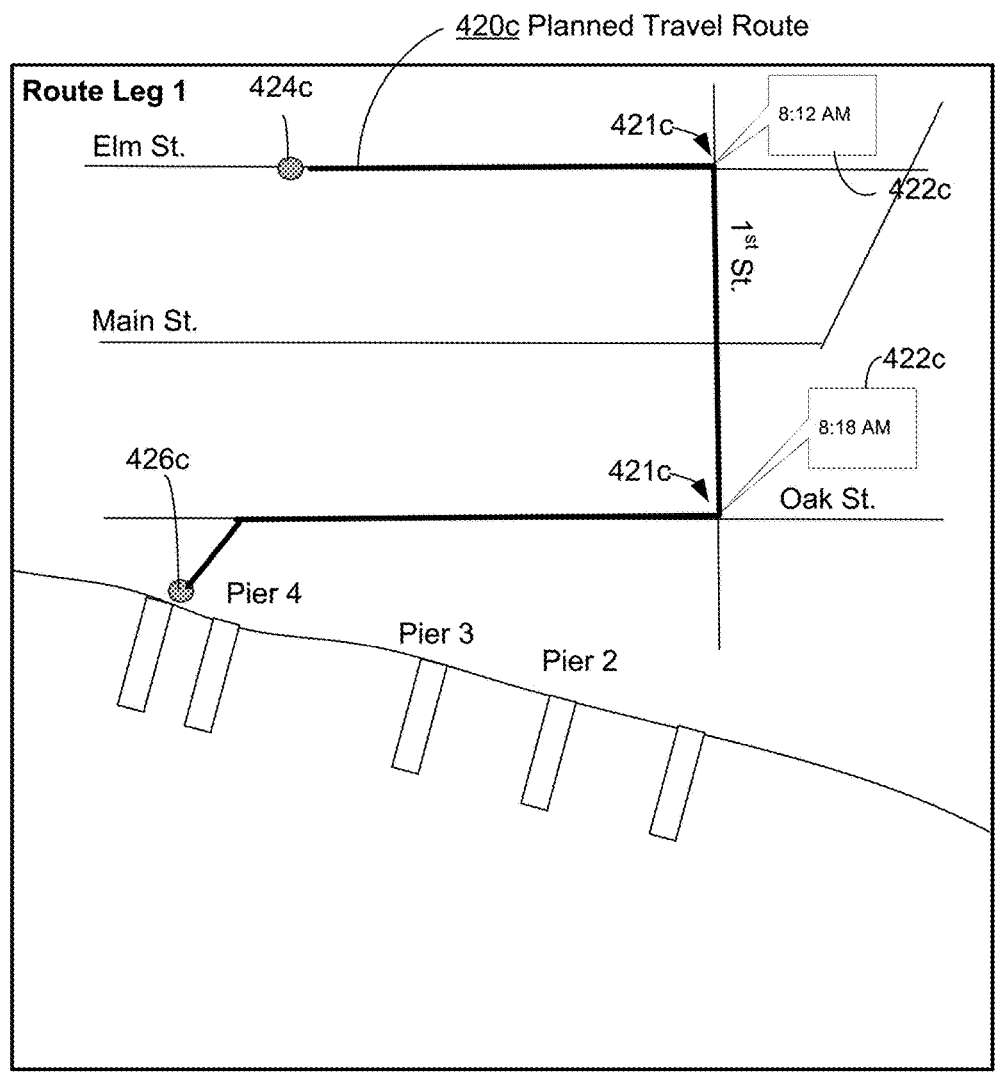
FIG. 4C illustrates an example graphical representation of a planned travel route for a route leg 1 of FIG. 4B.

As will be further illustrated, in some cases, a plan to travel to a destination location, such as the travel plan 400*a* of FIG. 4A, may provide specific detailed routing information that indicates, for example, turn-by-turn and street-by-street routing information for traveling at least partway to a destination location. Referring now to FIG. 4B, which illustrates another exemplary travel plan 400*b* with specific routing information for traveling at least partway (e.g., a route leg) to a destination location. The exemplary travel plan 400*b* is similar to the travel plan 400*a* of FIG. 4A except that for route leg 1, the travel plan 400*b* includes specific planned routing information in the form of planned travel route 420*b*, which provides street-by-street, turn-by-turn routing information for traveling from the "route leg starting point" of route leg 1 to the "route leg end point" of route leg 1. Note that the planned travel route 420*b* for route leg 1 of FIG. 4B is in textual form. In other implementations, however, a planned travel route 420\* that identifies a detailed route of at least a portion of a route leg may be in graphical form (see, for example, planned travel route 420*c*, 420*d*, and 420*e* of FIGS. 4C, 4D, and 4E).

Figure 4D:
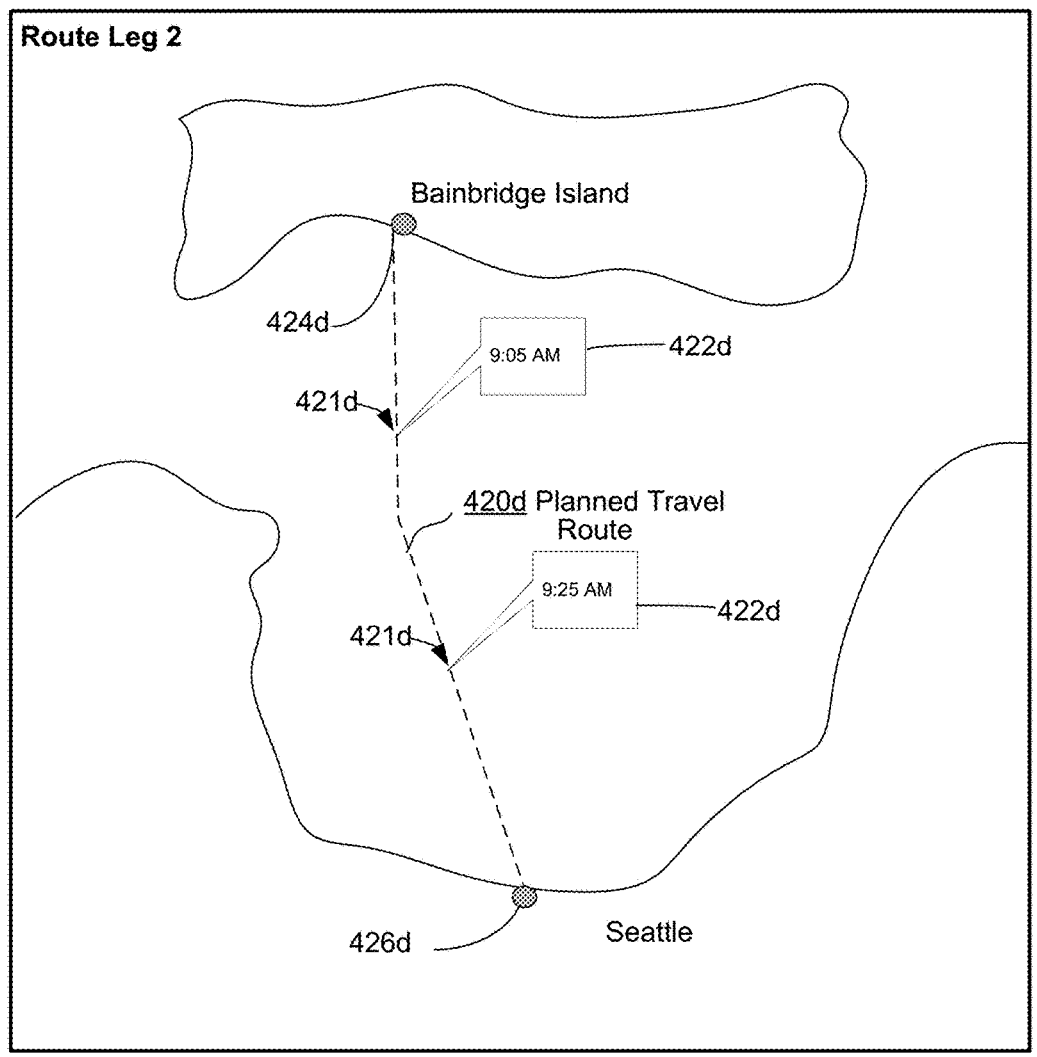
FIG. 4D illustrates an example graphical representation of a planned travel route for a route leg 2 of FIG. 4B.
Figure 4E:
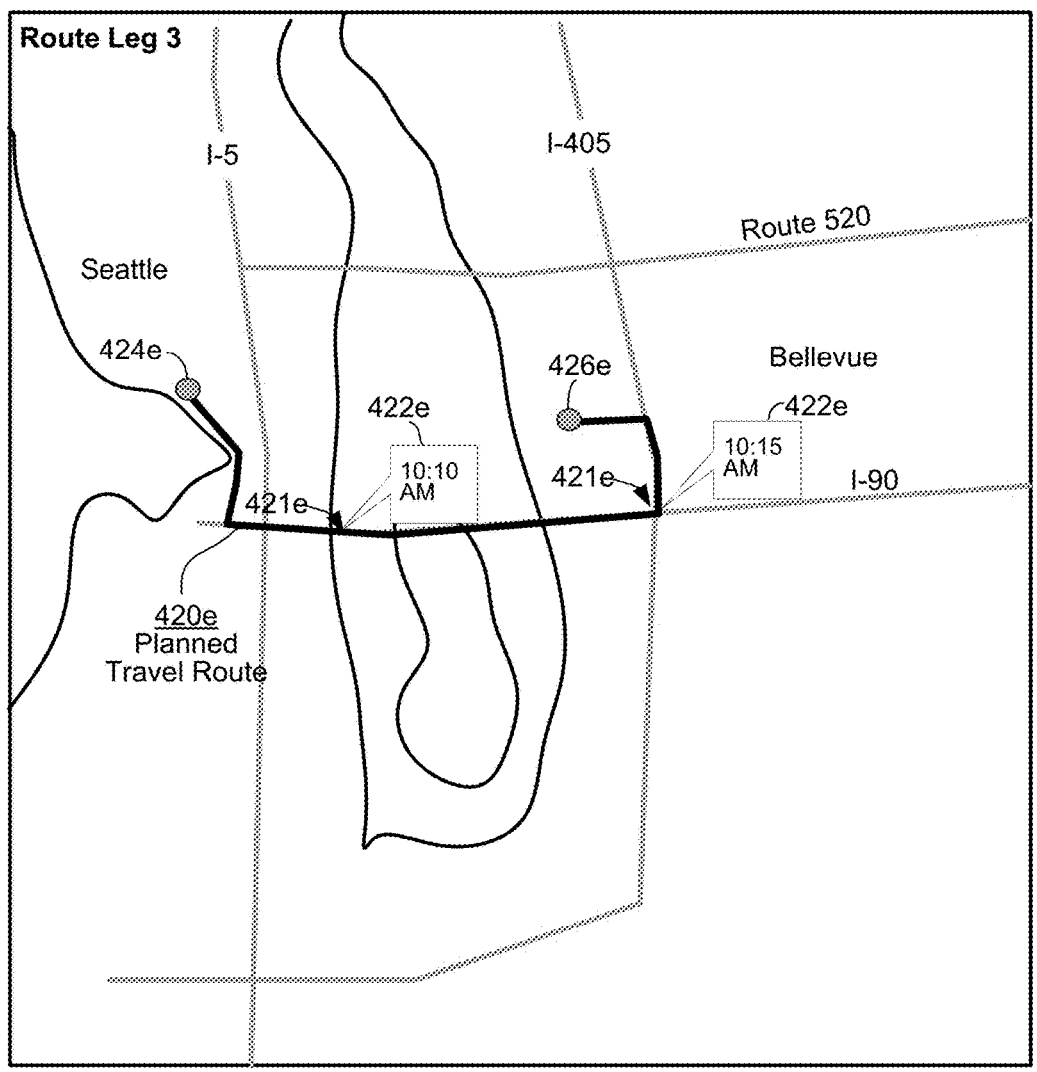
FIG. 4E illustrates an example graphical representation of a planned travel route for a route leg 3 of FIG. 4B.

Referring now to FIGS. 4C, 4D, and 4E, which illustrates planned travel routes 420\*, in graphical form, for each of the route legs (e.g., route leg 1, route leg 2, and route leg 3) of travel plan 400*b* of FIG. 4B and which may be included in the travel plan 400*b*. These planned travel routes 420\* may be useful in determining whether the one or more end users 12 are traveling as planned and in accordance with the travel plan 400*b* (e.g., whether the one or more end users 12 will be able to reach a rendezvous location for rendezvousing with a transportation vehicle unit 20\* on time and in accordance with the travel plan 400*b*). Turning particularly now to FIG. 4C, which depicts a planned travel route 420*c* for route leg 1 of the travel plan 400*b* of FIG. 4B. The planned travel route 420*c*, in one sense, is merely the graphical version of the planned travel route 420*b* of FIG. 4B. In addition, other information may be provided with the planned travel route 420*c* including route leg starting point 424*c*, route leg end point 426*c*, intermediate locations 421*c* along the planned travel route 420*c* and the preferred intermediate arrival times 422*c* (e.g., the scheduled or planned arrival times at intermediate locations in order to reach the route leg end point and to transition to the next leg, (e.g., get on a ferry, on time) for each of the intermediate locations 421*c* along the planned travel route 420*c*.

Referring now to FIG. 4D, which illustrates a planned travel route 420*d* (in graphical from) for route leg 2 of the travel plan 400*b* of FIG. 4B. The planned travel route 420*d* is actually the ferry route for the 8:40 ferry called for by route leg 2 of travel plan 400*b* of FIG. 4B. Other information may also be provided with the planned travel route 420*d* including, the route leg starting point 424*d*, route leg end point 426*d*, intermediate locations 421*d* along the planned travel route 420*d* and the preferred intermediate arrival times 422*d* for each of the intermediate locations 421*d*.

Turning now to FIG. 4E, which illustrates a planned travel route 420*e* (in graphical form) for route leg 3 (e.g., "transport route leg" that calls for a transportation vehicle unit 20\* to transport the one or more end users 12) of the travel plan 400*b* of FIG. 4B. The planned travel route 420*e* is the planned route for a transportation vehicle unit 20\* to transport the one or more end users 12 to a route leg end point 426*e* (which is also the final destination location for the travel plan 400*b*). Other information may also be provided with the planned travel route 420*e* including, the route leg starting point 424*e*, route leg end point 426*e*, intermediate locations 421*e* along the planned travel route 420*e* and the preferred intermediate arrival times 422*e* for each of the intermediate locations 421*e*.

The intermediate locations 421\* and their associated preferred intermediate arrival times 422\* of each of the planned travel routes 420\* of FIGS. 4C, 4D, and 4E may be useful particularly in connection with location information of the one or more end users 12. That is, the monitored location or locations of the one or more end users 12 (via GPS of the end user device 14) when the one or more end users 12 are traveling to the destination location may be compared to the intermediate location 421\* and the associated preferred intermediate arrival times 422\* of the planned travel routes 420\* in order to determine whether the one or more end users 12 are moving along the planned travel routes 420\* on time. And if a determination is made that the one or more end users 12 have deviated from the planned travel routes 420\* (because the one or more end users 12 are arriving late at the intermediate locations 421), then adjustments may be made to the travel plan 400*b* (e.g., change the rendezvous location or rendezvous time for a transportation vehicle unit 20\* to rendezvous with the one or more end users 12 for route leg 3).

In addition, the location or locations of the one or more end users 12 (via GPS of the end user device 14) when the one or more end users 12 are traveling to the destination location may be monitored and compared to the planned travel routes 420\* in order to determine when to direct a transportation vehicle unit 20\* to the rendezvous location for rendezvousing with the one or more end users 12. That is, in some embodiments, it may be preferable not to contact a transportation vehicle unit 20\* to direct the transportation vehicle unit 20\* to the rendezvous location unless the one or more end users 12 are in the proximity of the rendezvous location (e.g., the one or more end users 12 are 15 minutes away from the rendezvous location).

Referring now to FIG. 4F, which illustrates another exemplary travel plan 400*f* that may be provided for the return trip from the trip undertaken when the travel plan 400*a* or 400*b* of FIG. 4A or 4B was executed by the one or more end users 12. Note that because this is for a return trip, the first route leg (e.g., route leg 1) is the transport route leg that calls for a transportation vehicle unit 20\* to transport the one or more end users 12 from the starting location (e.g., "1425 Bellevue Way, Bellevue, Wash.") to a route leg end point (e.g., Ferry Terminal Entrance at 1233 Alaskan Way). The route leg 1 of the travel plan 400*f* is planned such that the scheduled transportation vehicle unit 20\* called for by route leg 1 will rendezvous with the one or more end users 12 at the appropriate time and to transport the one or more end users 12 on time so that they will be on time to be able to catch the 5:00 PM ferry to Bainbridge Island, which is the second route leg (e.g., "route leg 2") of the travel plan 400*f*.

FIG. 4G illustrates yet another exemplary travel plan 400*g*. In this example, the travel plan 400*g* calls for two different transportation vehicle units 20\* to transport one or more end users 12 over two different route legs (e.g., route leg 1 and route leg 2). Note that included in the travel plan 400*g* is certain information related to the transportation vehicle units scheduled to rendezvous with the one or more end users 12 including vehicle model, make, driver information, and license number. Also indicated by the travel plan 400*g* are schedule pickup times and expected or estimated arrival times at the route leg end point (or estimated arrival time at destination location).

Figure 5:
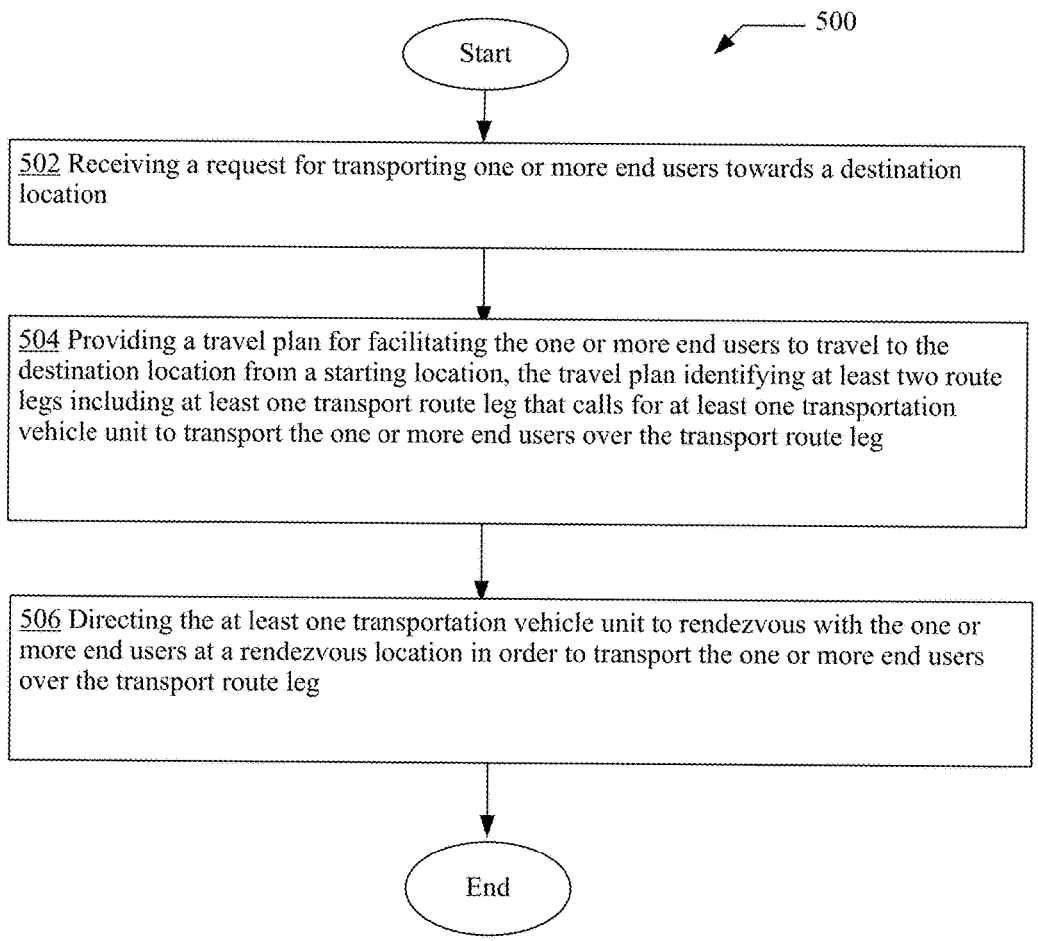
FIG. 5 is a high-level logic flowchart of a process, e.g., operational flow 500, according to some embodiments.

In the following, various operations associated with the above described travel planning network system 10* (e.g., the travel planning network system 10' of FIG. 2A or the travel planning network system 10" of FIG. 2B) will be presented in accordance with various alternative embodiments. FIG. 5, for example, illustrates an operational flow 500 representing example computationally-implemented operations that may be implemented for, among other things, providing, which may be in response to receiving a request for transporting one or more end users towards a destination location, a travel plan for facilitating the one or more end users to travel to the destination location from a starting location, the travel plan identifying at least two route legs, and directing at least one transportation vehicle unit to rendezvous with the one or more end users at a rendezvous location in order to transport the one or more end users over at least one of the at least two route legs of the travel plan.

In FIG. 5 and in the following figures that include various examples of operational flows, discussions and explanations will be provided with respect to the travel planning network system 10* described above and as illustrated in FIGS. 2A, 2B, 3A, 3B, and 3C, and/or with respect to other examples (e.g., as provided in FIGS. 1, 4A, 4B, 4C, 4D, 4E, 4F, and 4G) and contexts. However, it should be understood that the operational flows may be executed in a number of other environments and contexts, and/or in modified versions of FIGS. 1, 2A, 2B, 3A, 3B, 3C, 4A, 4B, 4C, 4D, 4E, 4F, and/or 4G. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a request receiving operation 502 for receiving a request for transporting one or more end users towards a destination location. For instance, and as illustration, the request receiving module 202* of the travel planning network system 10* of FIG. 2A or 2B (e.g., the request receiving module 202' of FIG. 2A or the request receiving module 202" of FIG. 2B) receiving a request that requests that one or more end users 12 are transported at least partway towards a destination location. In various embodiments, the request that may be received may be a request that specifically requests for a travel plan for traveling to the destination location. In some other embodiments, however, the request that may be received may be a request that specifically requests for transportation for at least a portion of the overall trip to the destination location.

Operational flow 500 may also include a travel plan providing operation 504 for providing a travel plan for facilitating the one or more end users to travel to the destination location from a starting location, the travel plan identifying at least two route legs including at least one transport route leg that calls for at least one transportation vehicle unit to transport the one or more end users over the transport route leg. For instance, the travel plan producing module 204* (e.g., the travel plan producing module 204' of FIG. 2A or the travel plan producing module 204" of FIG. 2B) of the travel planning network system 10* of FIG. 2A or 2B providing or producing a travel plan 400* for facilitating the one or more end users 12 to travel to the destination location from a starting location, the travel plan 400* identifying at least two route legs including at least one transport route leg (e.g., route leg 3 of FIG. 4A or 4B) that calls for (e.g., requires use of or plans for) at least one transportation vehicle unit 20* to transport the one or more end users 12 over the transport route leg (e.g., route leg 3 of FIG. 4A or 4B). In various implementations, the travel plan 400* that may be provided may be developed or created, or alternatively, may be a previously generated travel plan 400* that may be stored in, for example, memory 220 (e.g., when an end user 12 request to be transported towards a destination location from a starting location that was, for example, planned for previously in a previous trip to the destination location.

As further illustrated in FIG. 5, operational flow 500 may further include a transportation vehicle unit directing operation 506 for directing the at least one transportation vehicle unit to rendezvous with the one or more end users at a rendezvous location in order to transport the one or more end users over the transport route leg. For instance, the transportation vehicle unit guiding module 206* (e.g., the transportation vehicle unit guiding module 206' of FIG. 2A or the transportation vehicle unit guiding module 206" of FIG. 2B) of the travel planning network system 10* of FIG. 2A or 2B directing or guiding the at least one transportation vehicle unit 20* (e.g., directing or guiding by transmitting directives or instructions to the at least one transportation vehicle unit 20*) to rendezvous with the one or more end users 12 at a rendezvous location (e.g., a location for the one or more end users 12 to meet the transportation vehicle unit 20*) in order to transport the one or more end users 12 over the transport route leg (e.g., route leg 3 of FIG. 4A or 4B).

Figure 6A:
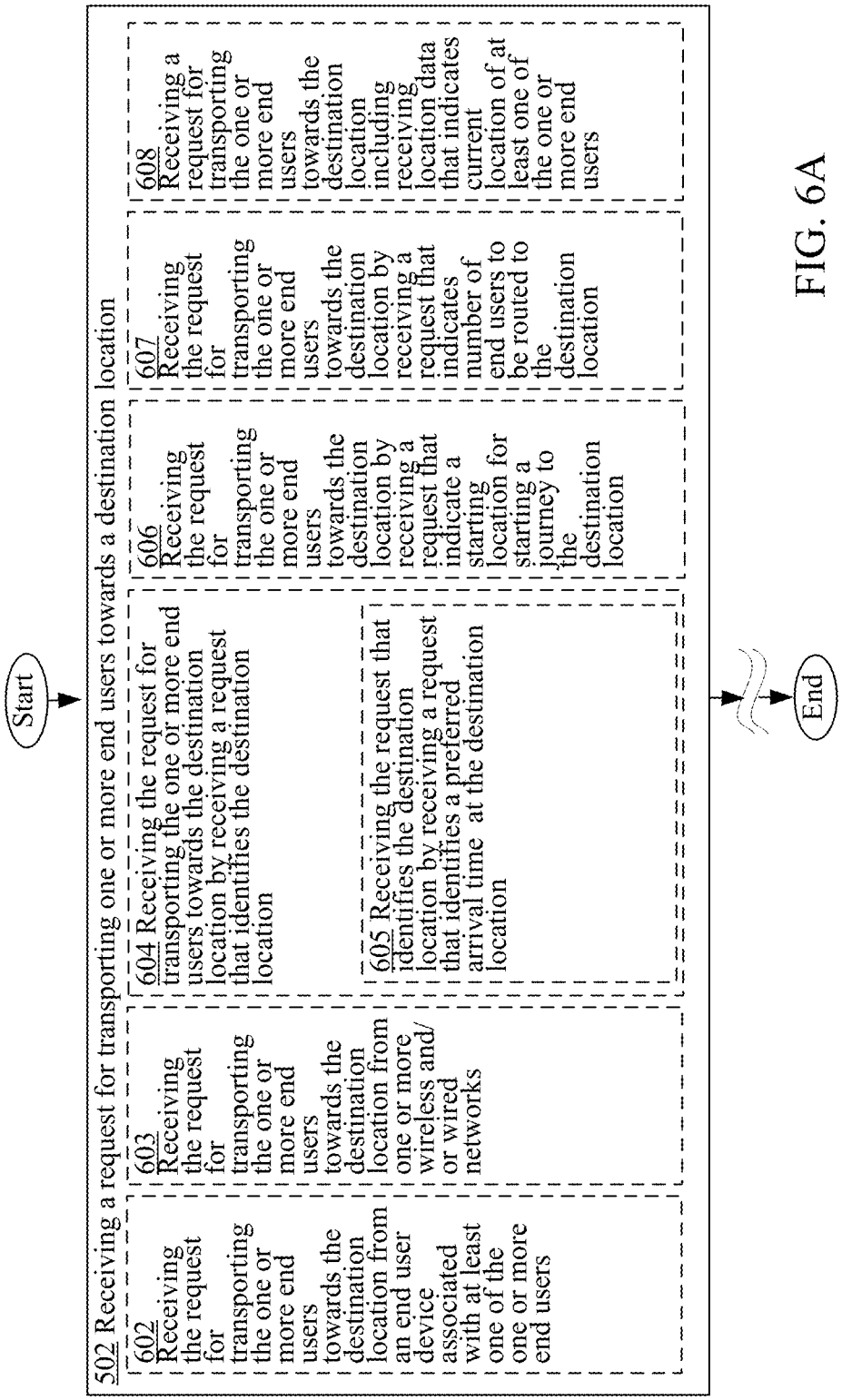
FIG. 6A is a high-level logic flowchart of a process depicting alternate implementations of the request receiving operation 502 of FIG. 5.
Figure 6B:
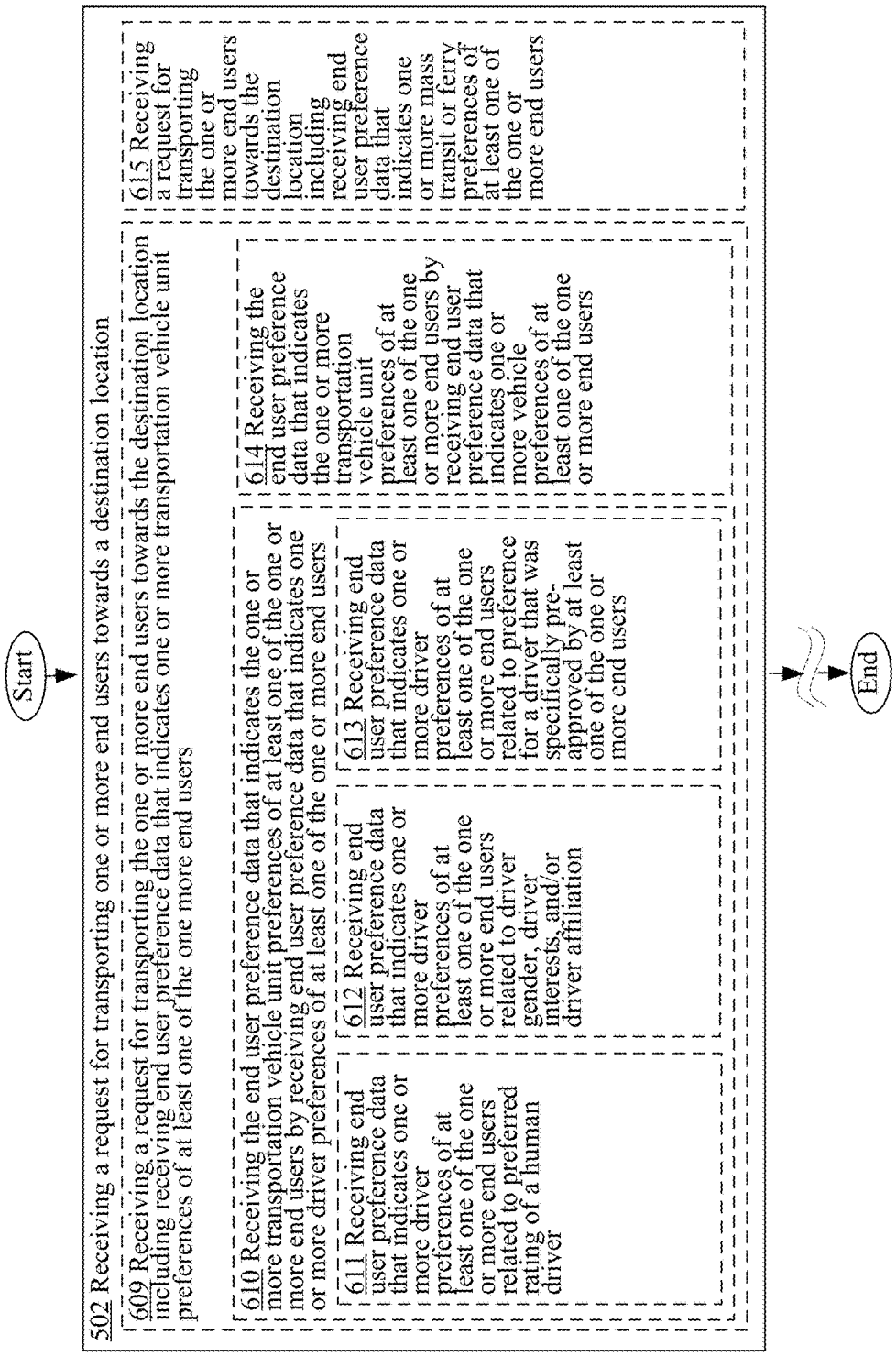
FIG. 6B is a high-level logic flowchart of a process depicting alternate implementations of the request receiving operation 502 of FIG. 5.

As will be described below, the request receiving operation 502, the travel plan providing operation 504, and the transportation vehicle unit directing operation 506 may be executed in a variety of different ways in various alternative implementations. FIGS. 6A, 6B, and 6C, for example, illustrate at least some of the alternative ways that the request receiving operation 502 of FIG. 5 may be executed in various alternative implementations. In some cases, for example, the request receiving operation 502 may include an operation 602 for receiving the request for transporting the one or more end users towards the destination location from an end user device associated with at least one of the one or more end users as illustrated in FIG. 6A. For instance, the request receiving module 202* of the travel planning network system 10* (e.g., the travel planning network system 10' of FIG. 2A or the travel planning network system 10" of FIG. 2B) receiving the request for transporting the one or more end users 12 towards the destination location from an end user device 14 (e.g., a Smartphone, a tablet computer, a laptop or desktop computer, and so forth) associated with (e.g., being used by) at least one of the one or more end users 12.

In various implementations, the request receiving operation 502 may include an operation 603 for receiving the request for transporting the one or more end users towards the destination location from one or more wireless and/or wired networks. For instance, the request receiving module 202* of the travel planning network system 10* of FIG. 2A or 2B receiving the request for transporting the one or more end users 12 towards the destination location from one or more wireless and/or wired networks 16 (e.g., cellular data network).

In the same or alternative implementations, the request receiving operation 502 may alternatively or additionally include or involve an operation 604 for receiving the request for transporting the one or more end users towards the destination location by receiving a request that identifies the destination location. For instance, the request receiving module 202* of the travel planning network system 10* of FIG. 2A or 2B receiving the request for transporting the one or more end users 12 towards the destination location by receiving a request that identifies the destination location (e.g., an address or a name of a landmark). In some cases, the request receiving module 202* may control a network interface 240 in order to receive the request.

In some cases, operation 604 may further include or involve an operation 605 for receiving the request that identifies the destination location by receiving a request that identifies a preferred arrival time at the destination location. For instance, the request receiving module 202* of the travel planning network system 10* of FIG. 2A or 2B receiving the request that identifies the destination location by receiving a request that identifies a preferred arrival time (as preferred and indicated by at least one of the one or more end users 12 via the end user device 14) at the destination location.

In the same or alternative implementations, the request receiving operation 502 may alternatively or additionally include or involve an operation 606 for receiving the request for transporting the one or more end users towards the destination location by receiving a request that indicates a starting location for starting a journey to the destination location. For instance, the request receiving module 202* of the travel planning network system 10* of FIG. 2A or 2B receiving the request for transporting the one or more end users 12 towards the destination location by receiving a request that indicates a starting location (e.g., may be an address or GPS data) for starting a journey to the destination location.

In the same or alternative implementations, the request receiving operation 502 may alternatively or additionally include or involve an operation 607 for receiving the request for transporting the one or more end users towards the destination location by receiving a request that indicates number of end users to be routed to the destination location. For instance, the request receiving module 202* of the travel planning network system 10* of FIG. 2A or 2B receiving the request for transporting the one or more end users 12 towards the destination location by receiving a request that indicates number of end users 12 to be routed to the destination location.

In the same or alternative implementations, the request receiving operation 502 may alternatively or additionally include or involve an operation 608 for receiving a request for transporting the one or more end users towards the destination location including receiving location data that indicates current location of at least one of the one or more end users. For instance, the request receiving module 202* of the travel planning network system 10* of FIG. 2A or 2B receiving a request for transporting the one or more end users 12 towards the destination location including receiving location data (e.g., global positioning system or GPS data) that indicates current location (e.g., end user location at the proximate time that the request was received) of at least one of the one or more end users 12.

Referring now to FIG. 6B, in various implementations, the request receiving operation 502 may include an operation 609 for receiving a request for transporting the one or more end users towards the destination location including receiving end user preference data that indicates one or more transportation vehicle unit preferences of at least one of the one or more end users. For instance, the request receiving module 202* including the end user preference data receiving module 302 (see FIG. 3A) of the travel planning network system 10* of FIG. 2A or 2B receiving a request for transporting the one or more end users 12 towards the destination location including receiving, by the end user preference data receiving module 302, end user preference data that indicates one or more transportation vehicle unit preferences (e.g., preference for a particular type of vehicle) of at least one of the one or more end users 12. In some cases, the end user preference data may have been received previously well before receiving the request. In other cases, however, such data may be received at the same time or subsequent to receiving the request.

As further illustrated in FIG. 6B, in various implementations, operation 609 may further include one or more additional operations including, in some cases, an operation 610 for receiving the end user preference data that indicates the one or more transportation vehicle unit preferences of at least one of the one or more end users by receiving end user preference data that indicates one or more driver preferences of at least one of the one or more end users. For instance, the end user preference data receiving module 302 of the travel planning network system 10* of FIG. 2A or 2B receiving the end user preference data that indicates the one or more transportation vehicle unit preferences of at least one of the one or more end users by receiving end user preference data that indicates one or more driver preferences (e.g., preference that a driver be a non-smoker or does not use perfume/cologne) of at least one of the one or more end users 12.

In some implementations, operation 610 may, in turn, further include an operation 611 for receiving end user preference data that indicates one or more driver preferences of at least one of the one or more end users related to preferred rating of a human driver. For instance, the end user preference data receiving module 302 of the travel planning network system 10* of FIG. 2A or 2B receiving end user preference data that indicates one or more driver preferences of at least one of the one or more end users 12 related to preferred rating of a human driver (e.g., end user preference that a human driver having an average rating from other end users that is higher than a certain rating number).

In the same or different implementations, operation 610 may additionally or alternatively include an operation 612 for receiving end user preference data that indicates one or more driver preferences of at least one of the one or more end users related to driver gender, driver interests, and/or driver affiliation. For instance, the end user preference data receiving module 302 of the travel planning network system 10* of FIG. 2A or 2B receiving end user preference data that indicates one or more driver preferences of at least one of the one or more end users 12 related to driver gender, driver interests (e.g., New York Jets), and/or driver affiliation (e.g., religious affiliation or school affiliation).

In the same or different implementations, operation 610 may additionally or alternatively include an operation 613 for receiving end user preference data that indicates one or more driver preferences of at least one of the one or more end users related to preference for a driver that was specifically pre-approved by at least one of the one or more end users. For instance, the end user preference data receiving module 302 of the travel planning network system 10* of FIG. 2A or 2B receiving end user preference data that indicates one or more driver preferences of at least one of the one or more end users 12 related to preference for a driver that was specifically pre-approved by at least one of the one or more end users 12. For example, receiving end user preference data that indicates a preference that the driver for a selected transportation vehicle unit 20* (selected for transporting one or more end users 12) be a driver from a list of pre-approved drivers as previously approved by the at least one of the one or more end users 12.

In some implementations, operation 609 may include an operation 614 for receiving the end user preference data that indicates the one or more transportation vehicle unit preferences of at least one of the one or more end users by receiving end user preference data that indicates one or more vehicle preferences of at least one of the one or more end users. For instance, the end user preference data receiving module 302 of the travel planning network system 10* of FIG. 2A or 2B receiving the end user preference data that indicates the one or more transportation vehicle unit preferences of at least one of the one or more end users 12 by receiving end user preference data that indicates one or more vehicle preferences (e.g., preference for a minivan with extra leg space) of at least one of the one or more end users 12.

In various implementations, the request receiving operation 502 may include an operation 615 for receiving a request for transporting the one or more end users towards the destination location including receiving end user preference data that indicates one or more mass transit or ferry preferences of at least one of the one or more end users. For instance, the request receiving module 202* including the end user preference data receiving module 302 of the travel planning network system 10* of FIG. 2A or 2B receiving a request for transporting the one or more end users 12 towards the destination location including receiving, by the end user preference data receiving module 302, end user preference data that indicates one or more mass transit or ferry preferences (e.g., preference that no city bus be used for transportation if wait for a city bus is more than 15 minutes, preference that only certain ferries be used for transport over water, and so forth) of at least one of the one or more end users 12.

Turning to FIG. 6C, in the same or alternative implementations, the request receiving operation 502 may additionally or alternatively include an operation 616 for receiving a request for transporting the one or more end users towards the destination location including receiving end user preference data that indicates one or more walking or bicycling preferences of at least one of the one or more end users. For instance, the request receiving module 202* including the end user preference data receiving module 302 of the travel planning network system 10* of FIG. 2A or 2B receiving a request for transporting the one or more end users 12 towards the destination location including receiving, by the end user preference data receiving module 302, end user preference data that indicates one or more walking or bicycling preferences (e.g., preference for not walking more than a quarter mile during any leg of a trip) of at least one of the one or more end users 12.

In the same or alternative implementations, the request receiving operation 502 may additionally or alternatively include an operation 617 for receiving a request for transporting the one or more end users towards the destination location including receiving end user preference data that indicates one or more geographic preferences of at least one of the one or more end users. For instance, the request receiving module 202* including the end user preference data receiving module 302 of the travel planning network system 10* of FIG. 2A or 2B receiving a request for transporting the one or more end users 12 towards the destination location including receiving, by the end user preference data receiving module 302, end user preference data that indicates one or more geographic preferences (e.g., an end user 12 prefers to avoid routes that require the end user 12 to travel over water via, for example, a ferry, or traveling through certain neighborhoods) of at least one of the one or more end users 12.

As further illustrated in FIG. 6C, in various implementations, operation 617 may include one or more additional operations including, in some cases, an operation 618 for receiving end user preference data that indicates one or more geographic preferences of at least one of the one or more end users that relate to one or more geographic locations or areas that the at least one of the one or more end users prefers to be routed through. For instance, the end user preference data receiving module 302 of the travel planning network system 10* of FIG. 2A or 2B receiving end user preference data that indicates one or more geographic preferences of at least one of the one or more end users 12 that relate to one or more geographic locations or areas that the at least one of the one or more end users 12 prefers to be routed through. For example, an end user 12 may indicate through an end user device 14 (which may transmit such indication to the travel planning network system 10*) that the end user 12 prefers that she be routed through (e.g., via transportation vehicle unit 20* or via other mode of transportation) certain roads or areas at certain times of the day.

In the same or alternative implementations, operation 617 may additionally or alternatively include an operation 619 for receiving end user preference data that indicates one or more geographic preferences of at least one of the one or more end users that relate to one or more geographic locations or areas that the at least one of the one or more end users prefers not to be routed through. For instance, the end user preference data receiving module 302 of the travel planning network system 10* of FIG. 2A or 2B receiving end user preference data that indicates one or more geographic preferences of at least one of the one or more end users 12 that relate to one or more geographic locations or areas that the at least one of the one or more end users 12 prefer not to be routed through. For example, an end user 12 may indicate through an end user device 14 (which may transmit such indication to the travel planning network system 10*) that the end user 12 prefers that she be routed through certain roads or areas.

In the same or alternative implementations, operation 617 may additionally or alternatively include an operation 620 for receiving end user preference data that indicates one or more geographic preferences of at least one of the one or more end users that relate to one or more geographic locations or areas that the at least one of the one or more end users prefers to be used for rendezvousing with a transportation vehicle unit. For instance, the end user preference data receiving module 302 of the travel planning network system 10* of FIG. 2A or 2B receiving end user preference data that indicates one or more geographic preferences of at least one of the one or more end users 12 that relate to one or more geographic locations or areas that the at least one of the one or more end users 12 prefers to be used for rendezvousing with a transportation vehicle unit 20*. That is, in some cases, an end user 12 may prefer, for various reasons (e.g., safety, handicap friendly), certain locations for rendezvousing with transportation vehicle unit 20*.

In the same or alternative implementations, operation 617 may additionally or alternatively include an operation 621 for receiving end user preference data that indicates one or more geographic preferences of at least one of the one or more end users that relate to one or more geographic locations or areas that the at least one of the one or more end users prefers not to be used for rendezvousing with one or more transportation vehicle units. For instance, the end user preference data receiving module 302 of the travel planning network system 10* of FIG. 2A or 2B receiving end user preference data that indicates one or more geographic preferences of at least one of the one or more end users 12 that relate to one or more geographic locations or areas that the at least one of the one or more end users 12 prefers not to be used for rendezvousing with one or more transportation vehicle units 20*.

Figure 7A:
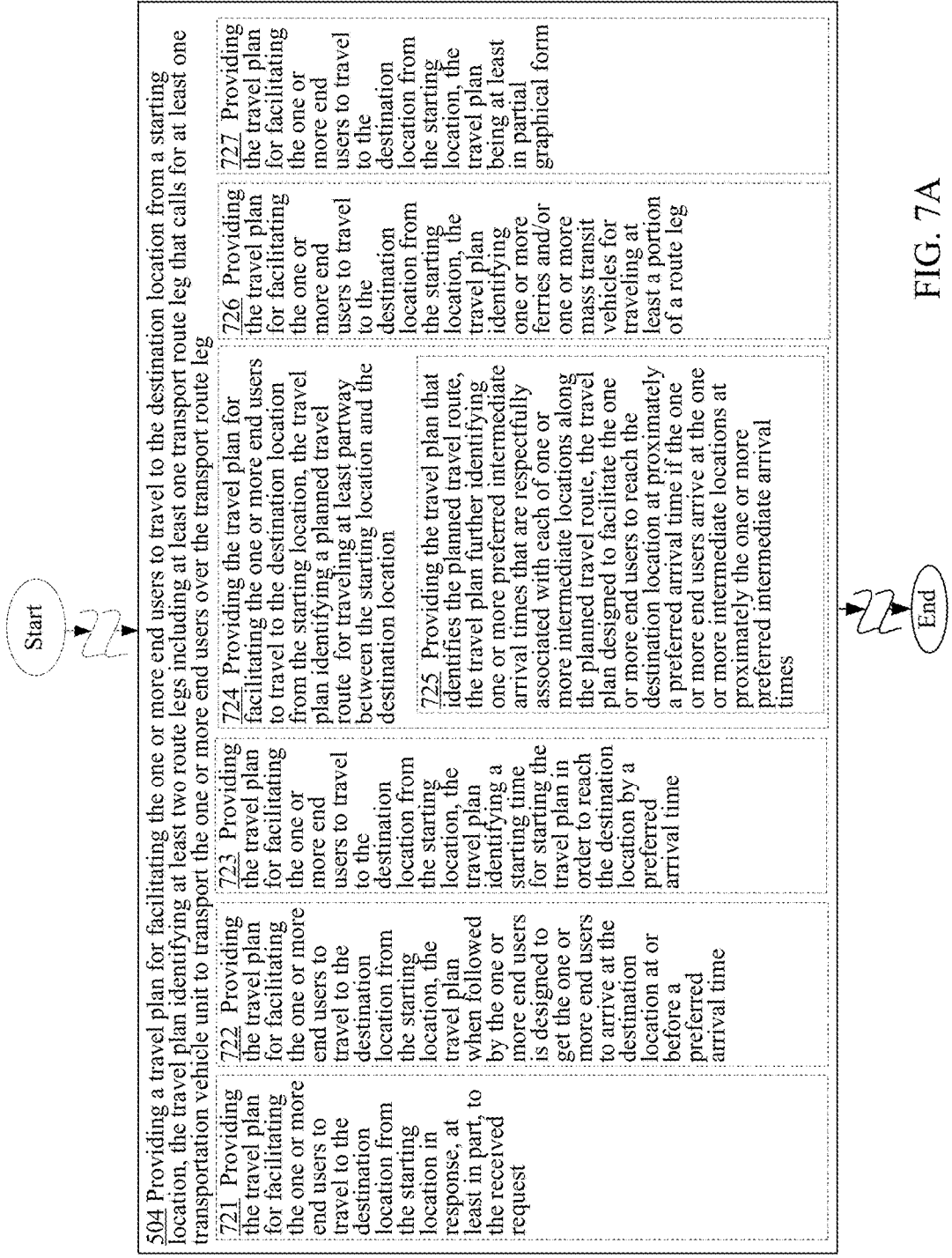
FIG. 7A is a high-level logic flowchart of a process depicting alternate implementations of the travel plan providing operation 504 of FIG. 5.

Referring back to the travel plan providing operation 504 of FIG. 5, the travel plan providing operation 504 similar to the request receiving operation 502 of FIG. 5 may be executed in a number of different ways in various alternative embodiments as illustrated, for example, in FIGS. 7A, 7B, 7C, 7D, 7E, 7F, 7G, 7H, and 7I. In some cases, for example, the travel plan providing operation 504 may actually include an operation 721 for providing the travel plan for facilitating the one or more end users to travel to the destination location from the starting location in response, at least in part, to the received request as illustrated in FIG. 7A. For instance, the travel plan producing module 204* of the travel planning networking system 10* of FIG. 2A or 2B providing (e.g., producing) the travel plan 400* for facilitating the one or more end users 12 to travel to the destination location from the starting location, the providing of the travel plan 400* being in response, at least in part, to the received request as received, for example, by the request receiving module 202* of the travel planning network system 10*.

In the same or alternative implementations, the travel plan providing operation 504 may additionally or alternatively include an operation 722 for providing the travel plan for facilitating the one or more end users to travel to the destination location from the starting location, the travel plan when followed by the one or more end users is designed to get the one or more end users to arrive at the destination location at or before a preferred arrival time. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* when followed by the one or more end users 12 is designed to get the one or more end users 12 to arrive at the destination location at or before a preferred arrival time (e.g., a preferred arrival time as indicated by at least one of the one or more end users 12 via, for example, an end user device 14).

In the same or alternative implementations, the travel plan providing operation 504 may additionally or alternatively include an operation 723 for providing the travel plan for facilitating the one or more end users to travel to the destination location from the starting location, the travel plan identifying a starting time for starting the travel plan in order to reach the destination location by a preferred arrival time. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* identifying a starting time for starting the travel plan 400* (e.g., a starting time for starting a trip in accordance with the travel plan 400*) in order to reach the destination location by a preferred arrival time (as indicated by at least one of the one or more end users 12 via, for example, an end user device 14).

In the same or alternative implementations, the travel plan providing operation 504 may additionally or alternatively include an operation 724 for providing the travel plan for facilitating the one or more end users to travel to the destination location from the starting location, the travel plan identifying a planned travel route for traveling at least partway between the starting location and the destination location. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* identifying a planned travel route 420* (e.g., a textual or graphical plan for traveling through a particular geographical area) for traveling at least partway (e.g., for traveling a route leg of a travel plan) between the starting location and the destination location.

In some cases, operation 724 may further include an operation 725 for providing the travel plan that identifies the planned travel route, the travel plan further identifying one or more preferred intermediate arrival times that are respectfully associated with each of one or more intermediate locations along the planned travel route, the travel plan designed to facilitate the one or more end users to reach the destination location at proximately a preferred arrival time if the one or more end users arrive at the one or more intermediate locations at proximately the one or more preferred intermediate arrival times. For instance, the travel plan producing module 204* of the travel planning networking system 10* of FIG. 2A or 2B providing the travel plan 400* that identifies the planned travel route 420*, the travel plan 400* further identifying one or more preferred intermediate arrival times 422* (see, for example, FIG. 4C, 4D, or 4E) that are respectfully associated with each of one or more intermediate locations 421* (see, for example, FIG. 4C, 4D, or 4E) along the planned travel route 420*, the travel plan 400* designed to facilitate the one or more end users 12 to reach the destination location at proximately (e.g., before) a preferred arrival time if the one or more end users 12 arrive at the one or more intermediate locations 421* at proximately the one or more preferred intermediate arrival times 422*.

In the same or alternative implementations, the travel plan providing operation 504 may additionally or alternatively include an operation 726 for providing the travel plan for facilitating the one or more end users to travel to the destination location from the starting location, the travel plan identifying one or more ferries and/or one or more mass transit vehicles for traveling along at least a portion of a route leg. For instance, the travel plan producing module 204* of the travel planning networking system 10* of FIG. 2A or 2B providing (e.g., producing) the travel plan 400* for facilitating the one or more end users 12 to travel towards the destination location from the starting location, the travel plan 400* identifying one or more ferries (e.g., name of ferry or departure time) and/or one or more mass transit vehicles (e.g., bus number or bus route name, which is the way metro buses are often identified) for traveling at least a portion of a route leg.

In the same or alternative implementations, the travel plan providing operation 504 may additionally or alternatively include an operation 727 for providing the travel plan for facilitating the one or more end users to travel to the destination location from the starting location, the travel plan being at least in partial graphical form. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* to be provided being at least in partial graphical form (e.g., a digital map as illustrated, for example, in FIGS. 4C, 4D, and 4E).

Figure 7B:
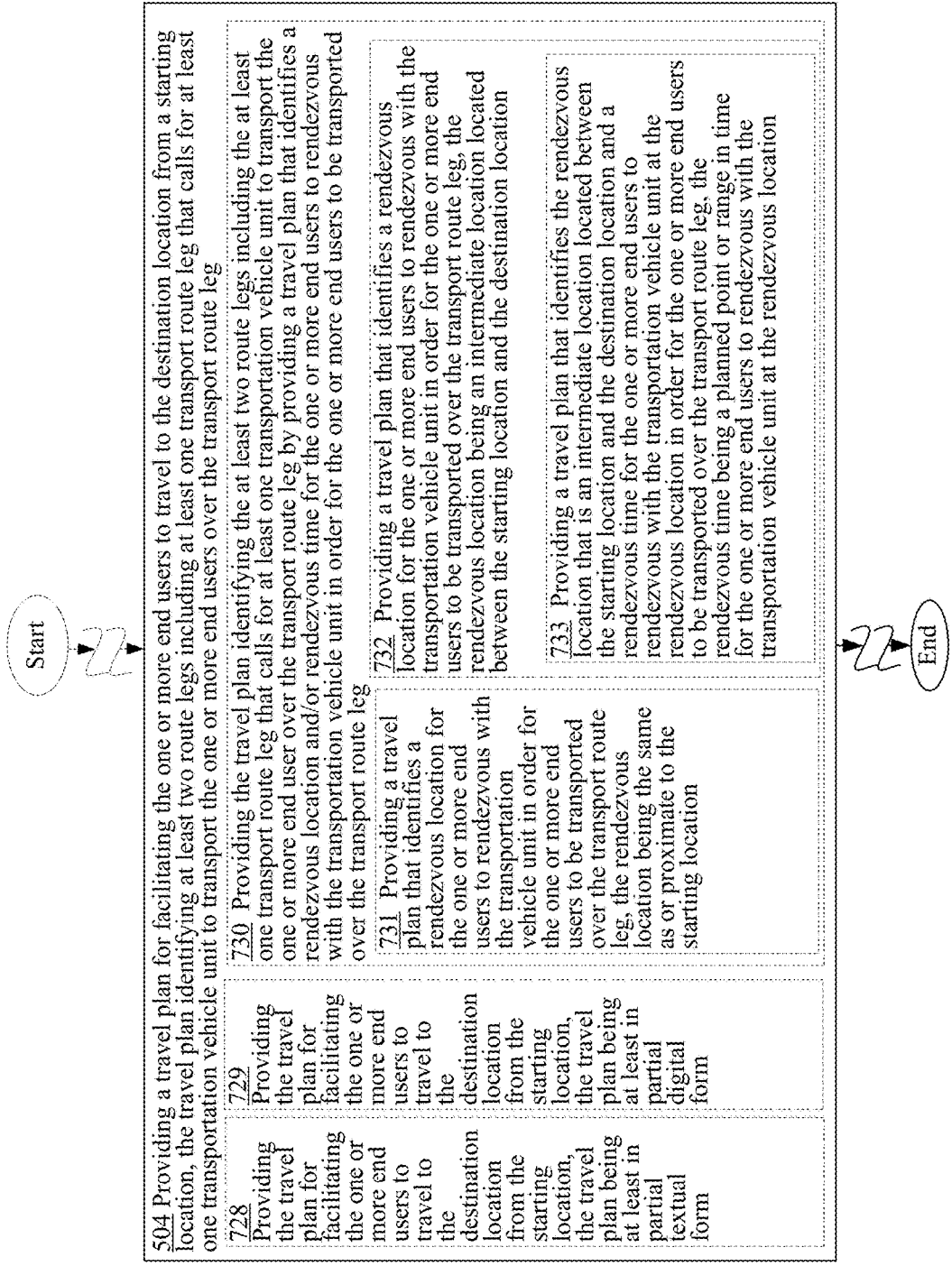
FIG. 7B is a high-level logic flowchart of a process depicting alternate implementations of the travel plan providing operation 504 of FIG. 5.

Turning to FIG. 7B, in various implementations, the travel plan providing operation 504 may include an operation 728 for providing the travel plan for facilitating the one or more end users to travel to the destination location from the starting location, the travel plan being at least in partial textual form. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* being at least in partial textual form (e.g., street names and turn by turn instructions as illustrated in, for example, FIG. 4B for route leg 1).

In the same or alternative implementations, the travel plan providing operation 504 may additionally or alternatively include an operation 729 for providing the travel plan for facilitating the one or more end users to travel to the destination location from the starting location, the travel plan being at least in partial digital form. For instance, the travel plan producing module 204* of the travel planning networking system 10* of FIG. 2A or 2B providing (e.g., producing) the travel plan 400* for facilitating the one or more end users 12 to travel to the destination location from the starting location, the travel plan 400* being at least in partial digital form (e.g., digital data readable by a computer device).

In the same or alternative implementations, the travel plan providing operation 504 may additionally or alternatively include an operation 730 for providing the travel plan identifying the at least two route legs including the at least one transport route leg that calls for at least one transportation vehicle unit to transport the one or more end user over the transport route leg by providing a travel plan that identifies a rendezvous location and/or rendezvous time for the one or more end users to rendezvous with the transportation vehicle unit in order for the one or more end users to be transported over the transport route leg. For instance, the travel plan producing module 204* of the travel planning networking system 10* of FIG. 2A or 2B providing the travel plan 400* identifying the at least two route legs including the at least one transport route leg that calls for at least one transportation vehicle unit 20* to transport the one or more end user 12 over the transport route leg by providing (e.g., producing) a travel plan 400* that identifies a rendezvous location and/or rendezvous time for the one or more end users to rendezvous with the transportation vehicle unit 20* in order for the one or more end users 12 to be transported over the transport route leg (e.g., route leg 2 of FIG. 4A or 4B).

As further illustrated in FIG. 7B, in some implementations, operation 730 may further include an operation 731 for providing a travel plan that identifies a rendezvous location for the one or more end users to rendezvous with the transportation vehicle unit in order for the one or more end users to be transported over the transport route leg, the rendezvous location being the same as or proximate to the starting location. For instance, the travel plan producing module 204* of the travel planning networking system 10* of FIG. 2A or 2B providing a travel plan 400f (see FIG. 4F) that identifies a rendezvous location (see the Route Leg Pickup Point of route leg 1 of FIG. 4F) for the one or more end users 12 to rendezvous with the transportation vehicle unit 20* in order for the one or more end users 12 to be transported over the transport route leg (e.g., transport route leg 1 of FIG. 4F), the rendezvous location being the same as or proximate to (e.g., within ¼ mile of) the starting location (e.g., FIG. 4F identifies a passenger pickup point for route leg 1 as 1425 Bellevue Way, the same as the starting location for the travel plan 400f). In other words, in this implementation, a transport route leg (e.g., a route leg that requires a transportation vehicle unit 20* for transporting one or more end users 12 over at least a portion of the route leg) is the first sequential route leg of a travel plan (e.g., travel plan 400f) that requires multiple route legs.

In some implementations, operation 730 may include an operation 732 for providing a travel plan that identifies a rendezvous location for the one or more end users to rendezvous with the transportation vehicle unit in order for the one or more end users to be transported over the transport route leg, the rendezvous location being an intermediate location located between the starting location and the destination location. For instance, the travel plan producing module 204* of the travel planning networking system 10* of FIG. 2A or 2B providing a travel plan (e.g., travel plan 400a or 400b of FIG. 4A or 4B) that identifies a rendezvous location (e.g., route leg starting point 424e of FIG. 4E or the "Ferry Terminal Exit at 1233 Alaskan Way" identified as the pickup location for route leg 3 of FIG. 4A or 4B) for the one or more end users 12 to rendezvous with the transportation vehicle unit 20* in order for the one or more end users 12 to be transported over the transport route leg (e.g., route leg 3 of FIG. 4A or 4B), the rendezvous location being an intermediate location (e.g., route leg starting point 424e of FIG. 4E) located between the starting location (e.g., route leg starting point 424c of FIG. 4C or the "213 Elm St. Bainbridge Island, Wash." indicated as the starting location in FIG. 4A or 4B) and the destination location (e.g., route leg end point 426e of FIG. 4E or the "1425 Bellevue Way, Bellevue, Wash." indicated as the destination location in FIG. 4A or 4B).

As further illustrated in FIG. 7B, in some cases, operation 732 may further include an operation 733 for providing a travel plan that identifies the rendezvous location that is an intermediate location located between the starting location and the destination location and a rendezvous time for the one or more end users to rendezvous with the transportation vehicle unit at the rendezvous location in order for the one or more end users to be transported over the transport route leg, the rendezvous time being a planned point or range in time for the one or more end users to rendezvous with the transportation vehicle unit at the rendezvous location. For instance, the travel plan producing module 204* of the travel planning networking system 10* of FIG. 2A or 2B providing or producing a travel plan (e.g., travel plan 400a or 400b of FIG. 4A or 4B) that identifies the rendezvous location (e.g., the "Ferry Terminal Exit at 1233 Alaskan Way" identified as the pickup location for route leg 3 of FIG. 4A or 4B or the route leg starting point 424e of FIG. 4E) that is an intermediate location located between the starting location (e.g., the "213 Elm St. Bainbridge Island, Wash." indicated as the starting location in FIG. 4A or 4B or the route leg starting point 424c of FIG. 4C) and the destination location (e.g., the "1425 Bellevue Way, Bellevue, Wash." indicated as the destination location in FIG. 4A or 4B or the route leg end point 426e of FIG. 4E) and a rendezvous time (e.g., the "pickup time: 9:55 AM" as indicated by FIGS. 4A and 4B for route leg 3) for the one or more end users 12 to rendezvous with the transportation vehicle unit 20* at the rendezvous location in order for the one or more end users 12 to be transported over the transport route leg (e.g., route leg 3 of FIG. 4A or 4B), the rendezvous time being a planned point or range in time for the one or more end users 12 to rendezvous with the transportation vehicle unit 20* at the rendezvous location.

Figure 7C:
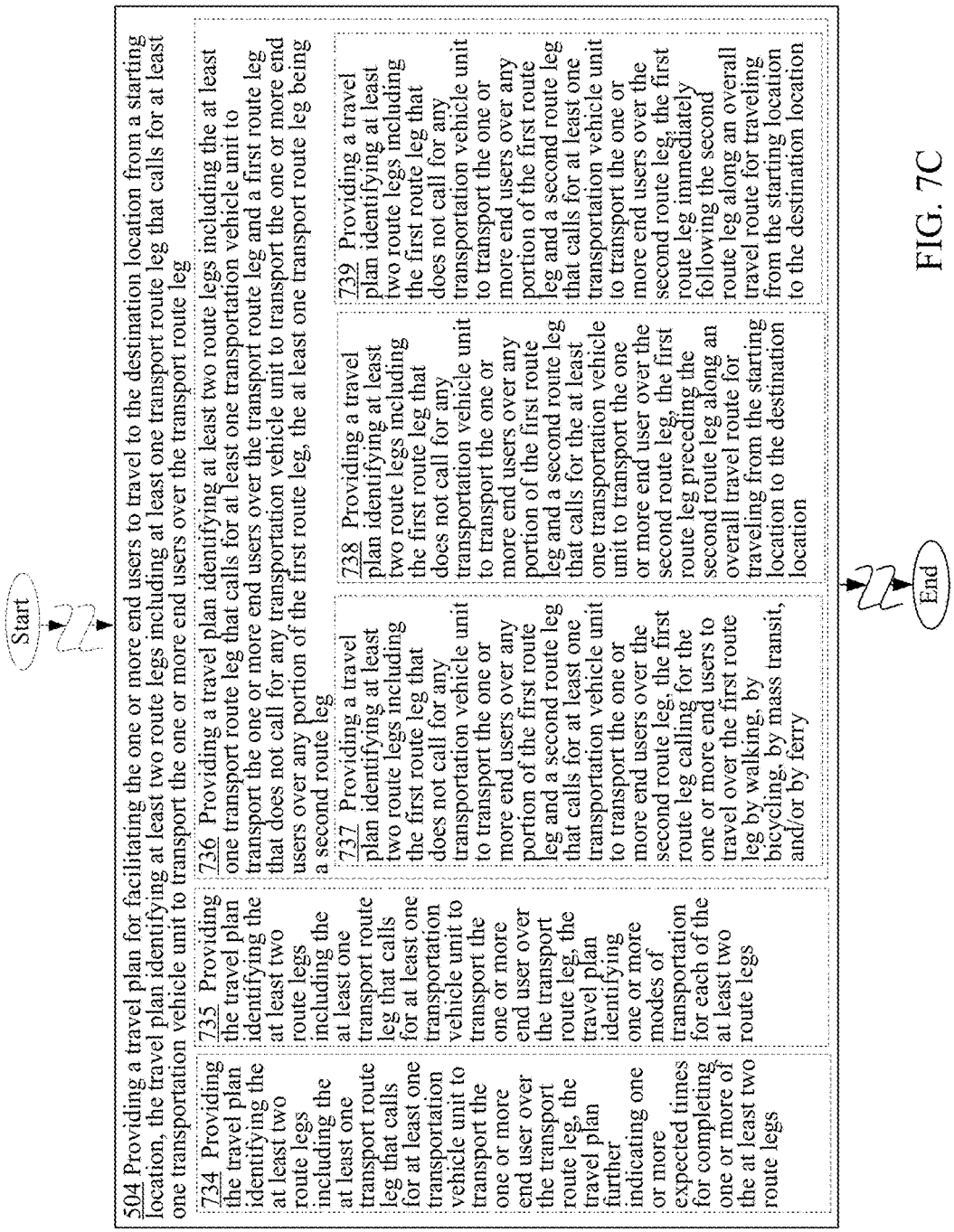
FIG. 7C is a high-level logic flowchart of a process depicting alternate implementations of the travel plan providing operation 504 of FIG. 5.

Referring now to FIG. 7C, in various implementations, the travel plan providing operation 504 may include an operation 734 for providing the travel plan identifying the at least two route legs including the at least one transport route leg that calls for at least one transportation vehicle unit to transport the one or more end user over the transport route leg, the travel plan further indicating one or more expected times for completing one or more of the at least two route legs. For instance, the travel plan producing module 204* of the travel planning networking system 10* of FIG. 2A or 2B providing (e.g., producing) the travel plan 400* identifying the at least two route legs including the at least one transport route leg (e.g., route leg 3 of FIG. 4A or 4B) that calls for at least one transportation vehicle unit 20* to transport the one or more end user 12 over the transport route leg, the travel plan 400* further indicating one or more expected times (e.g., the expected times may be the amount of time it takes to complete each of the route legs and/or the time of day that each route leg is completed) for completing one or more of the at least two route legs (see, for example, the "expected arrival times" for the various route legs illustrated in FIGS. 4A, 4B, 4F, and 4G).

In the same or alternative implementations, the travel plan providing operation 504 may additionally or alternatively include an operation 735 for providing the travel plan identifying the at least two route legs including the at least one transport route leg that calls for at least one transportation vehicle unit to transport the one or more end user over the transport route leg, the travel plan identifying one or more modes of transportation for each of the at least two route legs. For instance, the travel plan producing module 204* of the travel planning networking system 10* of FIG. 2A or 2B providing (e.g., producing) the travel plan 400* identifying the at least two route legs including the at least one transport route leg that calls for at least one transportation vehicle unit 20* to transport the one or more end user 12 over the transport route leg, the travel plan 400* identifying one or more modes of transportation (e.g., walking, transportation vehicle unit 20*, ferry, mass transit such as metro buses and commuter trains, and so forth) for each of the at least two route legs.

In the same or alternative implementations, the travel plan providing operation 504 may additionally or alternatively include an operation 736 for providing a travel plan identifying at least two route legs including the at least one transport route leg that calls for at least one transportation vehicle unit to transport the one or more end users over the transport route leg and a first route leg that does not call for any transportation vehicle unit to transport the one or more end users over any portion of the first route leg, the at least one transport route leg being a second route leg. For instance, the travel plan producing module 204* of the travel planning networking system 10* of FIG. 2A or 2B providing or producing a travel plan (e.g., travel plan 400a, 400b, or 400f of FIG. 4A, 4B, or 4F) identifying at least two route legs including the at least one transport route leg (e.g., route leg 3 of FIG. 4A or 4B, or route leg 1 of FIG. 4F) that calls for (e.g., requires use of and/or plans for) at least one transportation vehicle unit 20* to transport the one or more end users 12 over the transport route leg (e.g., route leg 3 of FIG. 4A or 4B, or route leg 1 of FIG. 4F) and a first route leg (e.g., route leg 1 or 2 of FIG. 4A or 4B, or route leg 2 or 3 of FIG. 4F) that does not call for any transportation vehicle unit 20* to transport the one or more end users 12 over any portion of the first route leg (e.g., route leg 1 or 2 of FIG. 4A or 4B, or route leg 2 or 3 of FIG. 4F), the at least one transport route leg (e.g., route leg 3 of FIG. 4A or 4B, or route leg 1 of FIG. 4F) being a second route leg.

As further illustrated in FIG. 7C, in some implementations, operation 736 may actually include or involve an operation 737 for providing a travel plan identifying at least two route legs including the first route leg that does not call for any transportation vehicle unit to transport the one or more end users over any portion of the first route leg and a second route leg that calls for at least one transportation vehicle unit to transport the one or more end users over the second route leg, the first route leg calling for the one or more end users to travel over the first route leg by walking, by bicycling, by mass transit, and/or by ferry. For instance, the travel plan producing module 204* of the travel planning networking system 10* of FIG. 2A or 2B providing a travel plan (e.g., travel plan 400a, 400b, or 400f of FIG. 4A, 4B, or 4F) identifying at least two route legs including the first route leg (e.g., route leg 1 or 2 of FIG. 4A or 4B, or route leg 2 or 3 of FIG. 4F) that does not call for any transportation vehicle unit 20* to transport the one or more end users 12 over any portion of the first route leg (e.g., route leg 1 or 2 of FIG. 4A or 4B, or route leg 2 or 3 of FIG. 4F) and a second route leg (e.g., route leg 3 of FIG. 4A or 4B, or route leg 1 of FIG. 4F) that calls for at least one transportation vehicle unit 20* to transport the one or more end users 12 over the second route leg (e.g., route leg 3 of FIG. 4A or 4B, or route leg 1 of FIG. 4F), the first route leg (e.g., route leg 1 or 2 of FIG. 4A or 4B, or route leg 2 or 3 of FIG. 4F) calling for the one or more end users 12 to travel over the first route leg (e.g., route leg 1 or 2 of FIG. 4A or 4B, or route leg 2 or 3 of FIG. 4F) by walking, by bicycling, by mass transit, and/or by ferry.

In some implementations, operation 736 may actually include or involve an operation 738 for providing a travel plan identifying at least two route legs including the first route leg that does not call for any transportation vehicle unit to transport the one or more end users over any portion of the first route leg and a second route leg that calls for the at least one transportation vehicle unit to transport the one or more end user over the second route leg, the first route leg preceding the second route leg along an overall travel route for traveling from the starting location to the destination location. For instance, the travel plan producing module 204* of the travel planning networking system 10* of FIG. 2A or 2B providing a travel plan (e.g., travel plan 400a or 400b of FIG. 4A or 4B) identifying at least two route legs including the first route leg (e.g., route leg 1 or 2 of FIG. 4A or 4B) that does not call for any transportation vehicle unit 20* to transport the one or more end users 12 over any portion of the first route leg (e.g., route leg 1 or 2 of FIG. 4A or 4B) and a second route leg (e.g., route leg 3 of FIG. 4A or 4B) that calls for the at least one transportation vehicle unit 20* to transport the one or more end user 12 over the second route leg (e.g., route leg 3 of FIG. 4A or 4B), the first route leg (e.g., route leg 1 or 2 of FIG. 4A or 4B) preceding the second route leg (e.g., route leg 3 of FIG. 4A or 4B) somewhere along an overall travel route for traveling from the starting location to the destination location.

In some implementations, operation 736 may actually include or involve an operation 739 for providing a travel plan identifying at least two route legs including the first route leg that does not call for any transportation vehicle unit to transport the one or more end users over any portion of the first route leg and a second route leg that calls for at least one transportation vehicle unit to transport the one or more end users over the second route leg, the first route leg immediately following the second route leg along an overall travel route for traveling from the starting location to the destination location. For instance, the travel plan producing module 204* of the travel planning networking system 10* of FIG. 2A or 2B providing a travel plan (e.g., travel plan 400f) identifying at least two route legs including the first route leg (e.g., route leg 2 or 3 of FIG. 4F) that does not call for any transportation vehicle unit 20* to transport the one or more end users 12 over any portion of the first route leg (e.g., route leg 2 or 3 of FIG. 4F) and a second route leg (e.g., route leg 1 of FIG. 4F) that calls for at least one transportation vehicle unit 20* to transport the one or more end users 12 over the second route leg (e.g., route leg 1 of FIG. 4F), the first route leg (e.g., route leg 2 or 3 of FIG. 4F) immediately following the second route leg (e.g., route leg 1 of FIG. 4F) along an overall travel route for traveling from the starting location to the destination location.

Figure 7D:
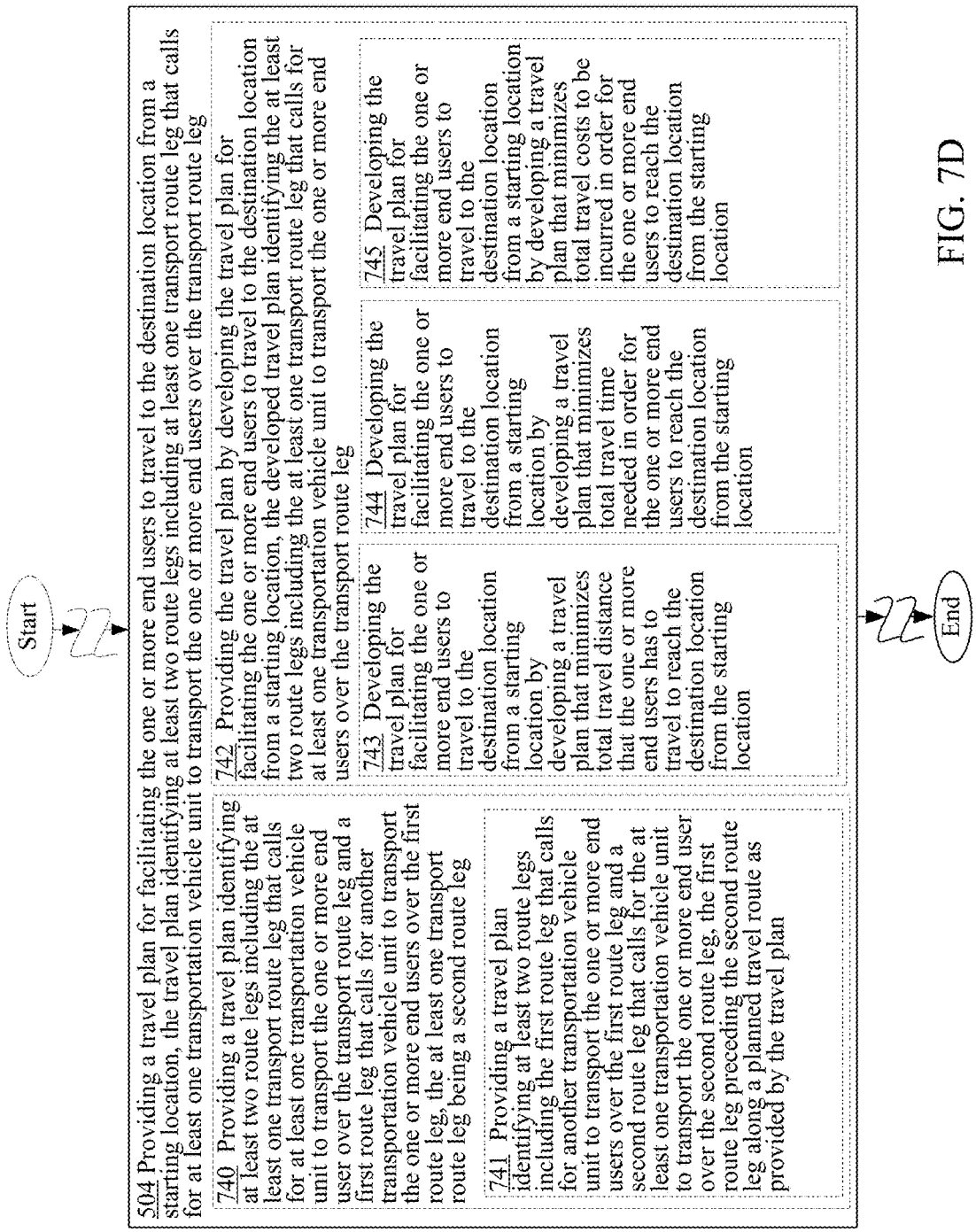
FIG. 7D is a high-level logic flowchart of a process depicting alternate implementations of the travel plan providing operation 504 of FIG. 5.

Turning now to FIG. 7D, in various implementations, the travel plan providing operation 504 may include an operation 740 for providing a travel plan identifying at least two route legs including the at least one transport route leg that calls for at least one transportation vehicle unit to transport the one or more end user over the transport route leg and a first route leg that calls for another transportation vehicle unit to transport the one or more end users over the first route leg, the at least one transport route leg being a second route leg. For instance, the travel plan producing module 204* of the travel planning networking system 10* of FIG. 2A or 2B providing or producing a travel plan (e.g., travel plan 400g of FIG. 4G) identifying at least two route legs including the at least one transport route leg (e.g., route leg 2 of FIG. 4G) that calls for (e.g., requires use of or plans for) at least one transportation vehicle unit 20a to transport the one or more end user 12 over the transport route leg (e.g., route leg 2 of FIG. 4G) and a first route leg (e.g., route leg 1 of FIG. 4G) that calls for another transportation vehicle unit 20b to transport the one or more end users 12 over the first route leg (e.g., route leg 1 of FIG. 4G), the at least one transport route leg (e.g., route leg 2 of FIG. 4G) being a second route leg.

In some cases, operation 740 may further include an operation 741 for providing a travel plan identifying at least two route legs including the first route leg that calls for another transportation vehicle unit to transport the one or more end users over the first route leg and a second route leg that calls for the at least one transportation vehicle unit to transport the one or more end user over the second route leg, the first route leg preceding the second route leg along a planned travel route as provided by the travel plan. For instance, the travel plan producing module 204* of the travel planning networking system 10* of FIG. 2A or 2B providing a travel plan (e.g., travel plan 400g of FIG. 4G) identifying at least two route legs including the first route leg (e.g., route leg 1 of FIG. 4G) that calls for another transportation vehicle unit 20b to transport the one or more end users 12 over the first route leg (e.g., route leg 1 of FIG. 4G) and a second route leg (e.g., route leg 2 of FIG. 4G) that calls for the at least one transportation vehicle unit 20a to transport the one or more end user 12 over the second route leg (e.g., route leg 2 of FIG. 4G), the first route leg (e.g., route leg 1 of FIG. 4G) immediately preceding the second route leg (e.g., route leg 2 of FIG. 4G) along a planned travel route as provided by the travel plan (e.g., travel plan 400g).

In various implementations, the travel plan providing operation 504 may include an operation 742 for providing the travel plan by developing the travel plan for facilitating the one or more end users to travel to the destination location from a starting location, the developed travel plan identifying the at least two route legs including the at least one transport route leg that calls for at least one transportation vehicle unit to transport the one or more end users over the transport route leg. For instance, the travel plan producing module 204* including the travel plan creating module 304 (see FIG. 3B) of the travel planning networking system 10* of FIG. 2A or 2B providing or producing the travel plan 400* by having the travel plan creating module 304 develop or create the travel plan 400* for facilitating the one or more end users 12 to travel to the destination location from a starting location, the developed travel plan 400* identifying the at least two route legs including the at least one transport route leg (e.g., route leg 3 of FIG. 4A or 4B, route leg 1 of FIG. 4F, or route leg 1 or 2 of FIG. 4G) that calls for at least one transportation vehicle unit 20* to transport the one or more end users 12 over the transport route leg.

In some cases, operation 742 may, in turn, further include an operation 743 for developing the travel plan for facilitating the one or more end users to travel to the destination location from a starting location by developing a travel plan that minimizes total travel distance that the one or more end users has to travel to reach the destination location from the starting location. For instance, the travel plan creating module 304 including the distance minimizing travel plan creating module 306 (see FIG. 3B) of the travel planning networking system 10* of FIG. 2A or 2B developing the travel plan 400* for facilitating the one or more end users 12 to travel to the destination location from a starting location by having the distance minimizing travel plan creating module 306 develop or create a travel plan 400* that minimizes total travel distance that the one or more end users 12 has to travel to reach the destination location from the starting location. Note that short-distance algorithms (e.g., Dijkstra's algorithm) are well-known and are frequently employed in order to find the shortest route/path between two points. In some cases, these short-distance algorithms may be applied not just to automobile routes but may also be applied to walking routes, ferry routes, and so forth in order to find the shortest overall routes.

In some implementations, operation 742 may include an operation 744 for developing the travel plan for facilitating the one or more end users to travel to the destination location from a starting location by developing a travel plan that minimizes total travel time needed in order for the one or more end users to reach the destination location from the starting location. For instance, the travel plan creating module 304 including the travel time minimizing travel plan creating module 308 (see FIG. 3B) of the travel planning networking system 10* of FIG. 2A or 2B developing the travel plan 400* for facilitating the one or more end users 12 to travel to the destination location from a starting location by having the travel time minimizing travel plan creating module 308 develop or create a travel plan 400* that minimizes total travel time needed in order for the one or more end users 12 to reach the destination location from the starting location. In some cases, the development of the a travel plan 400* that minimizes total travel time may be achieved by generating alternative travel routes (that may employ different modes of transportation) to a destination location from a starting location and selecting from the alternative travel routes the travel route that takes the shortest time to complete based on automobile speed limits, mass transit or ferry speeds, distances of specific legs, traffic conditions along certain corridors, and so forth. Alternatively, a modified version of a short-distance algorithm that takes into account the speed limits, ferry speed, projected completion times of various route legs based on traffic conditions, and so forth, may be employed in order to develop or create a travel plan 400* that minimizes total travel time needed in order to reach the destination location from the starting location.

In some implementations, operation 742 may include an operation 745 for developing the travel plan for facilitating the one or more end users to travel to the destination location from a starting location by developing a travel plan that minimizes total travel costs to be incurred in order for the one or more end users to reach the destination location from the starting location. For instance, the travel plan creating module 304 including the travel cost minimizing travel plan creating module 310 (see FIG. 3B) of the travel planning networking system 10* of FIG. 2A or 2B developing the travel plan 400* for facilitating the one or more end users 12 to travel to the destination location from a starting location by having the travel cost minimizing travel plan creating module 310 develop or create a travel plan 400* that minimizes total travel costs to be incurred in order for the one or more end users 12 to reach the destination location from the starting location. In some cases, the development of a travel plan 400* that minimizes total travel costs may be accomplished by determining the costs of different alternative route legs (e.g., using different modes of transportation with different planned travel routes for each route leg) and selecting the combination of travel route legs that will result in the lowest overall travel cost.

Figure 7E:
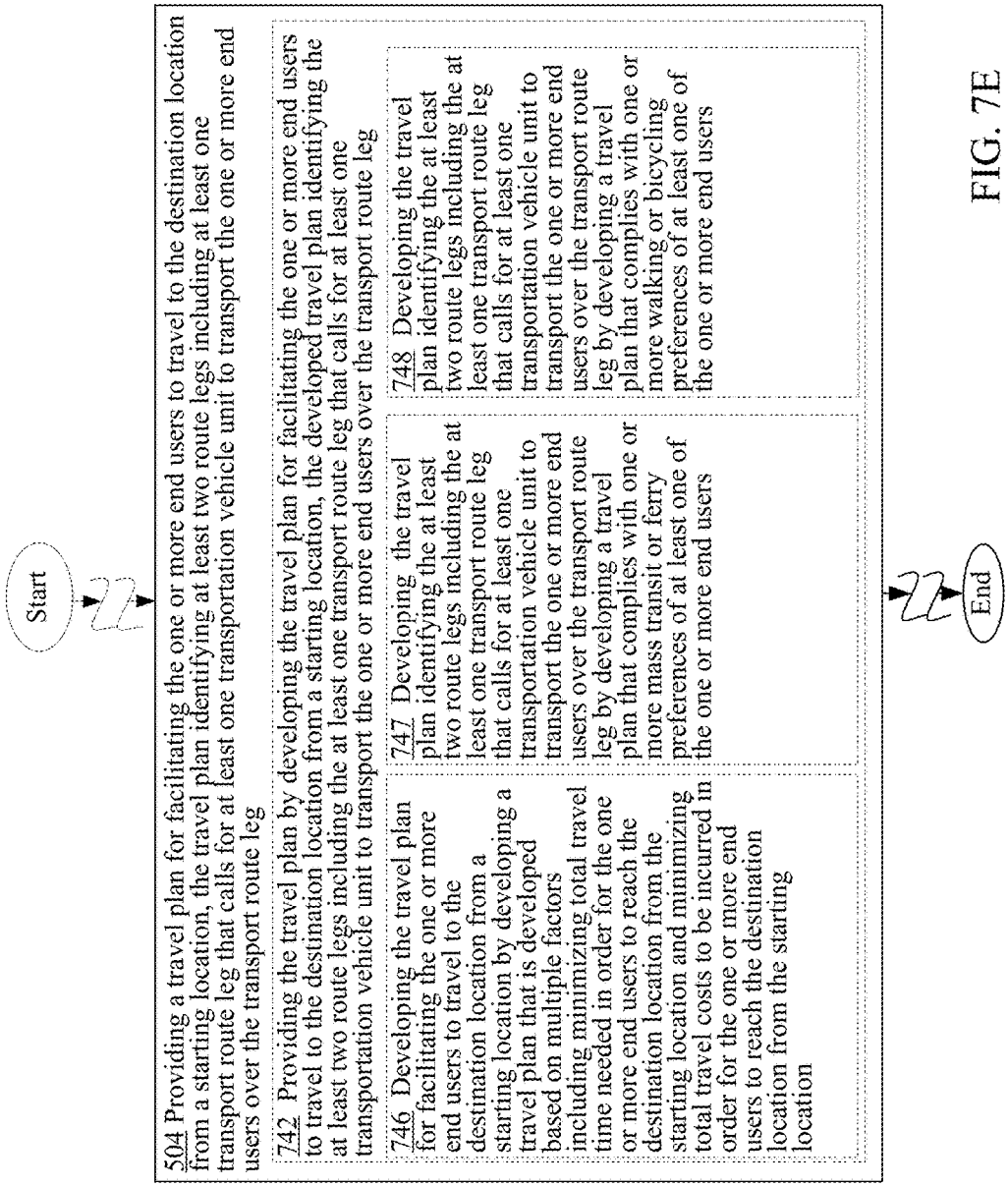
FIG. 7E is a high-level logic flowchart of a process depicting alternate implementations of the travel plan providing operation 504 of FIG. 5.

In some implementations, operation 742 may include an operation 746 for developing the travel plan for facilitating the one or more end users to travel to the destination location from a starting location by developing a travel plan that is developed based on multiple factors including minimizing total travel time needed in order for the one or more end users to reach the destination location from the starting location and minimizing total travel costs to be incurred in order for the one or more end users to reach the destination location from the starting location as illustrated in FIG. 7E. For instance, the travel plan creating module 304 including the multiple factors travel plan creating module 312 (see FIG. 3B) of the travel planning networking system 10* of FIG. 2A or 2B developing the travel plan 400* for facilitating the one or more end users 12 to travel to the destination location from a starting location by having the multiple factors travel plan creating module 312 develop or create a travel plan 400* that is developed based on multiple factors including minimizing total travel time needed in order for the one or more end users 12 to reach the destination location from the starting location and minimizing total travel costs to be incurred in order for the one or more end users 12 to reach the destination location from the starting location.

In some implementations, operation 742 may include an operation 747 for developing the travel plan identifying the at least two route legs including the at least one transport route leg that calls for at least one transportation vehicle unit to transport the one or more end users over the transport route leg by developing a travel plan that complies with one or more mass transit or ferry preferences of at least one of the one or more end users. For instance, the travel plan creating module 304 including the mass transit/ferry preference compliant travel plan creating module 314 (see FIG. 3B) of the travel planning networking system 10* of FIG. 2A or 2B developing the travel plan 400* identifying the at least two route legs including the at least one transport route leg that calls for at least one transportation vehicle unit 20* to transport the one or more end users 12 over the transport route leg by having the mass transit/ferry preference compliant travel plan creating module 314 develop or create a travel plan 400* that complies with one or more mass transit or ferry preferences (e.g., preference for using certain ferries that depart at certain times, preference for not using certain ferries or metro bus routes, and so forth) of at least one of the one or more end users 12.

In some implementations, operation 742 may include an operation 748 for developing the travel plan identifying the at least two route legs including the at least one transport route leg that calls for at least one transportation vehicle unit to transport the one or more end users over the transport route leg by developing a travel plan that complies with one or more walking or bicycling preferences of at least one of the one or more end users. For instance, the travel plan creating module 304 including the walking/bicycling preference compliant travel plan creating module 316 (see FIG. 3B) of the travel planning networking system 10* of FIG. 2A or 2B developing the travel plan 400* identifying the at least two route legs including the at least one transport route leg that calls for at least one transportation vehicle unit 20* to transport the one or more end users 12 over the transport route leg by having the walking/bicycling preference compliant travel plan creating module 316 develop or create a travel plan 400* that complies with one or more walking or bicycling preferences (e.g., preference that the end user 12 not walk more than a quarter mile for any route leg) of at least one of the one or more end users 12.

Figure 7F:
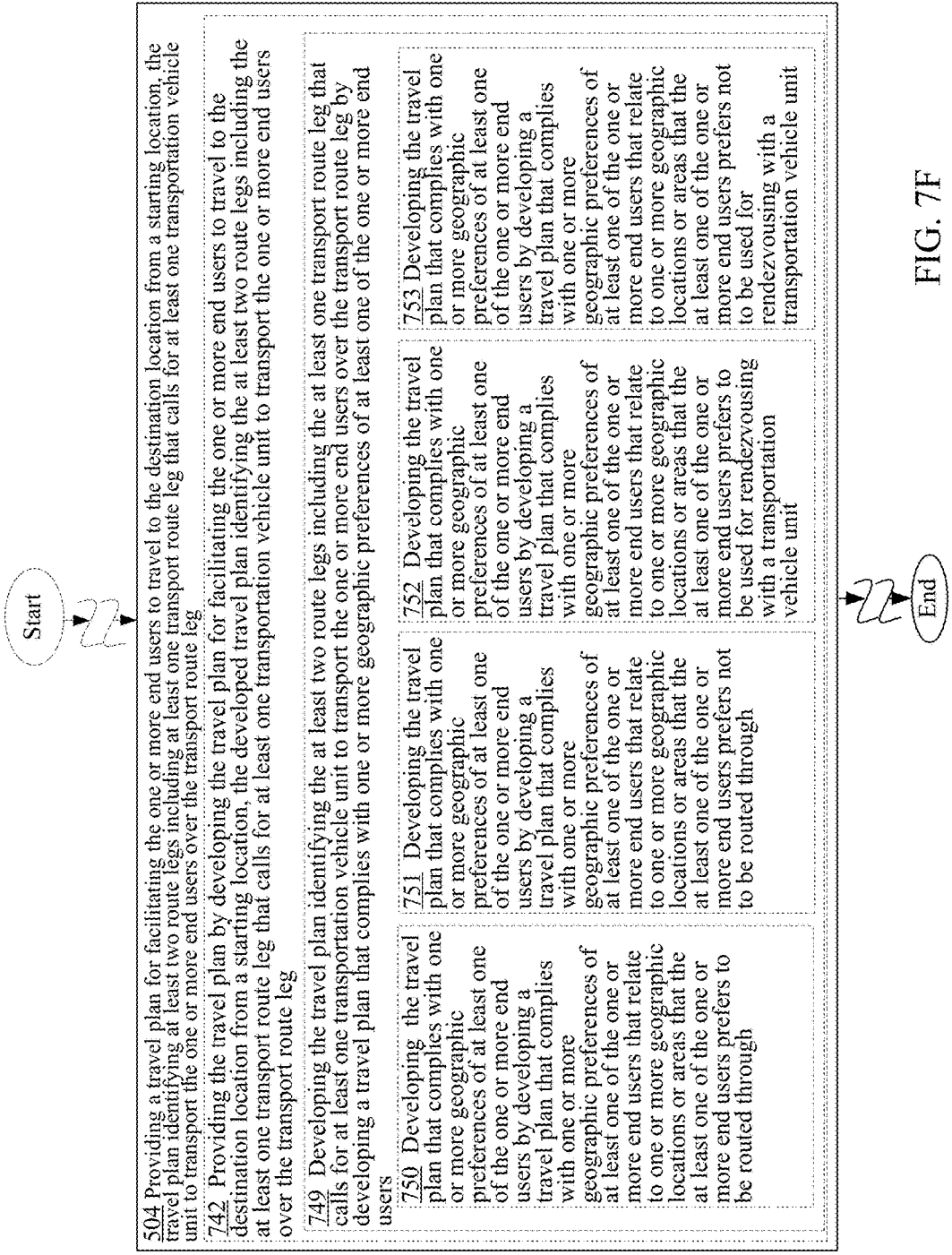
FIG. 7F is a high-level logic flowchart of a process depicting alternate implementations of the travel plan providing operation 504 of FIG. 5.

Turning now to FIG. 7F, in various implementations, operation 742 for providing the travel plan by developing the travel plan for facilitating the one or more end users to travel to the destination location from a starting location, the developed travel plan identifying the at least two route legs including the at least one transport route leg that calls for at least one transportation vehicle unit to transport the one or more end users over the transport route leg may include an operation 749 for developing the travel plan identifying the at least two route legs including the at least one transport route leg that calls for at least one transportation vehicle unit to transport the one or more end users over the transport route leg by developing a travel plan that complies with one or more geographic preferences of at least one of the one or more end users. For instance, the travel plan creating module 304 including the geographic preference compliant travel plan creating module 318 (see FIG. 3B) of the travel planning networking system 10\* of FIG. 2A or 2B developing the travel plan 400\* identifying the at least two route legs including the at least one transport route leg that calls for at least one transportation vehicle unit 20\* to transport the one or more end users over the transport route leg by having the geographic preference compliant travel plan creating module 318 develop or create a travel plan 400\* that complies with one or more geographic preferences (e.g., a preference that the one or more end users 12 be or not be routed through a particular geographic location/area) of at least one of the one or more end users 12.

As further illustrated in FIG. 7F, in various implementations operation 749 may include one or more additional operations including, in some cases, an operation 750 for developing the travel plan that complies with one or more geographic preferences of at least one of the one or more end users by developing a travel plan that complies with one or more geographic preferences of at least one of the one or more end users that relate to one or more geographic locations or areas that the at least one of the one or more end users prefers to be routed through. For instance, the geographic preference compliant travel plan creating module 318 of the travel planning networking system 10\* of FIG. 2A or 2B developing the travel plan 400\* that complies with one or more geographic preferences of at least one of the one or more end users 12 by developing or creating a travel plan 400\* that complies with one or more geographic preferences of at least one of the one or more end users t12 that relate to one or more geographic locations or areas (e.g., preference may be related to a specific street, freeway, city neighborhood, etc.) that the at least one of the one or more end users prefers to be routed through.

In the same or different implementations, operation 749 may additionally or alternatively include an operation 751 for developing the travel plan that complies with one or more geographic preferences of at least one of the one or more end users by developing a travel plan that complies with one or more geographic preferences of at least one of the one or more end users that relate to one or more geographic locations or areas that the at least one of the one or more end users prefers not to be routed through. For instance, the geographic preference compliant travel plan creating module 318 of the travel planning networking system 10\* of FIG. 2A or 2B developing the travel plan 400\* that complies with one or more geographic preferences of at least one of the one or more end users 12 by developing or creating a travel plan 400\* that complies with one or more geographic preferences of at least one of the one or more end users 12 that relate to one or more geographic locations or areas (e.g., certain neighborhoods, body of water—avoid ferries, and so forth) that the at least one of the one or more end users prefers not to be routed through.

In the same or different implementations, operation 749 may additionally or alternatively include an operation 752 for developing the travel plan that complies with one or more geographic preferences of at least one of the one or more end users by developing a travel plan that complies with one or more geographic preferences of at least one of the one or more end users that relate to one or more geographic locations or areas that the at least one of the one or more end users prefers to be used for rendezvousing with a transportation vehicle unit. For instance, the geographic preference compliant travel plan creating module 318 of the travel planning networking system 10\* of FIG. 2A or 2B developing the travel plan 400\* that complies with one or more geographic preferences of at least one of the one or more end users 12 by developing or creating a travel plan 400\* that complies with one or more geographic preferences of at least one of the one or more end users 12 that relate to one or more geographic locations or areas that the at least one of the one or more end users 12 prefers to be used for rendezvousing with a transportation vehicle unit 20\*. For example, an end user 12 may prefer to be "picked up" at locations that are handicap friendly (e.g., accommodates wheel chairs).

In the same or different implementations, operation 749 may additionally or alternatively include an operation 753 for developing the travel plan that complies with one or more geographic preferences of at least one of the one or more end users by developing a travel plan that complies with one or more geographic preferences of at least one of the one or more end users that relate to one or more geographic locations or areas that the at least one of the one or more end users prefers not to be used for rendezvousing with a transportation vehicle unit. For instance, the geographic preference compliant travel plan creating module 318 of the travel planning networking system 10\* of FIG. 2A or 2B developing the travel plan 400\* that complies with one or more geographic preferences of at least one of the one or more end users 12 by developing or creating a travel plan 400\* that complies with one or more geographic preferences of at least one of the one or more end users 12 that relate to one or more geographic locations or areas that the at least one of the one or more end users 12 prefers not to be used for rendezvousing with a transportation vehicle unit 20\*. For example, an end user 12 may prefer to avoid using certain locales as a rendezvous location for security reasons (e.g., the end user 12 believes that certain locations are unsafe).

Referring now to FIG. 7G, in some implementations, operation 742 for providing the travel plan by developing the travel plan for facilitating the one or more end users to travel to the destination location from a starting location, the developed travel plan identifying the at least two route legs including the at least one transport route leg that calls for at least one transportation vehicle unit to transport the one or more end users over the transport route leg may actually include an operation 754 for developing a travel plan for facilitating the one or more end users to travel to the destination location from a starting location, the travel plan identifying at least two route legs including at least a first route leg that immediately precedes a second route leg for traveling at least partway between the starting location and the destination location, the second route leg being the at least one transport route leg that calls for at least one transportation vehicle unit to transport the one or more end users over the second route leg. For instance, the travel plan creating module 304 of the travel planning networking system 10\* of FIG. 2A or 2B developing a travel plan (e.g., travel plan 400a or 400b of FIG. 4A or 4B, or travel plan 400g of FIG. 4G) for facilitating the one or more end users 12 to travel to the destination location from a starting location, the travel plan (e.g., travel plan 400a, 400b, or 400c of FIG. 4A, 4B, or 4C) identifying at least two route legs including at least a first route leg (e.g., route leg 2 of FIG. 4A or 4B, or route leg 1 of FIG. 4G) that immediately precedes a second route leg (e.g., route leg 3 of FIG. 4A or 4B, or route leg 2 of FIG. 4G) for traveling at least partway between the starting location and the destination location, the second route leg (e.g., route leg 3 of FIG. 4A or 4B, or route leg 2 of FIG. 4G) being the at least one transport route leg that calls for at least one transportation vehicle unit 20 to transport the one or more end users 12 over the second route leg (e.g., route leg 3 of FIG. 4A or 4B, or route leg 2 of FIG. 4G).

In some implementations, operation 754 may include an operation 755 for developing a travel plan identifying the at least two route legs including at least the first route leg that immediately precedes the second route leg for traveling at least partway between the starting location and the destination location, the second route being the at least one transport route leg that calls for at least one transportation vehicle unit to transport the one or more end users over the second route leg, and the first route leg does not call for any transportation vehicle unit to transport the one or more end users over any portion of the first route leg. For instance, the travel plan creating module 304 of the travel planning networking system 10* of FIG. 2A or 2B developing a travel plan (e.g., travel plan 400a or 400b of FIG. 4A or 4B) identifying the at least two route legs including at least the first route leg (e.g. route leg 2 of FIG. 4A or 4B) that immediately precedes the second route leg (e.g., route leg 3 of FIG. 4A or 4B) for traveling at least partway between the starting location and the destination location, the second route (e.g., route leg 3 of FIG. 4A or 4B) being the at least one transport route leg that calls for at least one transportation vehicle unit 20* to transport the one or more end users 12 over the second route leg (e.g., route leg 3 of FIG. 4A or 4B), and the first route leg (e.g. route leg 2 of FIG. 4A or 4B) does not call for any transportation vehicle unit 20* to transport the one or more end users 12 over any portion of the first route leg (e.g. route leg 2 of FIG. 4A or 4B).

In some implementations, operation 754 may include an operation 756 for developing a travel plan identifying the at least two route legs including at least the first route leg that immediately precedes the second route leg for traveling at least partway between the starting location and the destination location, the second route leg being the at least one transport route leg that calls for at least one transportation vehicle unit to transport the one or more end users over the second route leg, and the first route leg that calls for another transportation vehicle unit to transport the one or more end users over the first route leg. For instance, the travel plan creating module 304 of the travel planning networking system 10* of FIG. 2A or 2B developing a travel plan (e.g., travel plan 400g) identifying the at least two route legs including at least the first route leg (e.g., route leg 1 of FIG. 4G) that immediately precedes the second route leg (e.g., route leg 2 of FIG. 4G) for traveling at least partway between the starting location and the destination location, the second route leg (e.g., route leg 2 of FIG. 4G) being the at least one transport route leg that calls for at least one transportation vehicle unit 20a to transport the one or more end users 12 over the second route leg (e.g., route leg 2 of FIG. 4G), and the first route leg (e.g., route leg 1 of FIG. 4G) that calls for another transportation vehicle unit 20b to transport the one or more end users 12 over the first route leg (e.g., route leg 1 of FIG. 4G).

In some implementations, operation 754 may include an operation 757 for developing the travel plan including determining a rendezvous location for the one or more end users to rendezvous with the transportation vehicle unit in order to be transported over the second route leg. For instance, the travel plan creating module 304 including the rendezvous location ascertaining module 320 (see FIG. 3B) of the travel planning networking system 10* of FIG. 2A or 2B developing or creating the travel plan 400* including determining, or ascertaining by the rendezvous location ascertaining module 320, a rendezvous location for the one or more end users to rendezvous with the transportation vehicle unit 20* in order for the one or more end users 12 to be transported over the second route leg (e.g., route leg 3 of FIG. 4A or 4B).

As further illustrated in FIG. 7G, in some implementations, operation 757 may further include an operation 758 for determining the rendezvous location for the one or more end users to rendezvous with the transportation vehicle unit including estimating a rendezvous time for the one or more end users to rendezvous with the transportation vehicle unit at the rendezvous location, the estimating as a result of estimating the amount of time it will take for the one or more end users to travel over the first route leg. For instance, the rendezvous location ascertaining module 320 including the rendezvous time estimating module 322 (see FIG. 3B) of the travel planning networking system 10* of FIG. 2A or 2B determining the rendezvous location for the one or more end users 12 to rendezvous with the transportation vehicle unit 20* including estimating, by the rendezvous time estimating module 322, a rendezvous time for the one or more end users 12 to rendezvous with the transportation vehicle unit 20* at the rendezvous location, the estimating as a result of estimating (e.g., estimating may be based on ferry schedule, the estimated walking speed of end users, traffic conditions, etc.) the amount of time it will take for the one or more end users 12 to travel over the first route leg (e.g., route leg 2 of FIG. 4A or 4B). In some cases, the estimating may be based on information (e.g., ferry schedules, traffic conditions, mass transit or ferry tracking data, and so forth) that may be provided by a third party system 18 (see FIG. 1).

Figure 7H:
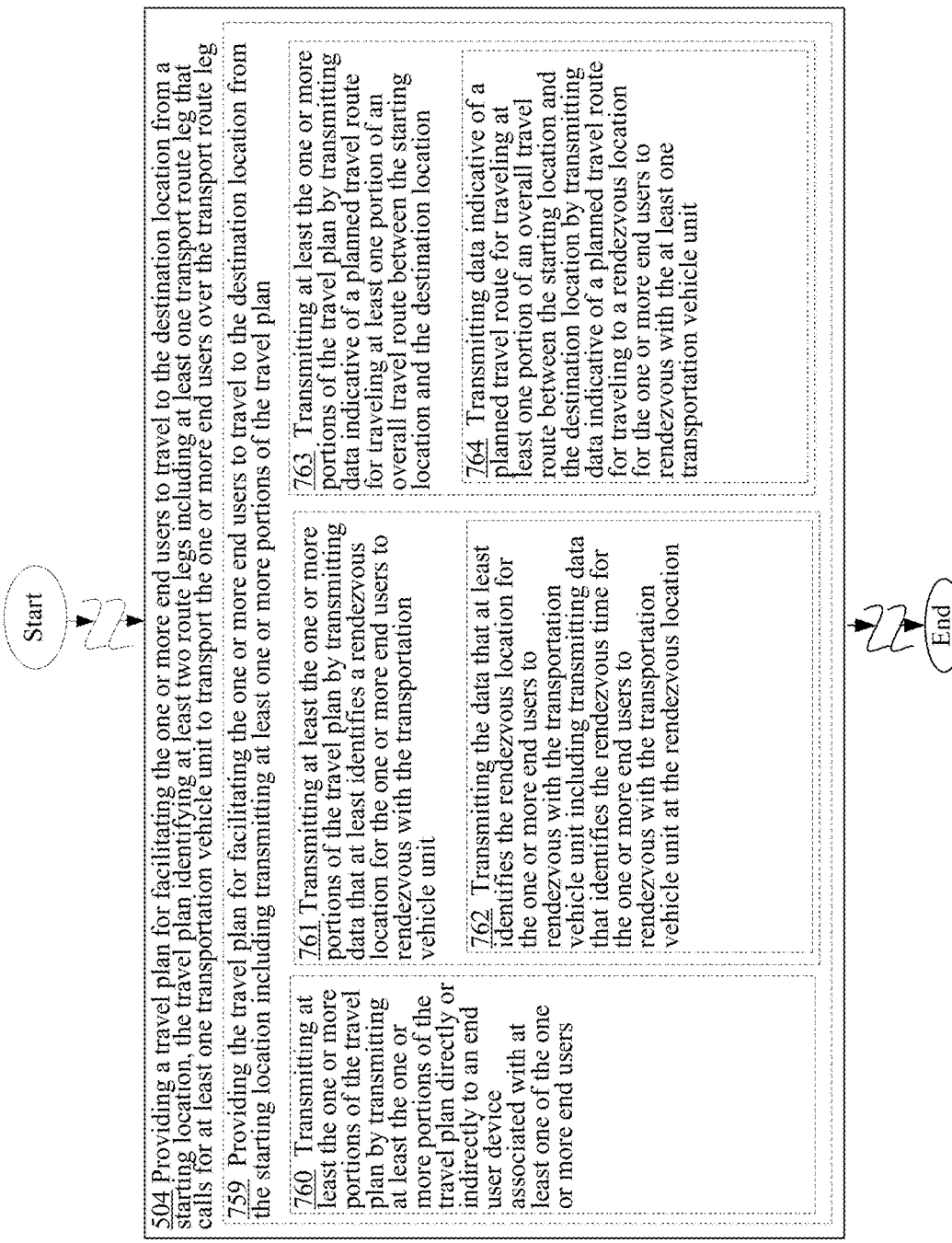
FIG. 7H is a high-level logic flowchart of a process depicting alternate implementations of the travel plan providing operation 504 of FIG. 5.

Turning to FIG. 7H, in various implementations, the travel plan providing operation 504 may include an operation 759 for providing the travel plan for facilitating the one or more end users to travel to the destination location from the starting location including transmitting at least one or more portions of the travel plan. For instance, the travel plan producing module 204* including the travel plan transmitting module 324 (see FIG. 3B) of the travel planning networking system 10* of FIG. 2A or 2B providing the travel plan 400* for facilitating the one or more end users 12 to travel to the destination location from the starting location including transmitting, by the travel plan transmitting module 324, at least one or more portions (e.g., information that indicates end and starting points of each route leg, information that indicates rendezvous location[s] for rendezvousing with transportation vehicle unit[s], information that indicates rendezvous time for rendezvousing with transportation vehicle unit[s], and so forth) of the travel plan 400*. In various embodiments, the one or more portions of the travel plan 400* may be transmitted via one or more wireless and/or wired networks 16.

As further illustrated in FIG. 7H, in various implementations, operation 759 may further include one or more additional operations including, in some cases, an operation 760 for transmitting at least the one or more portions of the travel plan by transmitting at least the one or more portions of the travel plan directly or indirectly to an end user device associated with at least one of the one or more end users. For instance, the travel plan transmitting module 324 of the travel planning networking system 10* of FIG. 2A or 2B transmitting at least the one or more portions of the travel plan 400* by transmitting at least the one or more portions of the travel plan 400* directly or indirectly to an end user device 14 (e.g., a Smartphone, a tablet computer, a laptop or desktop computer, and so forth) associated with at least one of the one or more end users 12.

In the same or alternative implementations, operation 759 may additionally or alternatively include an operation 761 for transmitting at least the one or more portions of the travel plan by transmitting data that at least identifies a rendezvous location for the one or more end users to rendezvous with the transportation vehicle unit. For instance, the travel plan transmitting module 324 including the rendezvous data transmitting module 326 (see FIG. 3B) of the travel planning networking system 10* of FIG. 2A or 2B transmitting at least the one or more portions of the travel plan 400* by having the rendezvous data transmitting module 326 transmit data that at least identifies a rendezvous location for the one or more end users 12 to rendezvous with the transportation vehicle unit 20*.

In some cases, operation 761 may further include an operation 762 for transmitting the data that at least identifies the rendezvous location for the one or more end users to rendezvous with the transportation vehicle unit including transmitting data that identifies the rendezvous time for the one or more end users to rendezvous with the transportation vehicle unit at the rendezvous location. For instance, the rendezvous data transmitting module 326 of the travel planning networking system 10* of FIG. 2A or 2B transmitting the data that at least identifies the rendezvous location for the one or more end users 12 to rendezvous with the transportation vehicle unit 20* including transmitting data that identifies the rendezvous time (e.g., a point in time or a time range) for the one or more end users 12 to rendezvous with the transportation vehicle unit 20* at the rendezvous location.

In various implementations, operation 759 may include an operation 763 for transmitting at least the one or more portions of the travel plan by transmitting data indicative of a planned travel route for traveling at least one portion of an overall travel route between the starting location and the destination location. For instance, the travel plan transmitting module 324 including the planned travel route data transmitting module 328 (see FIG. 3B) of the travel planning networking system 10* of FIG. 2A or 2B transmitting at least the one or more portions of the travel plan 400* by having the planned travel route data transmitting module 328 transmit data indicative of a planned travel route for traveling at least one portion (e.g., a route leg) of an overall route (e.g., overall travel route that may be fully or partially planned) between the starting location and the destination location.

In some cases, operation 763 may further include an operation 764 for transmitting data indicative of a planned travel route for traveling at least one portion of an overall travel route between the starting location and the destination location by transmitting data indicative of a planned travel route for traveling to a rendezvous location for the one or more end users to rendezvous with the at least one transportation vehicle unit. For instance, t the planned travel route data transmitting module 328 (see FIG. 3B) of the travel planning networking system 10* of FIG. 2A or 2B transmitting data indicative of a planned travel route for traveling at least one portion (e.g., a route leg) of an overall travel route between the starting location and the destination location by transmitting data indicative of a planned travel route (e.g., a planned walking route, a ferry route, a planned transport vehicle unit route, and so forth) for traveling to a rendezvous location for the one or more end users 12 to rendezvous with the at least one transportation vehicle unit 20*.

Figure 7I:
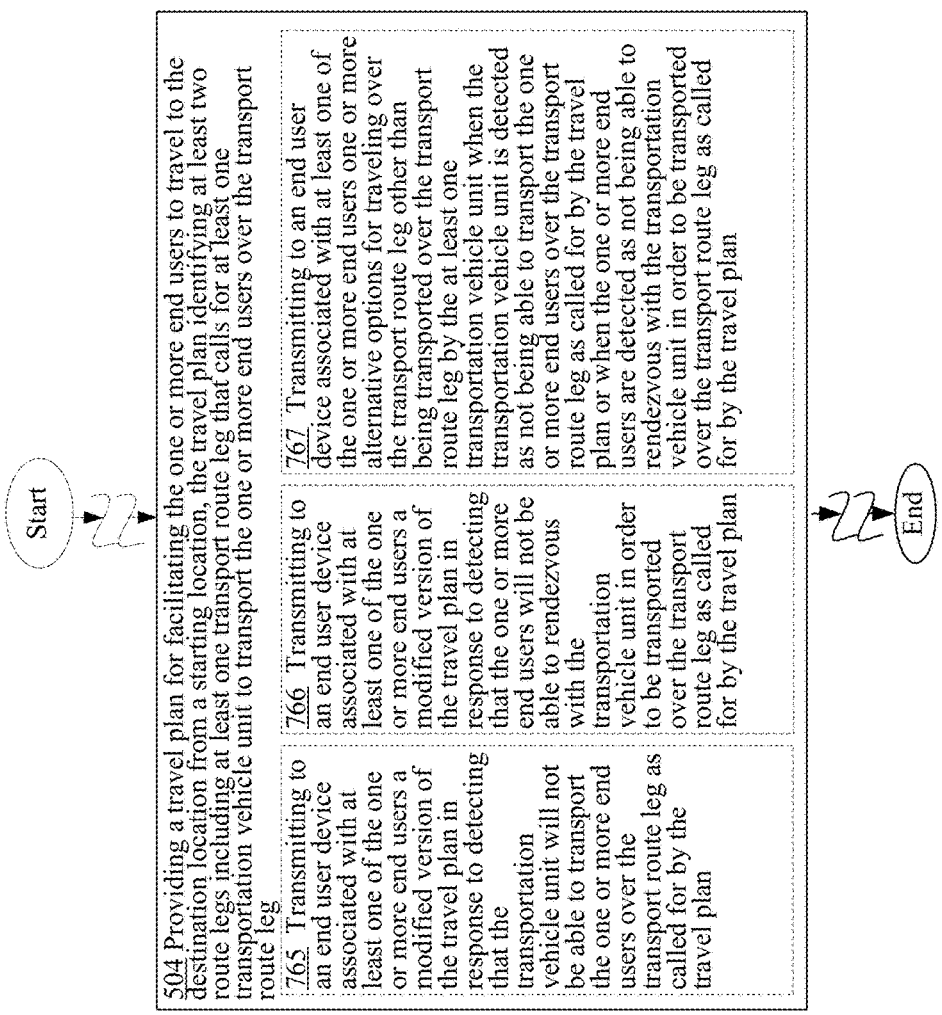
FIG. 7I is a high-level logic flowchart of a process depicting alternate implementations of the travel plan providing operation 504 of FIG. 5.

Referring now to FIG. 7I, in various implementations, the travel plan providing operation 504 may include an operation 765 for transmitting to an end user device associated with at least one of the one or more end users a modified version of the travel plan in response to detecting that the transportation vehicle unit will not be able to transport the one or more end users over the transport route leg as called for by the travel plan. For instance, the modified travel plan transmitting module 330 (see FIG. 3B) of the travel planning networking system 10* of FIG. 2A or 2B transmitting to an end user device 14 associated with at least one of the one or more end users 12 a modified version of the travel plan 400* in response to detecting that the transportation vehicle unit 20* will not be able to transport the one or more end users 12 over the transport route leg as called for by the travel plan 400*. That is, in some implementations, the status (e.g., location and/or passenger status) of a transportation vehicle unit 20* that was assigned to transport one or more end users 12 may be monitored in order to determine whether the transportation vehicle unit 20* will be able to fulfill its obligations of transporting one or more end users 12 in accordance with a travel plan 400*. If it is determined that the transportation vehicle unit 20* is unable to meet its obligations to transport the one or more end users 12 in accordance with the travel plan 400* than a modified version of the travel plan may be provided.

In some implementations, the travel plan providing operation 504 may include an operation 766 for transmitting to an end user device associated with at least one of the one or more end users a modified version of the travel plan in response to detecting that the one or more end users will not be able to rendezvous with the transportation vehicle unit in order to be transported over the transport route leg as called for by the travel plan. For instance, the modified travel plan transmitting module 330 (see FIG. 3B) of the travel planning networking system 10* of FIG. 2A or 2B transmitting to an end user device 14 associated with at least one of the one or more end users 12 a modified version of the travel plan 400* in response to detecting that the one or more end users 12 will not be able to rendezvous with the transportation vehicle unit 20* in order to be transported over the transport route leg as called for by the travel plan 400*. That is, the locations of the one or more end users 12 may be monitored in order to determine whether the one or more end users 12 will be able to rendezvous with the transportation vehicle unit 20* in accordance with a travel plan 400*. If it is determined that the one or more end users 12 are unable to rendezvous with the transportation vehicle unit 20* in accordance with a travel plan 400* then a modified version of the originally provided travel plan 400* may be provided.

In some implementations, the travel plan providing operation 504 may include an operation 767 for transmitting to an end user device associated with at least one of the one or more end users one or more alternative options for traveling over the transport route leg other than being transported over the transport route leg by the at least one transportation vehicle unit when the transportation vehicle unit is detected as not being able to transport the one or more end users over the transport route leg as called for by the travel plan or when the one or more end users are detected as not being able to rendezvous with the transportation vehicle unit in order to be transported over the transport route leg as called for by the travel plan. For instance, the alternative option transmitting module 332 (see FIG. 3B) of the travel planning networking system 10* of FIG. 2A or 2B transmitting to an end user device 14 associated with at least one of the one or more end users 12 one or more alternative options (e.g., walking, using mass transit, or to wait for another transportation vehicle unit when the originally assigned transportation vehicle unit is no longer available) for traveling over the transport route leg (e.g., route leg 3 of FIG. 4A or 4B) other than being transported over the transport route leg (e.g., route leg 3 of FIG. 4A or 4B) by the at least one transportation vehicle unit 20* when the transportation vehicle unit 20* (which was originally assigned to transport the one or more end users 12 over the transport route leg) is detected as not being able to transport the one or more end users 12 over the transport route leg as called for by the travel plan 400* or when the one or more end users 12 are detected as not being able to rendezvous with the transportation vehicle unit 20* in order to be transported over the transport route leg (e.g., route leg 3 of FIG. 4A or 4B) as called for by the travel plan (e.g., travel plan 400a or 400b of FIG. 4A or 4B).

Figure 8A:
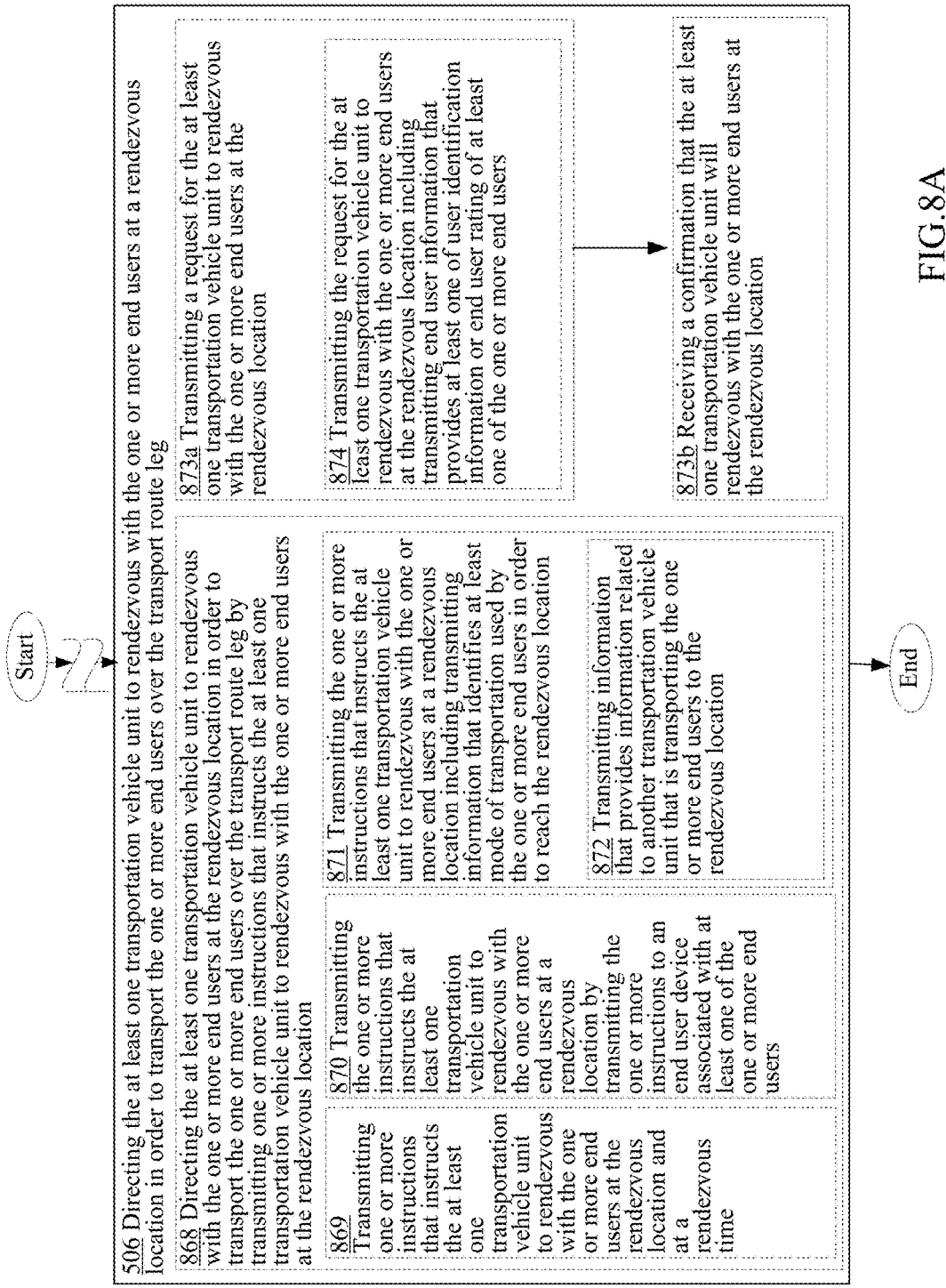
FIG. 8A is a high-level logic flowchart of a process depicting alternate implementations of the transportation vehicle unit directing operation 506 of FIG. 5.
Figure 8B:
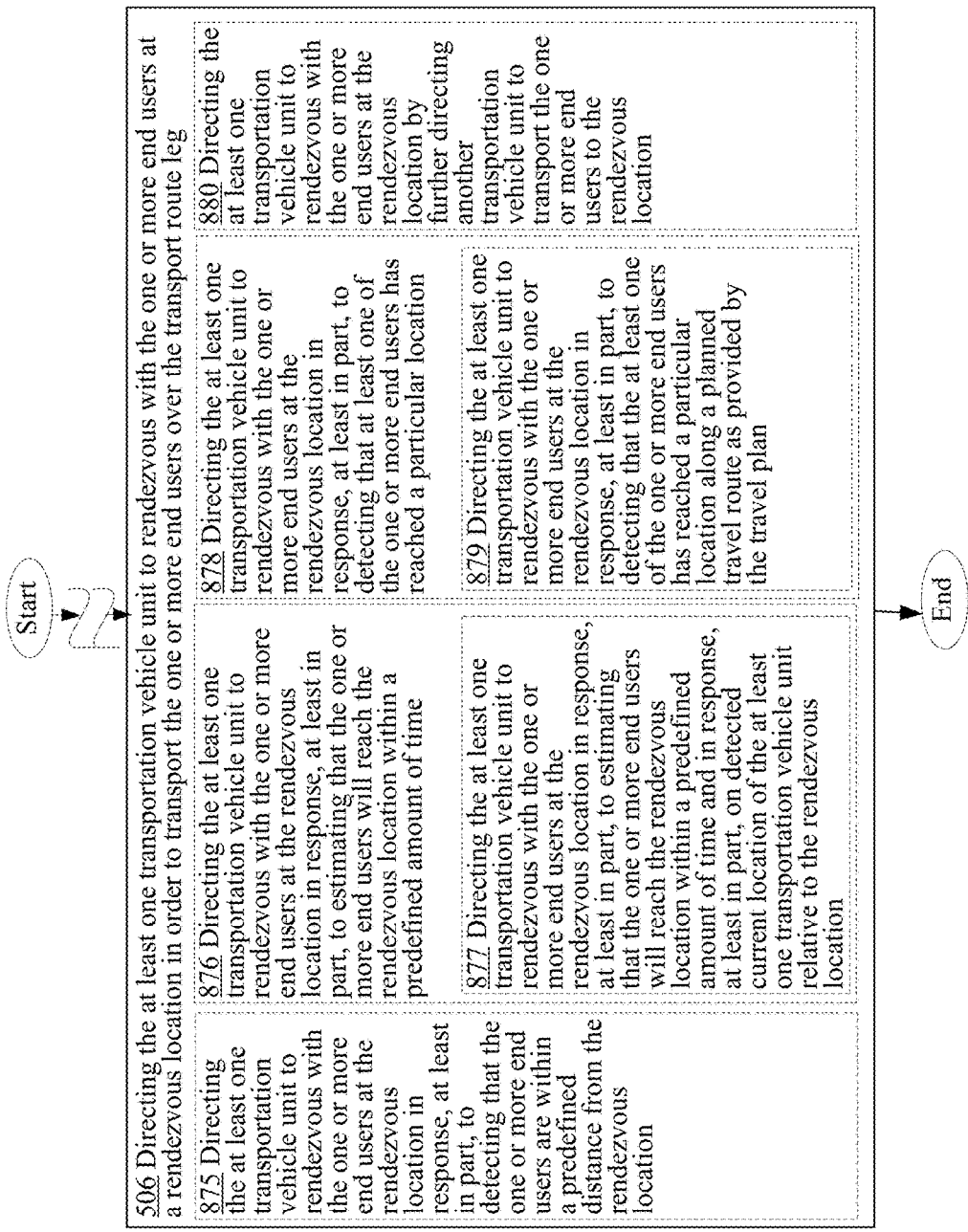
FIG. 8B is a high-level logic flowchart of a process depicting alternate implementations of the transportation vehicle unit directing operation 506 of FIG. 5.

Referring back to the transportation vehicle unit directing operation 506 of FIG. 5, the transportation vehicle unit directing operation 506 similar to the request receiving operation 502 and the travel plan providing operation 504 of FIG. 5 may be executed in a number of different ways in various alternative embodiments as illustrated, for example, in FIGS. 8A and 8B. In some cases, for example, the transportation vehicle unit directing operation 506 may actually include an operation 868 for directing the at least one transportation vehicle unit to rendezvous with the one or more end users at the rendezvous location in order to transport the one or more end users over the transport route leg by transmitting one or more instructions that instructs the at least one transportation vehicle unit to rendezvous with the one or more end users at the rendezvous location. For instance, the transportation vehicle unit guiding module 206* including the instruction transmitting module 340 (see FIG. 3C) of the travel planning network system 10* of FIG. 2A or 2B directing or guiding the at least one transportation vehicle unit 20* to rendezvous with the one or more end users 12 at the rendezvous location in order to transport the one or more end users 12 over the transport route leg by having the instruction transmitting module 340 transmit one or more instructions (e.g., directives or commands) that instructs the at least one transportation vehicle unit 20* (e.g., that instructs a human or robotic driver of the at least one transportation vehicle unit 20*) to rendezvous with the one or more end users 12 at the rendezvous location. In some cases, the instructions that may be transmitted may simply indicate an address for the rendezvous location and/or a rendezvous time.

In some implementations, operation 868 may further include one or more additional operations including, in some cases, an operation 869 for transmitting one or more instructions that instructs the at least one transportation vehicle unit to rendezvous with the one or more end users at the rendezvous location and at a rendezvous time. For instance, the instruction transmitting module 340 of the travel planning network system 10* of FIG. 2A or 2B transmitting one or more instructions that instructs the at least one transportation vehicle unit 20* to rendezvous with the one or more end users 12 at the rendezvous location and at a rendezvous time (e.g., a point in time or time range).

In the same or alternative implementations, operation 868 may additionally or alternatively include an operation 870 for transmitting the one or more instructions that instructs the at least one transportation vehicle unit to rendezvous with the one or more end users at a rendezvous location by transmitting the one or more instructions to an end user device associated with at least one of the one or more end users. For instance, the instruction transmitting module 340 of the travel planning network system 10* of FIG. 2A or 2B transmitting the one or more instructions that instructs the at least one transportation vehicle unit 20* to rendezvous with the one or more end users 12 at a rendezvous location by transmitting the one or more instructions to an end user device 14 (e.g., a mobile device such as a Smartphone or tablet computer, a laptop computer, a desktop computer, and so forth) associated with at least one of the one or more end users 12.

In the same or alternative implementations, operation 868 may additionally or alternatively include an operation 871 for transmitting the one or more instructions that instructs the at least one transportation vehicle unit to rendezvous with the one or more end users at a rendezvous location including transmitting information that identifies at least mode of transportation used by the one or more end users in order to reach the rendezvous location. For instance, the instruction transmitting module 340 including the transportation information transmitting module 342 (see FIG. 4C) of the travel planning network system 10* of FIG. 2A or 2B transmitting the one or more instructions that instructs the at least one transportation vehicle unit 20* to rendezvous with the one or more end users 12 at a rendezvous location including the transportation information transmitting module 342 transmitting information that identifies at least mode of transportation (e.g., walking, ferry, mass transit, another transportation vehicle unit 20*, and so forth) used by the one or more end users 12 in order to reach the rendezvous location for rendezvousing with the at least one transpiration vehicle unit 20*. In some cases, the information to be transmitted may include information that identifies a ferry that the one or more end users 12 uses to reach the rendezvous location, or information that the one or more end users 12 will be walking to reach the rendezvous location, or information that identifies another transportation vehicle unit 20* used by the one or more end users 12 to reach the rendezvous location.

In some cases, operation 871 may further include an operation 872 for transmitting information that provides information related to another transportation vehicle unit that is transporting the one or more end users to the rendezvous location. For instance, the transportation information transmitting module 342 of the travel planning network system 10* of FIG. 2A or 2B transmitting information that provides information (e.g., GPS data, vehicle number, etc.) related to another transportation vehicle unit 20* that is transporting the one or more end users 12 to the rendezvous location. For example, if the transportation vehicle unit 20a of FIG. 1A has been assigned to transport the one or more end users 12 for a second route leg of a travel plan 400g (see FIG. 4), then transmitting to the transportation vehicle unit 20a information (e.g., vehicle ID including make and model of the transportation vehicle) related to another transportation vehicle unit 20b (see FIG. 1) that will be bringing the one or more end users 12 to the rendezvous location ("2456 Ash Drive, Tacoma, Wash." see FIG. 4G) for rendezvousing with the transportation vehicle unit 20a in order to be transported over the second route leg.

In various implementations, the transportation vehicle unit directing operation 506 may include an operation 873a for transmitting a request for the at least one transportation vehicle unit to rendezvous with the one or more end users at the rendezvous location and a confirmation receiving operation 873b for receiving a confirmation that the at least one transportation vehicle unit will rendezvous with the one or more end users at the rendezvous location. For instance, the request transmitting module 344 (see FIG. 3C) of the travel planning network system 10* of FIG. 2A or 2B transmitting a request for the at least one transportation vehicle unit 20* to rendezvous with the one or more end users 12 at the rendezvous location, and the confirmation receiving module 346 of the travel planning network system 10* of FIG. 2A or 2B receiving a confirmation that the at least one transportation vehicle unit 20* will rendezvous with the one or more end users 12 at the rendezvous location. In various implementations, the request may be transmitted to and the confirmation may be received from a transport computing device (e.g., a general purpose computing device such as a Smartphone running a specialized application, or a dedicated device) that may be associated with the at least one transportation vehicle unit 20* (or the driver of the transportation vehicle unit 20*).

In some cases, operation 873a for transmitting a request for the at least one transportation vehicle unit to rendezvous with the one or more end users at the rendezvous location may actually include or involve an operation 874 for transmitting the request for the at least one transportation vehicle unit to rendezvous with the one or more end users at the rendezvous location including transmitting end user information that provides at least one of user identification information or end user rating of at least one of the one or more end users. For instance, the request transmitting module 344 (see FIG. 3C) of the travel planning network system 10* of FIG. 2A or 2B transmitting the request for the at least one transportation vehicle unit 20* to rendezvous with the one or more end users 12 at the rendezvous location including transmitting end user information that provides at least one of user identification information (e.g., image of at least one of the one or more end users 12 and/or name of one of the one or more end users 12) and/or end user rating of at least one of the one or more end users 12.

Turning now to FIG. 8B, in various implementations, the transportation vehicle unit directing operation 506 may include an operation 875 for directing the at least one transportation vehicle unit to rendezvous with the one or more end users at the rendezvous location in response, at least in part, to detecting that the one or more end users are within a predefined distance from the rendezvous location. For instance, the transportation vehicle unit guiding module 206* including the end user detecting module 348 (see FIG. 3C) of the travel planning network system 10* of FIG. 2A or 2B directing or guiding (e.g., ordering or instructing) the at least one transportation vehicle unit 20* to rendezvous with the one or more end users 12 at the rendezvous location in response, at least in part, to the end user detecting module 348 detecting that the one or more end users 12 are within a predefined distance (e.g., within 1 mile, 2 mile, and so forth) from the rendezvous location.

In the same or alternative implementations, the transportation vehicle unit directing operation 506 may include an operation 876 for directing the at least one transportation vehicle unit to rendezvous with the one or more end users at the rendezvous location in response, at least in part, to estimating that the one or more end users will reach the rendezvous location within a predefined amount of time. For instance, the transportation vehicle unit guiding module 206* including the end user detecting module 348 of the travel planning network system 10* of FIG. 2A or 2B directing or guiding the at least one transportation vehicle unit 20* to rendezvous with the one or more end users 12 at the rendezvous location in response, at least in part, to the end user detecting module 348 estimating that the one or more end users 12 will reach the rendezvous location within a predefined amount of time (e.g., will reach the rendezvous location within 10 minutes).

In some cases, operation 876 may further include an operation 877 for directing the at least one transportation vehicle unit to rendezvous with the one or more end users at the rendezvous location in response, at least in part, to estimating that the one or more end users will reach the rendezvous location within a predefined amount of time and in response, at least in part, on detected current location of the at least one transportation vehicle unit relative to the rendezvous location. For instance, the transportation vehicle unit guiding module 206* including the end user detecting module 348 and the transportation vehicle unit detecting module 350 (see FIG. 3C) of the travel planning network system 10* of FIG. 2A or 2B directing or guiding the at least one transportation vehicle unit 20* o rendezvous with the one or more end users at the rendezvous location in response, at least in part, to the end user detecting module 348 estimating that the one or more end users 12 will reach the rendezvous location within a predefined amount of time and in response, at least in part, on the transportation vehicle unit detecting module 350 detecting the current location of the at least one transportation vehicle unit 20* relative to the rendezvous location. That is, the further away the transportation vehicle unit 20* is to the rendezvous location, the earlier the transportation vehicle unit 20* must be directed to the rendezvous location so that the transportation vehicle unit 20* will have sufficient amount of time to reach the rendezvous location at or before the rendezvous time.

In the same or alternative implementations, the transportation vehicle unit directing operation 506 may include an operation 878 for directing the at least one transportation vehicle unit to rendezvous with the one or more end users at the rendezvous location in response, at least in part, to detecting that at least one of the one or more end users has reached a particular location. For instance, the transportation vehicle unit guiding module 206* including the end user detecting module 348 of the travel planning network system 10* of FIG. 2A or 2B directing or guiding the at least one transportation vehicle unit 20* to rendezvous with the one or more end users 12 at the rendezvous location in response, at least in part, to the end user detecting module 348 detecting that at least one of the one or more end users 12 has reached a particular location (e.g., end user has reached a particular sea port or pier).

As further illustrated in FIG. 8B, in some cases, operation 878 may further include an operation 879 for directing the at least one transportation vehicle unit to rendezvous with the one or more end users at the rendezvous location in response, at least in part, to detecting that the at least one of the one or more end users has reached a particular location along a planned travel route as provided by the travel plan. For instance, the transportation vehicle unit guiding module 206* including the end user detecting module 348 of the travel planning network system 10* of FIG. 2A or 2B directing the at least one transportation vehicle unit 20* to rendezvous with the one or more end users 12 at the rendezvous location in response, at least in part, to the end user detecting module 348 detecting that the at least one of the one or more end users 12 has reached a particular location along a planned travel route (e.g., the planned travel route 420c or 420d of FIG. 4C or 4D) as provided by the travel plan 400*.

In some cases, the transportation vehicle unit directing operation 506 may include an operation 880 for directing the at least one transportation vehicle unit to rendezvous with the one or more end users at the rendezvous location by further directing another transportation vehicle unit to transport the one or more end users to the rendezvous location. For instance, the transportation vehicle unit guiding module 206* of the travel planning network system 10* of FIG. 2A or 2B directing or guiding the at least one transportation vehicle unit (e.g., transportation vehicle unit 20a of FIG. 1) to rendezvous with the one or more end users 12 at the rendezvous location by further directing another transportation vehicle unit (e.g., transportation vehicle unit 20b of FIG. 1) to transport the one or more end users 12 to the rendezvous location. For example, FIG. 4G illustrates a travel plan 400g that calls for two different transportation vehicle units 20* to transport one or more end users 12 for two successive route legs (e.g., route leg 1 and route leg 2).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system, comprising:
   circuitry configured for receiving a request for transporting an end user towards a destination location from a starting location on at least one later date;
   circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg;
   circuitry configured for detecting the end user on the first route leg at least partially using at least one position sensor of a mobile device associated with the end user;
   circuitry configured for estimating that the end user will reach a rendezvous location associated with a starting location of the second route leg at a first leg arrival time at least partially based on one or more first traffic conditions associated with a geographic area involving a current position of the end user and involving the starting location of the second route leg, the one or more first traffic conditions received from at least one third party;
   circuitry configured for detecting a current route of the transportation vehicle unit relative to the rendezvous location at least partially using at least one position sensor of a transport computing device within the transportation vehicle unit; and
   circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party.

2. A method, comprising:
   receiving a request for transporting an end user towards a destination location from a starting location on at least one later date;
   providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg;
   detecting the end user on the first route leg at least partially using at least one position sensor of a mobile device associated with the end user;
   estimating that the end user will reach a rendezvous location associated with a starting location of the second route kg at a first leg arrival time at least partially based on one or more first traffic conditions associated with a geographic area involving a current position of the end user and involving the starting location of the second route leg, the one or more first traffic conditions received from at least one third party;
   detecting a current route of the transportation vehicle unit relative to the rendezvous location at least partially using at least one position sensor of a transport computing device within the transportation vehicle unit; and
   directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party,
   wherein at least one of the receiving, providing, detecting, estimating, or directing is at least partially implemented using at least one processing device.

3. The system of claim 1, wherein circuitry configured for receiving a request for transporting an end user towards a destination location from a starting location on at least one later date comprises:
   circuitry configured for receiving a request that identifies the destination location, including at least receiving a request that identifies at least one preferred arrival time on the at least one later date at the destination location.

4. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
   circuitry configured for providing a travel plan identifying a planned travel route for the end user to travel at least partway between the starting location and the destination location on the at least one later date.

5. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:

circuitry configured for providing a travel plan identifying one or more preferred intermediate arrival times on the at least one later date that are respectively associated with one or more intermediate locations along the planned travel route such that the end user will reach the destination location at proximately a preferred arrival time on the at least one later date if the end user arrives at the one or more intermediate locations at proximately the one or more preferred intermediate arrival times on the at least one later date.

6. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:

circuitry configured for providing a travel plan identifying at least one of a ferry or a mass transit vehicle for traveling along at least a portion of a route leg on the at least one later date, including at least accessing at least one schedule for the at least one of a ferry or a mass transit vehicle for confirmation of availability of the at least one of a ferry or a mass transit vehicle on the at least one later date.

7. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:

circuitry configured for providing a travel plan that identifies at least one of a rendezvous location or a rendezvous time for the end user to rendezvous with the transportation vehicle unit in order for the end user to be transported.

8. The system of claim 7, wherein circuitry configured for providing a travel plan that identifies at least one of a rendezvous location or a rendezvous time for the end user to rendezvous with the transportation vehicle unit in order for the end user to be transported comprises:

circuitry configured for providing a travel plan that identifies a rendezvous location the same as or proximate to the starting location.

9. The system of claim 7, wherein circuitry configured for providing a travel plan that identifies at least one of a rendezvous location or a rendezvous time for the end user to rendezvous with the transportation vehicle unit in order for the end user to be transported comprises:

circuitry configured for providing a travel plan that identifies a rendezvous location being an intermediate location located between the starting location and the destination location.

10. The system of claim 9, wherein circuitry configured for providing a travel plan that identifies a rendezvous location being an intermediate location located between the starting location and the destination location comprises:

circuitry configured for providing a travel plan that identifies the rendezvous location that is an intermediate location located between the starting location and the destination location and a rendezvous time or range in time for the one or more end users to rendezvous with the transportation vehicle unit at the rendezvous location.

11. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:

circuitry configured for providing the travel plan that identifies one or more modes of transportation for the at least two route legs, the travel plan provided at least partially in graphical form including at least one digital map designating in graphical form at least one of the one or more modes of transportation for at least a portion of at least one route leg.

12. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:

circuitry configured for providing a travel plan that identifies at least one transport route leg that calls for at least one transportation vehicle unit to transport the end user over the transport route leg and at least another route leg that does not call for the transportation vehicle unit to transport the end user over any portion of the second route leg.

13. The system of claim 12, wherein circuitry configured for providing a travel plan that identifies at least one transport route leg that calls for at least one transportation vehicle unit to transport the end user over the transport route leg and at least another route leg that does not call for the transportation vehicle unit to transport the end user over any portion of the second route leg comprises:

circuitry configured for providing a travel plan that identifies at least another route leg calling for the end user to travel over the at least another route leg by at least one of walking, bicycling, mass transit, or ferry.

14. The system of claim 12, wherein circuitry configured for providing a travel plan that identifies at least one transport route leg that calls for at least one transportation vehicle unit to transport the end user over the transport route leg and at least another route leg that does not call for the transportation vehicle unit to transport the end user over any portion of the second route leg comprises:
 circuitry configured for providing a travel plan where the at least another route leg precedes the transport route leg along an overall travel route for traveling from the starting location to the destination location.

15. The system of claim 12, wherein circuitry configured for providing a travel plan that identifies at least one transport route leg that calls for at least one transportation vehicle unit to transport the end user over the transport route leg and at least another route leg that does not call for the transportation vehicle unit to transport the end user over any portion of the second route leg comprises:
 circuitry configured for providing a travel plan where the at least another route leg follows the transport route leg along an overall travel route for traveling from the starting location to the destination location.

16. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for providing a travel plan that identifies at least one transport route leg where the transportation vehicle unit transports the end user and a second transport route leg that calls for a second transportation vehicle unit to transport the end user over the second transport route leg.

17. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for providing a travel plan that minimizes total travel costs to be incurred in order for the end user to reach the destination location from the starting location, including at least determining a minimized total travel cost at least partially based on determining a cost of a first travel route from the starting location to the destination location using a first mode of transportation and determining a cost of a second travel route from the starting location to the destination location using a second mode of transportation and selecting a travel route from the first travel route and the second travel route with a lowest overall travel cost as the minimized total travel cost.

18. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for providing a travel plan that complies with one or more of a walking preference, a bicycling preference, a mass transit preference, or a ferry preference of the end user.

19. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for developing a travel plan that complies with one or more geographic preferences of the end user that relate to one or more geographic locations or areas that the end user prefers not to be routed through.

20. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for developing a travel plan for facilitating the end user to travel to the destination location from the starting location on the at least one later date at least partially based on the one or more likely traffic conditions on the at least one later date, the one or more likely traffic conditions on the at least one later date retrieved from at least one traffic history database using at least one portion of a route associated with the travel plan as a search term for the at least one traffic history database.

21. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
 circuitry configured for transmitting one or more portions of the travel plan.

22. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
- circuitry configured for transmitting to an end user device associated with the end user a modified version of the travel plan in response to detecting that the transportation vehicle unit will not be able to transport the end user over the transport route leg as called for by the travel plan.

23. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
- circuitry configured for transmitting to an end user device associated with the end user a modified version of the travel plan in response to detecting that the end user will not be able to rendezvous with the transportation vehicle unit in order to be transported over the transport route leg as called for by the travel plan.

24. The system of claim 1, wherein circuitry configured for detecting the end user on the first route leg at least partially using at least one position sensor of a mobile device associated with the end user comprises:
- circuitry configured for detecting the end user within a predefined distance from the rendezvous location at least partially using at least one position sensor of a mobile device associated with the end user.

25. The system of claim 1, wherein circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party comprises:
- circuitry configured for directing the transportation vehicle unit to rendezvous with the end user at the rendezvous location in response, at least in part, to detecting, at least partially using at least one position sensor of a mobile device associated with the end user, that the end user has reached a particular location along the travel plan.

26. The system of claim 1, wherein circuitry configured for detecting the end user on the first route leg at least partially using at least one position sensor of a mobile device associated with the end user comprises:
- circuitry configured for detecting the end user on the first route leg, the first route leg including at least another transport route leg in which at least another transportation vehicle unit is transporting the end user over the at least another transport route leg, at least partially using at least one position sensor of a mobile device associated with the end user.

27. The system of claim 1, wherein circuitry configured for estimating that the end user will reach a rendezvous location associated with a starting location of the second route leg at a first leg arrival time at least partially based on one or more first traffic conditions associated with a geographic area involving a current position of the end user and involving the starting location of the second route leg, the one or more first traffic conditions received from at least one third party comprises:
- circuitry configured for estimating that the end user will reach a rendezvous location associated with a starting location of the second route leg at a first leg arrival time at least partially based on a speed at which the end user is moving detected at least partially using the at least one position sensor of a mobile device associated with the end user and at least partially based on the one or more first traffic conditions.

28. The system of claim 1, wherein circuitry configured for detecting a current route of the transportation vehicle unit relative to the rendezvous location at least partially using at least one position sensor of a transport computing device within the transportation vehicle unit comprises:
- circuitry configured for detecting that the transportation vehicle unit is currently transporting at least one other end user to at least one other destination;
- circuitry configured for estimating a time at least the transportation vehicle unit will drop off the at least one other end user at the at least one other destination at least partially using at least one position sensor of a transport computing device within the transportation vehicle unit; and
- circuitry configured for providing a proximity of the at least one other destination relative to the rendezvous location, the proximity of the at least one other destination relative to the rendezvous location usable in determining a sufficient amount of time for the transportation vehicle unit to reach the rendezvous location from the at least one other destination at or before the first leg arrival time subsequent to dropping off the at least one other end user.

29. The system of claim 1, wherein circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party comprises:
- circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more roadwork conditions associated with at least one travel corridor between the current position of the transportation vehicle unit and the starting location of the second route leg.

30. The system of claim 1, wherein circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party comprises:
    circuitry configured for directing the transportation vehicle unit to rendezvous with the end user at the rendezvous location, including at least a rendezvous location on an opposite side of an international border, in order to transport the end user over the transport route leg across the international border, including at least determining a sufficient amount of time for the transportation vehicle unit to reach the rendezvous location at or before the first leg arrival time at least partially based on the current route of the transportation vehicle unit and at least partially based on one or more current international border crossing wait times.

31. The system of claim 1, wherein circuitry configured for providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg comprises:
    circuitry configured for providing a travel plan for facilitating the end user to travel to the destination location from the starting location on the at least one later date at least partially based on one or more likely traffic conditions, the one or more likely traffic conditions including at least one of roadwork or construction, on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg.

32. The system of claim 1, further comprising:
    circuitry configured for receiving at least one notification of at least one delay in at least one event for which the end user is traveling to the destination location; and
    circuitry configured for altering the travel plan for facilitating the end user to travel to the destination location from the starting location at least partially based on the at least one delay in the at least one event for which the end user is traveling to the destination location.

33. The system of claim 32, wherein circuitry configured for altering the travel plan for facilitating the end user to travel to the destination location from the starting location at least partially based on the at least one delay in the at least one event for which the end user is traveling to the destination location comprises:
    circuitry configured for transmitting at least one indication to at least one transportation vehicle unit to rendezvous with the end user at the rendezvous location at a later time at least partially based on the at least one delay in the at least one event for which the end user is traveling to the destination location.

34. The system of claim 33, wherein circuitry configured for transmitting at least one indication to at least one transportation vehicle unit to rendezvous with the end user at the rendezvous location at a later time at least partially based on the at least one delay in the at least one event for which the end user is traveling to the destination location comprises:
    circuitry configured for transmitting at least one cancellation to at least one transportation vehicle unit originally scheduled to rendezvous with the end user at the rendezvous location; and
    circuitry configured for transmitting at least one request to at least one other transportation vehicle unit to rendezvous with the end user at the rendezvous location at the later time at least partially based on the at least one delay in the at least one event for which the end user is traveling to the destination location.

35. The system of claim 1, wherein circuitry configured for detecting a current route of the transportation vehicle unit relative to the rendezvous location at least partially using at least one position sensor of a transport computing device within the transportation vehicle unit comprises:
    circuitry configured for detecting at least one delay associated with the current route of the transportation vehicle unit relative to the rendezvous location at least partially using at least one position sensor of a transport computing device within the transportation vehicle unit; and
    circuitry configured for transmitting at least one notification to the end user of the at least one delay associated with the current route of the transportation vehicle unit relative to the rendezvous location.

36. The system of claim 35, wherein circuitry configured for detecting at least one delay associated with the current route of the transportation vehicle unit relative to the rendezvous location at least partially using at least one position sensor of a transport computing device within the transportation vehicle unit comprises:
    circuitry configured for detecting that the at least one transportation vehicle unit assigned to rendezvous with the end user has encountered at least one delay resulting from the at least one transportation vehicle unit being involved in an accident.

37. A system, comprising:
    at least one processing device; and
    one or more instructions which, when executed by the at least one processing device, cause the at least one processing device to perform one or more operations including at least:
        receiving a request for transporting an end user towards a destination location from a starting location on at least one later date;

providing a travel plan for facilitating the end user to travel to the destination location from the starting location on the at least one later date at least partially based on one or more likely traffic conditions on the at least one later date, the travel plan identifying at least a first route leg and a second route leg, at least the second route leg being a transport route leg in which a transportation vehicle unit will transport the end user over the transport route leg, the travel plan provided at least partially in graphical form including at least one digital map illustrating at least a portion of at least one route leg;

detecting the end user on the first route leg at least partially using at least one position sensor of a mobile device associated with the end user;

estimating that the end user will reach a rendezvous location associated with a starting location of the second route leg at a first leg arrival time at least partially based on one or more first traffic conditions associated with a geographic area involving a current position of the end user and involving the starting location of the second route leg, the one or more first traffic conditions received from at least one third party;

detecting a current route of the transportation vehicle unit relative to the rendezvous location at least partially using at least one position sensor of a transport computing device within the transportation vehicle unit; and directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party.

38. A system, comprising:

circuitry configured for receiving a request for transporting an end user towards a destination location;

circuitry configured for providing a travel plan for facilitating the end user to travel to the destination location from a starting location, the travel plan identifying at least a first route leg and a second route leg, at least the second route leg being a transport route leg in which a transportation vehicle unit will transport the end user over the transport route leg;

circuitry configured for detecting the end user on the first route leg at least partially using at least one position sensor of a mobile device associated with the end user;

circuitry configured for estimating that the end user will reach a rendezvous location associated with a starting location of the second route leg at a first leg arrival time at least partially based on one or more first traffic conditions associated with a geographic area involving a current position of the end user and involving the starting location of the second route leg, the one or more first traffic conditions received from at least one third party;

circuitry configured for detecting a current route of the transportation vehicle unit relative to the rendezvous location at least partially using at least one position sensor of a transport computing device within the transportation vehicle unit; and circuitry configured for directing the transportation vehicle unit to rendezvous with the end user at the rendezvous location in order to transport the end user over the transport route leg in response, at least in part, to determining a sufficient amount of time for the transportation vehicle unit to reach the rendezvous location at or before the first leg arrival time at least partially based on the current route of the transportation vehicle unit and at least partially based on one or more second traffic conditions associated with a geographic area involving a current position of the transportation vehicle unit and involving the starting location of the second route leg, the one or more second traffic conditions received from the at least one third party, wherein circuitry configured for directing the transportation vehicle unit to rendezvous with the end user at the rendezvous location, including at least a rendezvous location on an opposite side of an international border, in order to transport the end user over the transport route leg across the international border, including at least determining a sufficient amount of time for the transportation vehicle unit to reach the rendezvous location at or before the first leg arrival time at least partially based on the current route of the transportation vehicle unit and at least partially based on one or more current international border crossing wait times comprises:

circuitry configured for determining that one or more current international border crossing by walking wait times are substantially shorter than one or more current international border crossing driving wait times;

circuitry configured for transmitting an indication to the end user to terminate the first route leg on the opposite side of the international border and walk across the border; and circuitry configured for directing the transportation vehicle unit to rendezvous with the end user at a rendezvous location located after the international border in order to transport the end user over the transport route leg on the current side of the international border.

* * * * *